US012368927B2

(12) United States Patent
Glennon et al.

(10) Patent No.: US 12,368,927 B2
(45) Date of Patent: *Jul. 22, 2025

(54) METHODS AND TECHNIQUES FOR ADAPTIVE SEARCH

(71) Applicant: Adeia Media Solutions Inc., San Jose, CA (US)

(72) Inventors: Shelly Glennon, San Jose, CA (US); Brian Beach, Bloomington, IN (US); James Cheng, Fremont, CA (US); Richard Lee, San Francisco, CA (US); Kimberly Paluch, Sandy, UT (US); Robert Poniatowski, San Jose, CA (US); Margret Schmidt, Redwood City, CA (US)

(73) Assignee: Adeia Media Solutions Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,553

(22) Filed: Feb. 29, 2024

(65) Prior Publication Data
US 2024/0205503 A1  Jun. 20, 2024

Related U.S. Application Data

(63) Continuation of application No. 17/586,004, filed on Jan. 27, 2022, now abandoned, which is a
(Continued)

(51) Int. Cl.
*H04N 21/47* (2011.01)
*G06F 3/0482* (2013.01)
(Continued)

(52) U.S. Cl.
CPC ........... *H04N 21/47* (2013.01); *G06F 3/0482* (2013.01); *G06F 16/33* (2019.01); *G06F 16/335* (2019.01);
(Continued)

(58) Field of Classification Search
CPC ...................................... H04N 21/47
(Continued)

(56) References Cited

U.S. PATENT DOCUMENTS 6,546,388 B1 4/2003 Edlund et al.
7,269,582 B2 9/2007 Winter et al.
(Continued)

FOREIGN PATENT DOCUMENTS

EP  1463307 A2  9/2004
WO  0180079 A2  10/2001

OTHER PUBLICATIONS

Alpa Jain et al: "Acronym-Expansion Recognition and Ranking on the Web", Information Reuse and Integration, 2007. IRI 2007. IEEE International Conference on, IEEE, PI, Aug. 1, 2007 (Aug. 1, 2007), pp. 209-214, XP031130874, ISBN: 978-1-4244-1499-4.
(Continued)

*Primary Examiner* — Syling Yen
(74) *Attorney, Agent, or Firm* — Haley Guiliano LLP

(57) ABSTRACT

A method and system are provided for a prefix-based search system. The system stores a first data structure for a prefix. The system stores a second data structure for a second prefix that is a sub-prefix of the first prefix. As search results containing the first prefix are displayed by the system, the system track interactions with the search results and updates both data structures. When the system detected a search for a second prefix, the system uses the second updated data structure to provide search results.

17 Claims, 43 Drawing Sheets

Related U.S. Application Data continuation of application No. 16/169,508, filed on Oct. 24, 2018, now Pat. No. 11,265,610, which is a continuation of application No. 12/650,534, filed on Dec. 30, 2009, now Pat. No. 10,158,823.

(60) Provisional application No. 61/142,193, filed on Dec. 31, 2008.

(51) Int. Cl.
  *G06F 16/33* (2019.01)
  *G06F 16/335* (2019.01)
  *H04N 21/482* (2011.01)

(52) U.S. Cl.
  CPC ....... *H04N 21/482* (2013.01); *H04N 21/4828* (2013.01)

(58) Field of Classification Search
  USPC .......................................................... 707/728
  See application file for complete search history.

(56) References Cited

U.S. PATENT DOCUMENTS

| | | | |
|---|---|---|---|
| 8,660,545 | B1 | 2/2014 | Redford et al. |
| 9,789,394 | B2 | 10/2017 | Gross |
| 10,637,724 | B2 | 4/2020 | Johnson et al. |
| 2004/0143569 | A1 | 7/2004 | Gross et al. |
| 2005/0246739 | A1 | 11/2005 | Davidson |
| 2006/0031214 | A1 | 2/2006 | Solaro et al. |
| 2006/0143674 | A1 | 6/2006 | Jones et al. |
| 2006/0190436 | A1 | 8/2006 | Richardson et al. |
| 2006/0224490 | A1 | 10/2006 | Seth et al. |
| 2006/0294548 | A1 | 12/2006 | Potrebic et al. |
| 2007/0005563 | A1 | 1/2007 | Aravamudan et al. |
| 2007/0014536 | A1 | 1/2007 | Hellman |
| 2007/0043704 | A1 | 2/2007 | Raub et al. |
| 2007/0043750 | A1 | 2/2007 | Dingle |
| 2007/0061321 | A1* | 3/2007 | Venkataraman .... G06F 16/9038 707/999.005 |
| 2007/0088681 | A1 | 4/2007 | Aravamudan et al. |
| 2007/0088692 | A1 | 4/2007 | Dean et al. |
| 2007/0162432 | A1 | 7/2007 | Armstrong et al. |
| 2007/0162502 | A1 | 7/2007 | Thomas et al. |
| 2007/0168539 | A1 | 7/2007 | Day |
| 2008/0059884 | A1 | 3/2008 | Ellis et al. |
| 2008/0072180 | A1 | 3/2008 | Chevalier et al. |
| 2008/0163286 | A1 | 7/2008 | Rudolph et al. |
| 2008/0163365 | A1 | 7/2008 | Austin et al. |
| 2009/0249412 | A1 | 10/2009 | Bhogal et al. |
| 2009/0271700 | A1* | 10/2009 | Chen ...................... G06Q 10/10 715/261 |
| 2010/0082604 | A1 | 4/2010 | Gutt et al. |
| 2010/0162284 | A1 | 6/2010 | Robbins et al. |
| 2011/0087686 | A1 | 4/2011 | Brewer et al. |
| 2020/0349191 | A1 | 11/2020 | Poniatowski |
| 2022/0150593 | A1 | 5/2022 | Glennon et al. |

OTHER PUBLICATIONS

Freyne, J. , et al., "Further Experiments on Collaborative Ranking in Community-Based Web Search", Artificial Intelligence Review, vol. 21, No. 3-4, Jun. 2004, 229-252.

Tao , et al., "A study of relevance propagation for web search", SIGIR 2005. Proceedings of the 28th. Annual International ACM SIGIR Conference on Research and Development in Information Retrieval. Salvador, Brazil, Aug. 15-19, 2005; [Annual International ACM-SIGIR Conference on Research and Development in Infor, Aug. 15, 2005, 408-415.

* cited by examiner

METHODS AND TECHNIQUES FOR ADAPTIVE SEARCH

CROSS-REFERENCE TO RELATED APPLICATIONS

This application is a continuation of U.S. patent application Ser. No. 17/586,004, filed Jan. 27, 2022, which is a continuation of U.S. patent application Ser. No. 16/169,508, filed Oct. 24, 2018, now U.S. Pat. No. 11,265,610, which is a continuation of U.S. patent application Ser. No. 12/650,534, filed Dec. 30, 2009, now U.S. Pat. No. 10,158,823, which claims the benefit of U.S. Provisional Application No. 61/142,193, filed Dec. 31, 2008, the entire contents of which are hereby incorporated by reference herein.

FIELD OF THE INVENTION

The present invention relates generally to digital video recorders ("DVRs").

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The introduction of the DVR to the consumer world has revolutionized the way users watch and record television programs. DVRs eliminate many of the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive one or more television signals (which may represent television programs and/or movies) as input from cables or satellite dishes, (or, in some cases, unlike VCRs, from broadband network connections) and also output television signals to a television set or other display.

A DVR's user can instruct the DVR to schedule, for recording, specified content that may be broadcasted or otherwise transmitted to the DVR at some future time. Thus, the user can schedule the automatic recording of the content in advance of the time that the DVR will receive the content. For example, the user can instruct the DVR to record unspecified content that will be broadcasted on a specified channel beginning at a specified date and time and ending at another specified time. For another example, the user can instruct the DVR to record a specified showing (on a specified channel, and beginning at a specified date and time) of a specified movie, specified event, or specified episode of a multi-episode television series. For another example, the user can instruct the DVR to record the next to-be-broadcasted instance of a specified movie, specified event, or specified episode of a multi-episode television series without specifying the date, time, or channel on which that instance will be broadcasted. For another example, the user can instruct the DVR to record all (or all first-run) episodes of a multi-episode television series on a specified channel without specifying the dates or times at which those episodes will be broadcasted. For another example, the user can instruct the DVR to record all (or all first-run) instances of movies, events, or episodes of a multi-episode television series that are associated with a specified keyword, a specified actor, and/or a specified director without specifying the titles, channels, or broadcasting times of those instances.

Other consumer electronics devices also allow for the recording and viewing of content not based upon traditional broadcast or cable delivery. For example, devices might obtain content via broadband network connections. Apple TV® is an example of this type of device. Users may purchase content over the network and have the content be delivered based upon IP or any other communications protocol. Devices that employ Internet Protocol Television (IPTV) may also be used. IPTV is a system where a digital television service is delivered using Internet Protocol over a network infrastructure. Rather than using broadcast or cable, all content is exclusively delivered over an IP network architecture. An example of such a service is U-Verse® by AT&T®. Devices may also use a hybrid of IPTV and standard delivery. Verizon FiOS TV®, for example, delivers Video On Demand (VOD) content and interactive features, over IP but the vast majority of content, including Pay Per View (PPV), is provided over a standard broadcast video signal which carries both analog and digital content. Other devices may act as a receiver to deliver content from a number of different delivery devices, such as DVRs, DVD players, IPTV, etc. that are connected to the device.

Because of the wide variety of content that is available for viewing with DVRs and any other device capable of storing and displaying content, searching for particular media or digital content has become increasingly important. One difficulty of performing a search is the inability of users to easily type in letters corresponding to keywords for searching. Thus, methods that minimize the need to enter letters that correspond to keywords are important.

In addition, the adoption of high-definition televisions has changed how people are able to watch television. High definition television greatly improves picture quality, introduces a new aspect ratio to the image of the television, and has a higher screen resolution. Televisions and display devices have a particular aspect ratio, or the ratio of the display's width divided by the display's height. Common aspect ratios for televisions are 4:3 (1.33:1) for standard-definition video formats and 16:9 (1.78:1) for high-definition television and European digital television formats. The aspect ratio allows for additional space on which to add additional features on the user interface. In addition, the resolution of the screen on a high definition television is greater that allows a clearer picture for the viewer.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
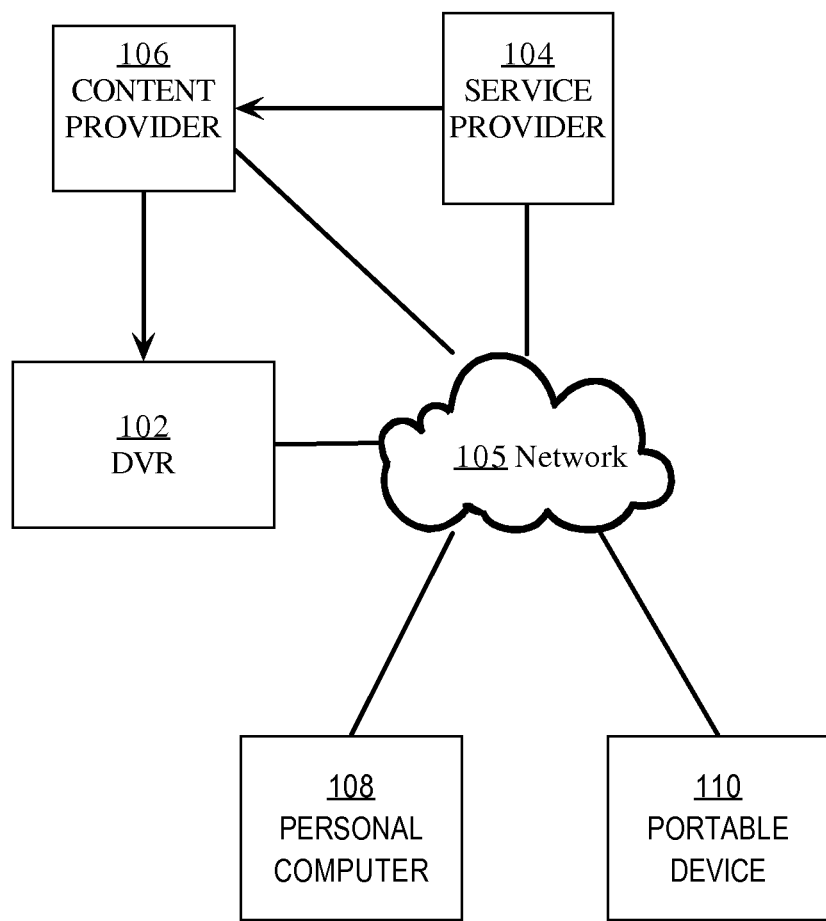
FIG. 1A illustrates an example system in which program data progressive search may be implemented, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
 1.0 General Overview
 2.0 Structural Overview
 3.0 Example Techniques and Processes
  3.1 Adaptive Search Results
  3.2 User Interface
  3.3 Discovery Bar of Multimedia Content
  3.4 Additional Features
 4.0 Implementation Mechanisms
 5.0 Examples

1.0 General Overview

The needs identified in the foregoing Background, and other needs and objects that will become apparent from the following description, are achieved in the present invention, which comprises methods to perform adaptive search results and user interface enhancements.

As the abundance of programming content proliferates, users may wish to perform searches on a DVR for particular programming content. Results that the user may search include, but are not limited to, persons, program titles, music videos, or tags. Tags, as used herein, may refer to a set of words, pictures or other media used to link various pieces of content. One drawback to performing searches on a DVR is that entering letters for keyword search terms is cumbersome and slow. Using a remote input device, a user may be presented with a screen that contains an alphabet and a selection square over a letter. The user may navigate the selection square over a letter to select the letter. Once the letter is selected by the user, the letter would appear in a search box.

In an embodiment, as letters are entered into the search box, the DVR returns potential results to the user that the user may then select. In an embodiment, the letters in the search box corresponds to letters in the search results. The corresponding letters may correspond to any part of the search results and not only the beginning letters of the search results. For example, the user might enter the letters "HOU" into the search box. Under this circumstance, the DVR would return results that have the letters "HOU" somewhere in the results. Some results might be "Desperate Housewives" "House M.D." "House Hunters" and "House on Haunted Hill." If result choices were limited to only the beginning letters of a title, then "Desperate Housewives" would not be shown in the list of potential results. In other embodiments, the corresponding letters may correspond to letters in a related term or concept. For example, the letters "SPO" that correspond to "sports" might also return results for "NFL football" because "NFL football" would be in the "sports" category. Results may also include persons, actors, tags, and music videos. Other categories may also be added or included in order to improve search efficiency. Data searched may also include any program metadata, such as program description information, as well as persons, actors, tags, and music videos.

In an embodiment, the search results presented to a user that corresponds to the letters in the search box are based at least in part to relevance. The relevance may be based upon many different factors such as actions performed solely by the user, or an aggregation based upon the actions of many users. In an embodiment, the results are ranked based upon selections of previous users with the particular search letters. For example, the user might enter the letters "HOU" into the search box. "House M.D." is the highest ranked program and is listed first because other users who have entered the term "HOU" into the search box selected "House M.D." Over time, more users might select "Desperate Housewives" after entering the search term "HOU". Under this circumstance, the system would determine that "Desperate Housewives" is more relevant and would be listed higher than "House M.D."

A larger available space on which to display information allows more information to be shown without changing screens. In an embodiment, when a user highlights a particular media content of possible search results on a search screen, additional information is displayed about the highlighted media content. If the screen display area were more limited, a user would be forced to select the possible search result and a change of screen was required before displaying information, causing the transition to be more difficult to follow by the user.

The user interface of a DVR is very important as the interface is the only way in which a user may interact with the DVR. In an embodiment, a dynamic content bar is placed on the user interface that allows a user to be presented with additional new content that may be of interest. The content bar may show any number of available media contents in the bar, and these media contents may change from one viewing to the next. The content shown may be content that is related to the media content that the user is searching, recommended programs, advertisements, popular content, recommendations from friends, and recommendations from trusted third parties (e.g., Netflix, New York Times, etc.). The user may also navigate the content bar in a variety of ways such as, but not limited to, moving the bar directionally to the left or the right. The bar will appear to move in that requested direction and new content will appear as the bar is moved by the user.

2.0 Structural Overview

FIG. 1A illustrates an example system in order to perform adaptive search results and user interface, according to an embodiment. The system contains at least one client device such as DVR 102 which is communicatively coupled to network 105 through any communication interface, such as an Ethernet interface or wireless communications port. The functionality of a DVR is typified in U.S. Pat. No. 6,233,389, which is owned by the Applicant and is hereby incorporated by reference. In another embodiment, DVR 102 is replaced with a device that is able to receive content via broadband download or streaming. The device may be capable of receiving and decoding IPTV, a hybrid of IPTV and traditional broadcast, or any other network based communication protocols. The system also includes service provider 104, content provider 106, personal computer 108 and portable device 110.

Personal computer 108 may be a personal computing device, such as a desktop computer or laptop computer, and is also coupled to network 105 through any communications interface, including wireless. Portable device 110 may be any handheld computing device, cellular phone, portable media player, or any other portable device capable of displaying multimedia content and may be coupled to network 105 through any communications interface, including wireless. DVR 102, personal computer 108, and portable device 110 each communicate with service provider 104 through network 105. In another embodiment, DVR 102, personal computer 108, and portable device 110 each communicate with content provider 110 through network 105.

Network 105 may be implemented by any medium or mechanism that provides for the exchange of data between devices in the communication system. Examples of network 105 include, without limitation, a network such as a Local Area Network (LAN), Wide Area Network (WAN), the Internet, one or more terrestrial, satellite or wireless links, etc. Alternatively or additionally, any number of devices connected to network 105 may also be directly connected to each other through a communications link.

In one embodiment, content provider 106 provides broadcast program content to DVR 102 via cable, satellite, terrestrial communication, or other transmission method. Broadcast program content may include any multimedia content such as: audio, image, or video content. In another embodiment, content provider 106 provides multimedia content, such as any downloadable content, through network 105 to DVR 102, personal computer 108, or portable device 110.

In one embodiment, DVR 102 communicates with service provider 104, which provides program guide data, graphical resources (such as fonts, pictures, etc.), service information, software, advertisements, event identification data, and other forms of data enable DVR 102 to operate independently of service provider 104 to satisfy user interests. In another embodiment, DVR 102, personal computer 108, and portable device 110 can communicate with each other to transfer content, metadata, or any other data through network 105, communication connection, or any local network.

In another embodiment, content provider 106 may provide, to service provider 104, content data or any metadata, including promotional data, icons, web data, and other information. Service provider 104 may then interpret the metadata and provide the content data metadata to DVR 102, personal computer 108, or portable device 110.

Figure 1B:
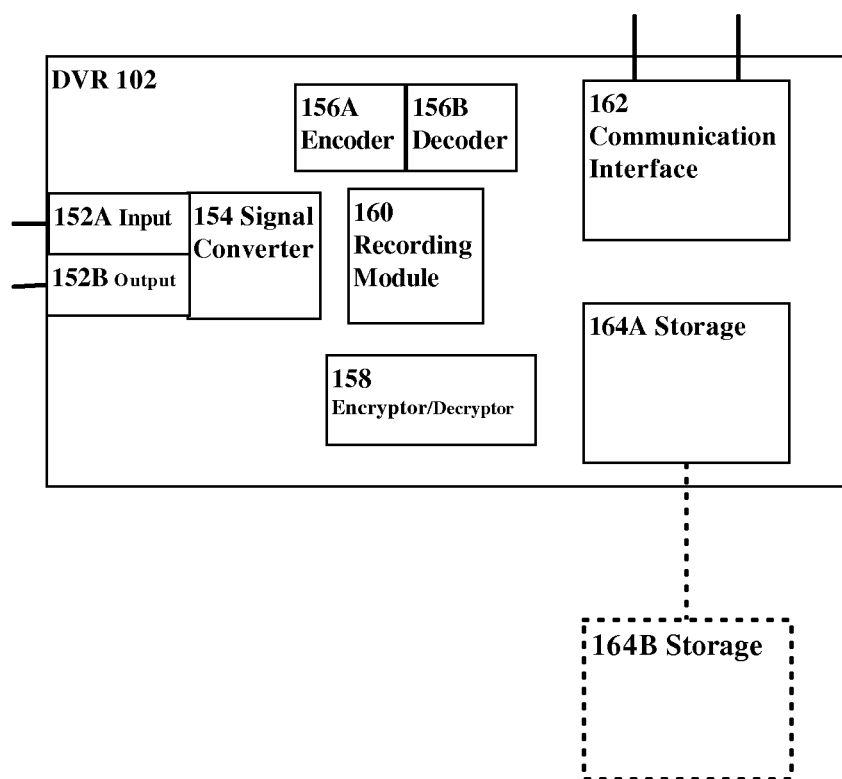
FIG. 1B is a block diagram illustrating a general overview of the components of a Digital Video Recorder (DVR), according to an embodiment of the invention.

Referring to FIG. 1B, in an embodiment, DVR 102 generally comprises a plurality of components, signified by Signal Converter 154, that are necessary to digitize an analog television signal and convert it into a digital data stream or accept a digital data stream. An example of the internal structure and operation of a DVR is further described in U.S. Pat. No. 6,233,389.

DVR 102 receives broadcast signals from an antenna, from a cable TV system, satellite receiver, etc., via input 152A. Input 152A may comprise one or more of tuning modules that allow one or more signals to be received and recorded simultaneously. For example, a TV input stream received by input 152A may take the form of a National Television Standards Committee (NTSC) compliant signal or a PAL compliant broadcast signal. For another example, a TV input stream received by input 152A may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal.

An MPEG-2 transport multiplex supports multiple programs in the same broadcast channel with multiple video and audio feeds and private data. Input 152A tunes to a particular program in a channel, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 152A and passed to the other modules as if the signals had been delivered via an MPEG-2 private data channel.

Recording Module 160 records the incoming data stream by storing the digital data stream on at least one storage facility, signified by Storage 164A/164B that is designed to retain segments of the digital data stream. Storage 164A/164B may be one or more non-volatile storage devices (e.g., hard disk, solid state drive, USB external hard drive, USB external memory stick, USB external solid state drive, network accessible storage device, etc.) that are internal 164A and/or external 164B. A Signal Converter 154 retrieves segments of the data stream, convert the data stream into an analog signal, and then modulate the signal onto a RF carrier, via Output 152B, through which the signal is delivered to a standard TV set. Output 152B may alternatively deliver a digital signal to a TV set or video monitor. For example, DVR 102 may utilize a Digital Visual Interface port (DVI) for sending digital signals to a TV via a DVI cable.

DVR 102 also includes a Communication Interface 162, through which the DVR 102 communicates with Network 105 via Ethernet, wireless network, modem, or other communications standard. Further, DVR 102 may be integrated into a TV system such that the components described above are housed in a TV set capable of performing the functions of each component of DVR 102.

In another embodiment, DVR 102 generally comprises a plurality of components necessary to receive, record, store, transfer and playback digital data signals from a plurality of sources, such as a PC, a DVR, a service provider, or content server. DVR 102 can transfer digital data signals to another DVR or PC. DVR 102 may encode or decode digital signals via Encoder 156A and Decoder 156B into a plurality of formats for playback, storage or transfer. According to one embodiment of the invention, encoder 156A produces MPEG streams. According to another embodiment of the invention, encoder 156A produces streams that are encoded using a different codec. Decoder 156B decodes the streams encoded by encoder 156A or streams that are stored in the format in which the streams were received using an appropriate decoder. DVR 102 can also encrypt or decrypt digital data signals using Encryptor/Decryptor 158 for storage, transfer or playback of the digital data signals.

In another embodiment, DVR 102 is replaced with a device capable of storing and displaying IPTV or some other content available via network download or streaming. The device comprises a plurality of components necessary to receive, record, store, transfer and playback digital data signals transmitted via IP or any other communications protocol. The device may encode or decode digital signals into and from a plurality of media formats for playback, storage or transfer. The device may also encrypt or decrypt the downloaded or streamed content for storage, transfer, or playback.

In one embodiment, DVR 102 communicates with Service Provider 104, which provides program guide data, graphical resources such as brand icons and pictures, service information, software programs, advertisements, and other forms of data that enable DVR 102 to operate independently of the Service Provider 104 to perform autonomous recording functions. Communication between DVR 102 and Service Provider 104 utilizes a secure distribution architecture to transfer data between the DVR 102 and the Service Provider 104 such that both the service data and the user's privacy are protected.

3.0 Example Techniques and Processes 3.1 Adaptive Search Results

Figure 2:
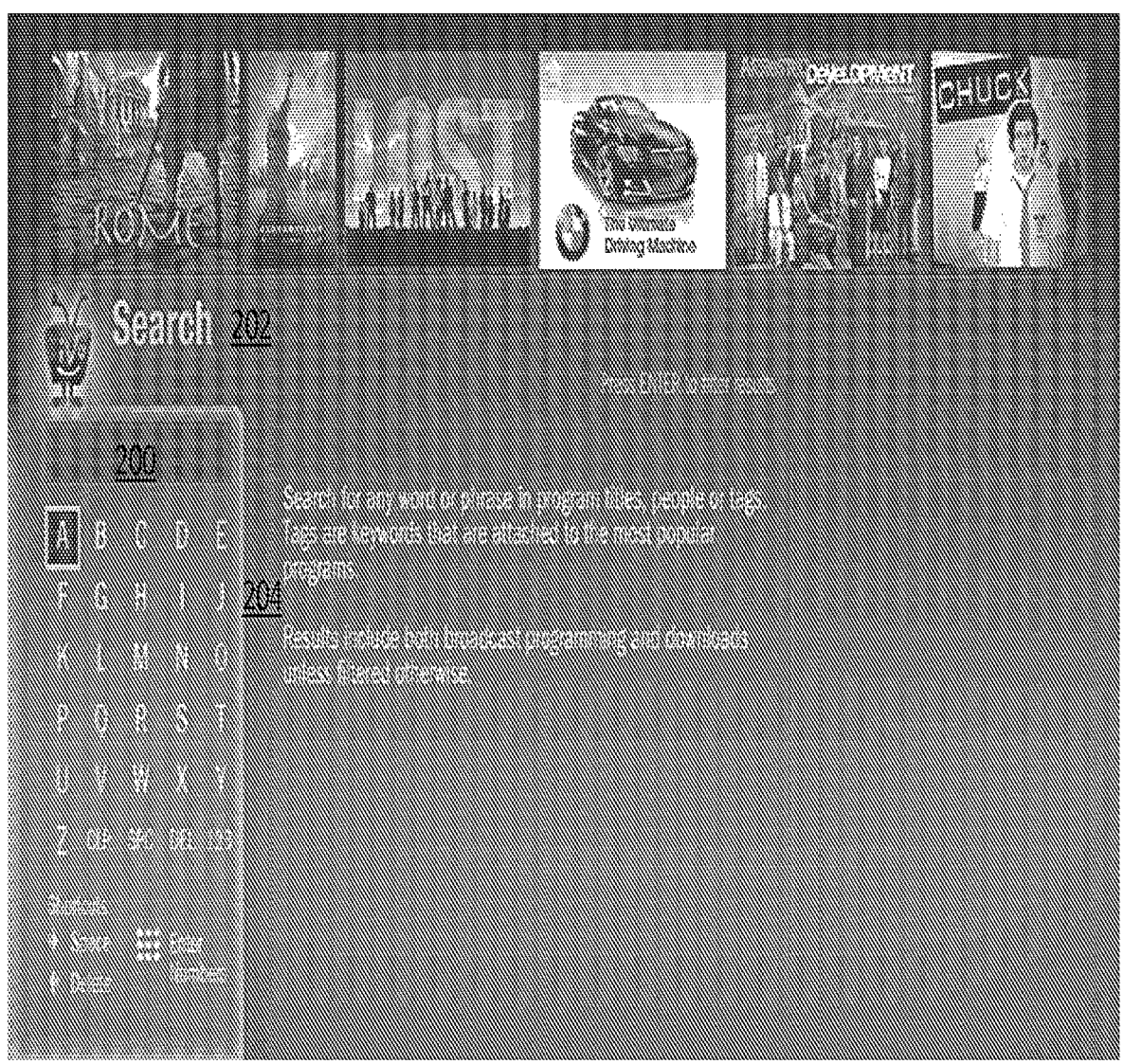
FIG. 2 illustrates an example of a DVR-presented "Search" screen on which to initiate a search for media content, according to an embodiment of the invention.

In an embodiment, a user may perform a search for media content, people, tags, or any other attributes associated with media content. The user begins a search as the client device (e.g., DVR 102) displays a search screen. The user may navigate to the search screen based upon command input from a user. An example of the search screen is shown in FIG. 2 that allows for the search of a word or phrase that corresponds to program data. In FIG. 2, the search screen is labeled, "Search" 202, however, this label may vary from implementation to implementation. A user commences a search by submitting alphanumeric characters or symbols using a soft keyboard 204 that correspond to a particular search term with which the user is interested. In another embodiment, user input may be entered by various user input devices such as, but not limited to, a keyboard (IR, external USB, or built on top of the DVR), a remote device, or a pointing device.

In an embodiment, program data comprises program titles, people, tags, and metadata. In another embodiment, other categories of search criteria are included or excluded based upon the services offered by the service or its partners and the availability of searchable data. As used herein, a "program title" refers to, but is not limited to, the title of a television show, movie, downloadable content, or any other viewable content available, to the user. This may include, but is not limited to, content that is available via broadcast, cable or satellite, content that is on-demand, content that may be downloaded for free, downloaded for purchase, downloadable content for rent (content that may only be viewed for a limited time), or streamed content. As used herein, the term, "people," may be used to refer to any individual or character that may appear, or is involved in the production, of any available content. These may include, but is not limited to, actors, writers, directors, character names, or producers. An alternative term that may also be used in place of people may be "credits." The term, "tags," as used herein, refers to a set of words, pictures or other media that may be associated or related to one or more particular media content. Examples of tags may be, but are not limited to, locations in which the content is set, genres to which the content belongs, or the subject matter associated with the content. The term "metadata," as used herein, may refer to any program metadata including description, genre, episode, original airdate, or any data that may, in any way, refer to the program or a description or category of the program.

Figure 3:
FIG. 3 illustrates an example of a DVR-presented "Search" screen after entering three letters for a search, according to an embodiment of the invention.

To initiate the search for program titles, people, or tags, the user enters alphanumeric characters or symbols for the program title, person, or tag that the user wishes to query in search box 200. In an embodiment, as alphanumeric characters or symbols are entered in the search box, search results appear that conform to the alphanumeric characters or symbols entered, as shown in FIG. 3. For example, if the user enters the alphanumeric characters "H," "O," and "W," then the search application would return results that include the download "Howcast" 302, actor/director "Ron Howard" 304, series "How I Met Your Mother" 306, and non-episodic/movie "How to Lose a Guy in Ten Days" 310. In an embodiment, the search system differentiates the different types of media content presented by placing a graphical indication of the media content in proximity to the name of the media content. For example, next to actor/director "Ron Howard" 304 is a graphical indicator of a person (a silhouette of a person) 320. A unique graphical indicator may be shown for each type of media content. In another example, a musical note graphic might be placed next to a song to indicate that the media content is a song, or a download graphic might be placed next to content that is available via download. Other graphical indicators, or icons, may be used to indicate a particular content is a music video or a tag, or from a specific provider such as Netflix or YouTube. As the user enters the query in the query search box, this query is transferred from the client to a server which returns the search results for display by the client. In an embodiment, some search results may be cached on the client from data from the server to minimize data transfer in cases of repeated search queries. In addition, if a connection is unavailable between the client and the server, then the search application may not be available to the user. In other embodiments, a set of popular search results may be cached on the client from data from the server so that searches may be performed of popular content at the client when a connection to the server is unavailable.

As more alphanumeric characters are entered, the results of the search are correspondingly narrowed. For example, the alphanumeric characters "[space]" and "I," might be added to the alphanumeric characters "HOW" that were entered previously. This makes the search query term "HOW I." Under this circumstance, the television series "How I Met Your Mother" 306 would remain. However, actor/director "Ron Howard" 304, download "Howcast" 302, and movie "How to Lose a Guy in Ten Days" 310 would be removed because each of these entries do not contain the search query alphanumeric characters "HOW I."

In an embodiment, the results displayed do not begin with the alphanumeric characters that are entered by the user, but merely contain the alphanumeric characters somewhere within the search result. For example, if a user enters the alphanumeric characters "ERI", then in addition to the result "ERIN BROCKOVICH", that begins with "ERI," other results that merely contain the alphanumeric characters "ERI" would also appear. For example, another search result that might appear would be "AMERICAN IDOL."

Search Results Do Not Match Letters Entered

In an embodiment, the search query entry letters entered are not contained in the search result but are associated with the search result in some manner. This may occur by entering an acronym of the television series title. For example, a user might enter the search letters "OLTL" that corresponds to the first letter of each word of the soap opera series "One Life To Live." The alphanumeric characters entered may also not conform exactly to the acronym of the title or may include symbols. For example, the user might enter the search term "Y&R" for the soap opera series "Young and Restless." In another example, advertising tag lines might be entered. For example, a user might enter the search letters "T2" upon a search for "Terminator 2: Judgment Day" and "T3" for the movie, "Terminator 3". Upon these circumstances, the search system is able to return possible search results that do not correspond to letters in the title but to groups of letters that are associated in some way to the title of programming content.

In an embodiment, words for numbers may also return the same results as if the user submitted the number in the search box. For example, the user may be interested in the movie "12 Monkeys." The search system will return the probable result "12 Monkeys" whether the user enters "TWELVE" or "12." In another embodiment, numbers may also be substituted for the equivalent word. For example, a user might be interested in the movie "Seven." The possible search result will be returned if the user enters "7" or "SEVEN".

In an embodiment, a user may enter search query letters that correspond to words that are associated with programming content and the search system returns possible search results that are associated with the words. For example, a user might enter the search letters "ANIME" in order to search for Japanese animated series. Under this circumstance, results returned may include a tag entitled "animation" and then the two most popular Japanese animated series. In another embodiment, paid search advertisements may be shown that relate to the search query letters entered or words entered by the user. Under this circumstance, advertisers might pay to include the advertiser's content in the results that are related to a particular word entered. A user might enter the search term "car" to find content related to television programming about automobiles. Toyota might pay the service provider to display a link to content that promotes Toyota's new line of automobiles if the term "car" is entered by a user.

In another embodiment, rather than displaying search results that conform to all of the possible categories (people, program, and tags), a user selects a particular category in which to display possible results. For example, a user might limit search results to only people. Thus, when search results that conform to the alphanumeric characters of the search query that are entered by the user are displayed, the results that appear conform to the category "people" and to the alphanumeric characters entered for the search query. In other embodiments, multiple categories ("people" and "program titles") may be selected by the user for display.

In yet another embodiment, the search may be limited to exact matches. Under this circumstance, no search results that conform to the search query are shown as the search query is entered. Rather, once the user has entered the alphanumeric characters for the entire query, the user selects a submit button, or any other such signal to indicate that the search term is to be submitted, and results that conform to the search query are then shown. This may speed searches as results are not updated upon the entry of each alphanumeric character of the search.

Managing Adaptive Search Results

On television user interfaces, a user often does not have a full keyboard available. If the user only has a standard remote control in order to input characters, then a "soft" keyboard may be employed to enter alphanumeric characters. A soft keyboard, as used herein, is a keyboard that is listed on-screen. An example is shown in FIG. 2. A user must highlight and select each character in order to enter the character on-screen which is tedious. Minimizing the number of alphanumeric characters entered is important for a good user experience. Users may type the first few letters when searching for a particular show. The letters entered may not be the start of the title, or possibly even the start of any word in the title. Other users may enter alphanumeric characters for terms that relate to the media content interested.

In any case, listing probable search results sorted based only upon alphabetical listings may result in listings where relevant search results appear lower on the list of possible search results. When searching for a result in a large data set, providing sorting based upon relevancy on the possible results may make the search more efficient. For example, a user might enter the search letters "HOW" with the intention of finding the person "HOWARD STERN." If the list of possible results were alphabetical, then "HOWARD STERN" might be listed below entries for "HOW I MET YOUR MOTHER", "HOW TO LOSE A GUY IN 10 DAYS," and "RON HOWARD." To select "HOWARD STERN," a user would have to move the cursor down over the other entries in order to make the selection. If many users who entered "HOW" also selected "HOWARD STERN," then placing "HOWARD STERN" higher in the possible results would be more efficient. This efficiency is further improved if "HOWARD STERN" begins to appear when a user merely enters the letters "HO" or "H."

In an embodiment, a new search request is sent from the client to the server upon the client receiving each letter request from a user. Thus, a search is performed when "H" is entered. When a user enters "O" so that "HO" appears in the search box, a new search is sent from the client for the query "HO." In an embodiment, the search results of "HO" is a subset of the search results from "H" but the relevance rankings of each of the search results with respect to the query entered may be different. For example, users entering "HO" may most likely pick "HOWARD STERN" while those that enter "HOW" may most likely pick show "HOW I MET YOUR MOTHER", even though "HOWARD STERN" and "HOW I MET YOUR MOTHER" share the same three character prefix. In an embodiment, if two items have the same relevance ranking, then secondary sorting methods may be applied such as alphabetically, based on original air date, or any other criteria.

As the measure of relevancy improves, the desired answer will appear nearer to the top of the list of possible results. More accurate relevancy results in fewer letters required to be typed by the user and the desired results being found quicker. In an embodiment, all searches performed by users on the user interface are monitored and stored by a database. A correlation is stored between the one or more characters that are entered and the particular media content, person, or tag that is eventually selected by the user. Thus, using the example above, a correlation would be stored of "HOW" (the letters entered by the user) and "HOWARD STERN" (the result selected by the user). In an embodiment, "selection" may mean an action or receiving command input by the user to the DVR that shows interest in a particular media content. Various actions may be interpreted at different levels of interest, and have correspondingly different weights on the relevancy feedback algorithm. For example, receiving command input at the DVR of pausing to read rollover information demonstrates a minimal level of interest. Receiving command input to display the program details shows greater interest. Receiving command input to schedule a recording for the show even greater interest, and receiving command input to watch the recorded show later even more interest. By taken into account more granular information about the interest shown by a user to a particular media content, more accurate rankings may be determined for the search results.

In an embodiment, a matrix is generated with character prefixes. Each prefix contains an order of media content, persons, tags, or any other data associated with media content stored in the matrix, sorted by the popularity of users selecting or showing interest in a particular show upon entering that prefix. The results presented to the user are sorted so that the media content, person, or tag with the most selections made by users appears at the top of the list. Thus, as users select "HOWARD STERN" with more and more frequency when entering the letters "HOW," "HOWARD STERN" would rise in the rankings for the character prefix "HOW". In an embodiment, "HOWARD STERN" would also rise in the rankings for the character prefixes "HO" and "H" when a user selects "HOWARD STERN" when entering the letters "HOW." This would cause "HOWARD STERN" to appear higher as a user begins to enter "HOW" so that it is more likely that fewer letters may have to be entered by the user.

In an embodiment, the correlation matrix stores mappings for character prefixes of one, two, three, and more characters to the user selections. In an embodiment, as the user types, the most relevant matches for a given prefix are presented to the user. The results would be reordered upon entry of an additional letter. If there are insufficient matches to fill the screen, then a backup ordering based on existing search algorithms, including but not limited to, word prefix matching and alphabetical sorting would be used to fill the remainder of the results list after having satisfied as many entries as possible within the relevancy results.

In an embodiment, different scenarios of selections of items may affect relevance rankings of items in different ways. In this example, Pa(n) and Pb(n) are the number of picks or selections of item A or item B after n characters are received. If Pa(2)>Pb(2), but Pa(2)+Pa(3)<Pb(2)+Pb(3), item B is ranked higher than item A for both 2 and 3 character searches, as more users had to enter 3 characters to select item B than selected item A after 2 characters.

In another scenario, if Pa(2)>Pb(2), Pa(3)<Pb(3) and Pa(2)+Pa(3)>Pb(2)+Pb(3), then item A is ranked higher than item B for 2 character searches, but item B would be ranked higher than item A for 3 character searches, as users selected item A after 2 characters, but for the small number of users that entered 3 characters, the users selected item B. Finally, if Pa(2)>Pb(2) and Pa(3)>Pb(3), then item A would have a relevance ranking higher than item B for both 2 and 3 character searches. This is because, regardless of the number of characters entered, users selected item A more frequently.

In an embodiment, the correlation matrix is updated on a frequent basis based on selections made by users. The correlation matrix may be updated based upon a specified period, such as weekly, daily, or hourly. The correlation matrix may also be updated dynamically as each user enters a selection. The correlation matrix is then continually updated with the most relevant selections placed at the top of the possible results list. In order to remove stale results, or results or selections that have been made some time ago, results may be removed if the result is older than a specified period to account for newly popular shows not getting visibility due to older frequently searched programs. For example, results greater than 90 days old may be removed from matrix so that the correlations remain relevant. The specified period may change based upon the implementation.

Generating a correlation matrix and sorting the possible results list based at least upon the correlation matrix is able to respond quickly to changes in user preferences. As new user data of correlations of letters and selections is received, the correlation data is updated with the new data. Continually updating the matrix with new data from users as they make new selections and re-sorting the relevant the possible results list creates a feedback loop that keeps the most relevant selections at the top of the list using the most current data.

In an embodiment, newly available media content as possible search results may be first provided a neutral relevance ranking. When the rate of selection of the content is accounted, then the media content may be moved up or down the rankings.

There are several methods by which a newly implemented system may have relevancy rankings considered. In an embodiment, a newly implemented system may be seeded from historical selection rate data collected before relevancy ranking was enabled. In other embodiments, every item could be given an equal neutral relevancy score at the start. After some time, users would select some items more than other and a useful ranking would naturally emerge. In another embodiment, relevancy rankings may be randomly assigned, and then users select items to improve the ranking scores. However, this method may create strange results initially as unpopular items may be ranked highly. Over time, rankings would improve as the ranking of items that were randomly assigned too high would decrease, and the rankings of items randomly assigned too low would increase.

In an embodiment, a measure of the rate of change of shows popularity or recent frequency of user selection should be used to adjust the raw popularity score up or down in the relevancy ranking. By measuring the rate of change, and including the rate of change as a criterion for ranking possible search results, newly popular shows or media content might be placed high is the results list.

In an embodiment, results may be moved quickly up or down a set of results based upon the change in selection or click rates that occur. This indicates when a show or series is "hot", and many people begin selecting the show after a period of relative stability in selecting. This may occur, for example, with annual broadcasts of award shows, such as the Academy Awards. Generally, a user may not select the result of "Academy Awards" until the air date of the broadcast is relatively close, such as late February or mid-March of any given year. After a period where little user selections are made of the Academy Awards, more and more users begin selecting the Academy Awards when the airdate approaches. The result "Academy Awards" will move up the results list because of the increased selecting. The change in selection or click rates may increase the movement of the "Academy Awards" even more as this indicates that the show is "hot" and popularity is increasing. There is a difference in the selection or click rates that indicate popularity, and a change in selection or click rates that indicate increasingly popularity. A popular show, such as "NCIS" may consistently have a high selection or click-through rate week to week but the selection or click-through rate itself may not change very much. This would indicate the show is popular. However, a show that occurs sporadically, may have a low selection or click-through rate through much or the year, but show a large change in selection or click-through rates in February and March as Oscar buzz increases. This change in selection or click-through rates shows increasing popularity and may indicate that the show should be moved up in the result rankings much more quickly.

The opposite may also hold true and a change in the negative direction may occur once the Academy Awards show is completed. A negative selection or click-through rate change may indicate a decreasing popularity or that the show is "cold" and be moved down the relevance rankings at a faster rate than warranted based upon only the selection or click-through rate.

In an embodiment, a relevancy matrix that is unique to each user is used. In a custom matrix, weighting the prefix to show mappings from users with similar thumbs ratings or who are listed as friends or guru guides of the user are weighed higher than those of the general population. This allows users in similar affinity groups to further refine the prefix to show mappings within their own groups without as much distortion from people with different interests. For examples, a user might enter the letters "HOU" as a prefix for a search term. Under this circumstance, one affinity group would map "Desperate Housewives" as the most popular while a different affinity group would map "House MD" as the most popular. By refining the user to specific group, more accurate and likely results would be displayed.

Affinity mappings are not limited to similar ratings on contents but may be grouped by other factors. In another embodiment, affinity mappings are made based upon demographic or geographic information.

Possible search results may also be affected by the time of year, time of day, or day of the week. For example, if a search is performed on a Friday evening, it might be more likely that the user is searching for a movie to watch. Under this circumstance, movies might appear higher in the possible search results than if the search was performed on a Tuesday afternoon. In another example, results for "sports" would have more sports that are in season placed higher in ranking. The results for "sports" in the fall would list football higher in the results as professional football is played in the fall.

In an embodiment, relevance feedback is not limited to user feedback from users of DVRs. Rather, feedback is considered from any possible source. For example, user feedback may be considered that originates from searches made on a website, a mobile communications device, or any other type of input device upon which searches may be performed.

In an embodiment, the service provider may sell feedback from users to third party entities who wish to use the data in the third party entity's search results. The service provider may aggregate data from all users and remove user identification data to ensure anonymity. Third party entities may then present more accurate results based at least partially on the data provided by the service provider. In an embodiment, the service provider may request that feedback from users of the third party entity be supplied to the service provider. The service provider may also provide data to the third part entity and not request any further data back from the third party entity.

Grouping Relevancy Search Results

In an embodiment, relevancy may apply to a cluster of content that share a common trait. This may be referred to herein as "group relevancy." For example, all content related to 'Star Trek' might be grouped together and treated as a group when relevancy sorting. When any of the relevancy group is a possible search result, all of the associated content in that group is included. Thus, when a Star Trek movie is a possible result, other content in the group "Star Trek" (old Star Trek series, old Star Trek movies, documentaries, etc) are also included in the possible search results. The grouping may be performed in a variety of methods and includes, but is not limited to, matching titles, matching additional metadata from a third-party source, connectors, connected by series. Also, a selection or determination of interest of a single content within a particular group would be determined as interest in the entire group. Grouping may be based on common traits such as, but not limited to, title, series, actors, director, writer, creator, genre, or tag. In an embodiment, the determination of contents within a particular group may not be automated, but instead be a manual process. This may be performed based upon third party descriptions or any other methods for finding similar content.

In an embodiment, when the grouping is performed, the items placed in the grouping are given the same relevancy ranking as the highest ranked item in the group. Thus, for example, if a search is performed for "Star Wars," then all of the other items that are grouped together with Star Wars are also given the same relevance ranking as the highest ranked of the Star Wars. If "Star Wars: The Empire Strikes Back" is the highest ranked item returned, the prequel "Star Wars: The Phantom Menace," featuring Jar Jar Binks would also obtain the same relevance ranking as "Star Wars: The Empire Strikes Back." In an embodiment, the items included in the grouping may be limited in order to ensure that only highly ranked items are included in the grouping. In an embodiment, groupings may be limited to items that reach a threshold ranking. In an embodiment, an item may be added to the grouping only if the item has a relevance score that is within a pre-determined threshold of the highest ranked item within the group. Limiting the number of groupings increases the diversity of the result set on the initial page of results. For example, a search query of "Star" may populate the entire first page with entries for "Star Wars" including less popular titles that are not relevant to most users. A user who is searching for "Star Trek" would have to navigate to a second page of results or add more letters to the search query. Limiting the groupings to increase diversity of results corrects this problem.

In an embodiment, groupings occur based upon an exact match of titles between the items that are placed in the groupings. In another embodiment, the match of titles may not be an exact match, but similar match of titles. In another embodiment, metadata other than titles are used to group items together. This may occur where a sequel to a particular movie may not have the same title as a predecessor. For example, the sequel to the movie "Mad Max" is "Road Warrior." Under this circumstance, other metadata, such as the lead actor, Mel Gibson, may be used to group these movies together. As another example, the sequels to the movie "First Blood" may or may not contain the terms "First" or "Blood." The sequels are "Rambo: First Blood Part II", "Rambo III", and the fourth movie "Rambo." If only titles were used to find groupings, then the third and fourth movie of the Rambo franchise would not appear within the grouping.

In an embodiment, groupings are only made of the highest ranked item in the relevancy list. In another embodiment, groupings are made of a pre-determined number of items that are the highest ranked. In yet another embodiment, every result is grouped based upon some criteria of the items.

In an embodiment, titles with an exact match are grouped together. This may occur as a result of an identification number given to media content by a third party. For example, a service provider may employ a third party entity in order to provide the service provider with information about programming content that is to be shown in an electronic programming guide, such as the Tribune Company. Each entry in the programming guide may be assigned an identification number by the third party entity that is used by the service provider to identify a particular episode or show. The service provider may also provide these shows to users through download or streaming through another third party content provider, such as Amazon. The third party content provider may assign an identification number to programming that may be downloaded. The identical content, one downloadable and the other available in the electronic programming guide to be broadcast may not be placed together in a result as the identification for the broadcast may be different than the identification number used for the download. Hence, by matching entries by an exact match of titles as well, identical content is grouped together for viewing and selection by a user.

In an embodiment, groupings may be made using any form of association of one particular media content to another media content. For example, associations that may be used to group content include, but is not limited to: matching titles, matching any type of metadata associated with the content (such as, by actors, writer, producer, etc.), or connectors. As used herein, a connector is an association made between two objects. For example, family members (e.g. the Kardashians) may be associated with other family members. In another example, if two actors were dating, an association may be made between the two actors. Connectors are not just limited to people but may be television programs connected to movies. For example, the show "Firefly" might be connected to the movie "Serenity" as the movie is a spinoff of the show. Similarly, shows or productions that originate from the same creator (e.g., all Joss Whedon shows, or all J. J. Abrams shows and movies) may also be connected together. Groupings may also be based upon a user feedback loop. For example, if users often select the same two shows based upon a common search term, then the two shows may be grouped together for other searches.

In an embodiment, a user may manually select how he wishes the search results to be grouped. For example, a user might indicate a preference that no groupings take place. A user might also indicate that grouping only occurs based upon particular criteria, such as by only matching titles or only matching metadata based upon the primary actor of the series. In another embodiment, grouping is performed automatically with no input from the user. Under this circumstance, the user is unable to change how the groupings occur and may be altered by the service provider at any time.

Preferences and Types in Displayed Search Results

In an embodiment, the search results shown are only of shows that are available to user, either through download, or broadcast on a channel that that is available to subscriber. In another embodiment, search results shown include shows that may be shown on channels that the user does not currently receive. For example, the result might include a show that is shown on a premium pay channel, such as the television series "Dexter" shown on Showtime. Under this circumstance, the user might be shown how to subscribe or other subscription options in order to gain access to the channel in order to view the show. In an embodiment, results of shows that are not currently available to the user may be placed in a section that is separate from results that are of programs that are available to the user. For example, a line may separate the shows that are currently available with the shows that are not currently available. In an embodiment, the shows that are not currently available may also be shown at the bottom of the results screen. In another embodiment, shows that are not currently available are mixed with the shows that are available and are shown in the same order as relevance. Under this circumstance, the shows that are not currently available may have a graphical icon to indicate that the show is not currently available. In addition, a program shortcut may be made to media content that is currently not available in order to obtain the media content in the future. Program shortcuts are further described in U.S. patent application Ser. No. 12/433,831 filed Apr. 30, 2009, and is incorporated by reference herein.

In an embodiment, matches that are not based upon the title may be included in a separate section below the relevant results. For example, a user may not recall the title of a particular show he is interested in but recall a term that may be in the program description of the program. A user might enter the term "Jack" as a start to the terms "Jack Bauer" (a character in the television series "24") because the user is unable to recall the show name "24". The show "24" may appear in an area separate and distinct from the relevant search results. The 1996 movie "Jack" starring Robin Williams as a character with an unusual aging disorder that ages him four times faster than a normal human, may be the first result in relevant results as the title matches the search term entered by the user. The appearance of results that match non-titles may appear below or in any other separate area from the relevant results, and be based upon any other matching criteria such as to any type of metadata associated with programming content (e.g., episode title, actors, character names, etc.).

In an embodiment, the alternate result set may be sorted in any number of ways. For example, the results may be shown sorted alphanumerically. As another example, the alternate results may also be sorted based upon relevancy or popularity. Any type of sorting technique may be employed with the alternate result set. Hybrid sorts may also be employed whereby a result set is first sorted based upon relevance, and then any programming content that has identical relevance scores are then sorted alphanumerically. In an embodiment, a user may indicate a preference on which type of sorting the user wishes the results to be shown.

In an embodiment, when a result set is shown, related video that is available via broadband download or web streaming is integrated with the relevance search results. For example, in a search for "Star Wars", fan videos that might be uploaded to the website, YouTube, may appear along with broadcast "Star Wars" programs and movies. In an embodiment, the web video content may be integrated with the other relevant content programming results in a variety of ways. In an embodiment, web video content may be shown based purely on relevance score and be shown within the results of other content programming. Web video content may have a graphical indicator shown in proximity to the title of the video content to indicate that the video content is streamed or downloaded from the World Wide Web. In an embodiment, web video content may be shown separate from the relevant results. Within the separate results, the web video content may be sorted based upon any criteria, including, but not limited to, alphanumeric order, or popularity that may be based on total downloads or downloads for a recent time period.

In an embodiment, a selection of viewing web video content may also affect the associated broadcast content. For example, if many users select a particular web video associated with the television show "Glee," then the popularity of the web video might also be used to increase the relevance of the underlying broadcast television show. The popularity of the associated web video may be considered in a variety of ways. For example, the number of selections to the associated web video may simply be counted as a selection to the underlying television show. The number of selections might also be added to the selections of the underlying associated broadcast content to increase the ranking of the broadcast content. In other embodiments, selections of web video content may not have any effect on the relevance of associated broadcast content.

Displaying Media Content Outside of Current Broadcast Window

In an embodiment, media content may be shown as search results that are not contained in the current broadcast window. Many electronic program guides may only contain information that is available for a certain period of time (e.g. the next 14 days of scheduled programming). Users may wish to view search results for programs that have been broadcast previously (historical data) and also for programs or movies that will be shown or broadcast in the future beyond the current broadcast window. For example, newly released movies will often be broadcast on a future date far beyond the 14 day currect broadcast window.

In an embodiment, historical data is available to users at a national level. Many service providers are nationwide providers that contain schedule data that are unique to regional areas. For example, in the San Francisco Bay Area, a television program may be regionally focused about the Napa Wine Country that may not be shown in other areas of the country. In order to maintain a database of historical data that is accessible and does not grow unwieldy with many regional shows that are not broadcast nationally, the service provider may limit historical data to only nationally broadcast television programming.

In another embodiment, the historical data may be available to users at a regional level. Under this circumstance, historical data is available to users based upon what has been broadcast to that particular area. Thus, national broadcast programming may be combined with regional programming specific to the region of the user in order to provide data to users of any show that has been broadcast to him previously. This may entail the service provider handling exponentially larger amounts of data than merely providing nationally-broadcast shows, but would present a more complete picture of total broadcasts that the user has received. For example, a television show about South Carolina may not have any relevance to viewers in South Dakota. However, for the service provider to provide complete schedule data nationwide, the service provider would still have to store and maintain the television show about South Carolina. In an embodiment, the service provider may limit the amount of regional shows stored as historical data. For example, news programs might be removed from historical data as news programs typically have no change in program information from one day to the next.

In an embodiment, not all metadata about the television program is stored as historical data. For example, the television program data stored may be limited to title, air date, and a brief description to also limit the amount of data that is stored. Other combinations of metadata maintained such as actors and genre tags may also be included or excluded depending upon the implementation. Based upon the data stored, the user may only perform a search based upon data that is available. For example, if the service provider has decided that actors will not be maintained with the television program in historical data, the user may search by title or program description but not be actor. Thus the search criteria available to a user will also vary from implementation to implementation.

In an embodiment, a persistent data object is stored for media content that is to be broadcast beyond the current broadcast window. A third party provider of scheduling data may assign identification data to a movie or annual sporting event well in advance of the actual broadcast of the movie or sporting event. In another embodiment, the identification number may also be assigned by the service provider or content providers. For example, a movie that is scheduled to be released in theaters one month from the present may be assigned by the third party schedule data provider an identification number in anticipation that the movie will be broadcast in the future. This would allow a user to view a newly released movie at a theater and set an alert or bookmark, to inform the user when that newly released movie is set to be broadcast within the current broadcast window. Other programming to which this may be applied include, but is not limited to, new Fall network programming upon announcement, future Super Bowls, future awards shows, and announced one-time sporting events such as a highly anticipated boxing match.

In an embodiment, the persistent data objects may be stored in a database separate from the schedule data. The separate database enables the service provider to keep distinct, programs that are to be shown further in the future. When a show or movie is scheduled and the show or movie is within the current broadcast window, the persistent data object may be transferred from the database specific to future schedule data. In an embodiment, the persistent data object is maintained when storing information as historical data.

Displaying and Selecting Sub-Genres

In an embodiment, search results that are displayed based upon a particular genre may be further discriminated by the sub-genre that a user prefers. For example, a user may be partial to horror films, but dislike horror films specifically about zombies. Under this circumstance, when search results are shown for this particular user upon a search for "horror", zombie films are excluded from the search results. The preferences of the user may be detected based upon the viewing habits and results of previous selections. The user may also explicitly specify that he does not like zombie movies.

Granting Higher Relevance Scores without Feedback

In an embodiment, content may be artificially granted a high relevance score. This may occur when a new television show is set to debut and there may be little chance for the television show to have any sort of relevance score. By granting a high relevance score, users may be able to find the show more easily for viewing. For example, a debut of a television show may be made artificially "hot" and placed at the highest relevancy rank for the two weeks prior to the television show's debut. In an embodiment, a service provider may initially provide new television shows with a boost in relevance scores so that the television shows may be found more easily by potential viewers. In an embodiment, a service provider may request financial consideration from a content provider in order to grant a high relevance score. A service provider may boost the relevance score of any existing show or movie as well. For example, a content provider may be trying to increase the audience for a flagging show by having exciting guest stars and to increase the visibility of the show, the content provider may sponsor the show to appear higher in relevance rankings.

In an embodiment, sponsored shows may be displayed in a separate section from the rest of the relevance ranked content in order to delineate that financial consideration was accepted for the show to appear so high. A service provider might also place a graphical indicator near the title of the new show to indicate that the program ranking is high due to sponsorship.

3.2 User Interface

In an embodiment, the user interface may be a three column format in which a selection may be highlighted on the center column, and then information that appears based upon that selection appears on the right column. However, any term may be used that unambiguously describes the right area of the screen. For example, when the cursor is over "How I Met Your Mother," on the center column, then information about the show "How I Met Your Mother" is shown on the right column. The structure of the user interface may vary from implementation to implementation. For example, as data related to the content might be displayed in the left column and content related to the selected data might be displayed in the right column. In other embodiments, there may be greater than three columns with further information about the show included in the additional columns.

Figure 4:
FIG. 4 illustrates an example of a DVR-presented "Search" screen upon highlighting an episodic television series from one of the possible search results, according to an embodiment of the invention.

In an embodiment, the user moves the highlight bar over a particular media content and information and terms about the content may be shown on the column at the right area of the screen. The soft keyboard and the search box remain on the left side of the screen and may be modified at any time. An example of selecting a particular media content is shown in FIG. 4 as the cursor is placed over the content television series "How I Met Your Mother" 402. The right area of the screen displays information and terms about the television series "How I Met Your Mother". The information displayed after a selection is made of media content varies based upon the type of media content selected. FIGS. 4-12 display examples of possible data that may be shown based upon a highlighting a particular media content type.

In FIG. 4, an episodic television series is selected. Each type of media content, including an episodic television series, may present some unique information that other types of media content may not display. For the television series "How I Met Your Mother" 402, the genre of the series (sitcom) and the rating (TV-PG) 404 is displayed. An image 406 may be shown of cast members of the television series. In other embodiments, the image may be the cast, the logo of the television series, or a combination of the cast and logo for easier recognition. The names of the members of the cast and possibly the director, writer, or creator 408 may also be displayed. A graphical indication 412 may be shown to indicate that the show is available in high-definition. Availability 410 is also displayed that informs the user that the television series is available to record or purchase from downloading. In an embodiment, availability may include a variety of formats including, but not limited to, watch now, record, rent, purchase, pre-order, or download for free. A graphical indicator may also indicate that the media content is available including downloading through Amazon.com, streaming through Netflix, or via network television broadcast. In another embodiment, the graphical indicator indicates that the content is available from a variety of sources, including broadband partners or via network television. An indication may also be shown to indicate that the episode is airing for the first time (through a "new" icon) or that the episode is only available for a limited period of time (a "going away soon" icon) because the availability of a download is ending. Other types of data may also be displayed, such as, but not limited to, program metadata of the content including program description, duration, tags, etc. The placement and selection of which data is displayed may vary from implementation to implementation. In another embodiment, placement or selection of the data may be a defined by the user.

Figure 5:
FIG. 5 illustrates an example of a DVR-presented "Search" screen upon highlighting a non-episodic television program/movie from one of the possible search results, according to an embodiment of the invention.

In FIG. 5, the non-episodic show or movie named "How to Lose a Guy in 10 Days" is selected. For the movie "How to Lose a Guy in 10 Days", the genre of the movie (comedy), the Motion Picture Association of America (MPAA) rating (PG-13) 506, is displayed. An image 504 may be shown of the movie poster or a still from the movie. The names of the members of the cast and possibly the director, writer, or creator may also be displayed. A graphical indication may be shown to indicate that the show is available in high-definition. Availability 508 is also displayed that informs the user that the television series is available to for purchase from online downloading. In an embodiment, availability may include a variety of formats including, but not limited to, watch now, record, rent, purchase, pre-order, or download for free. In another embodiment, a graphical indicator indicates that the content is available from a variety of sources, including broadband partners or via network television. Other types of data may also be displayed, such as, but not limited to, program metadata of the content including program description, duration, tags, etc. The placement and selection of which data is displayed may vary from implementation to implementation. In another embodiment, placement or selection of the data may be a defined by the user.

Figure 6:
FIG. 6 illustrates an example of a DVR-presented "Search" screen upon highlighting a person from one of the possible search results, according to an embodiment of the invention.

In FIG. 6, the actor/director "Ron Howard" 602 is selected. The person's different roles 606 are shown. For Ron Howard, this includes Actor, Writer, Director, and Producer. Credits 608 are also shown that the person has performed or appeared. For Ron Howard, this includes, "Happy Days," "The DaVinci Code," "A Beautiful Mind," "Arrested Development," and "Curious George." An image 604 of the person is also shown, if available. Alternatively, an image may be shown of media content on which the person has been featured. Other types of data may also be displayed, such as, but not limited to, date and location of birth, biographical stories, astrological sign, links to fan clubs, etc. The placement and selection of which data is displayed may vary from implementation to implementation. In another embodiment, placement or selection of the data may be a defined by the user.

Figure 7:
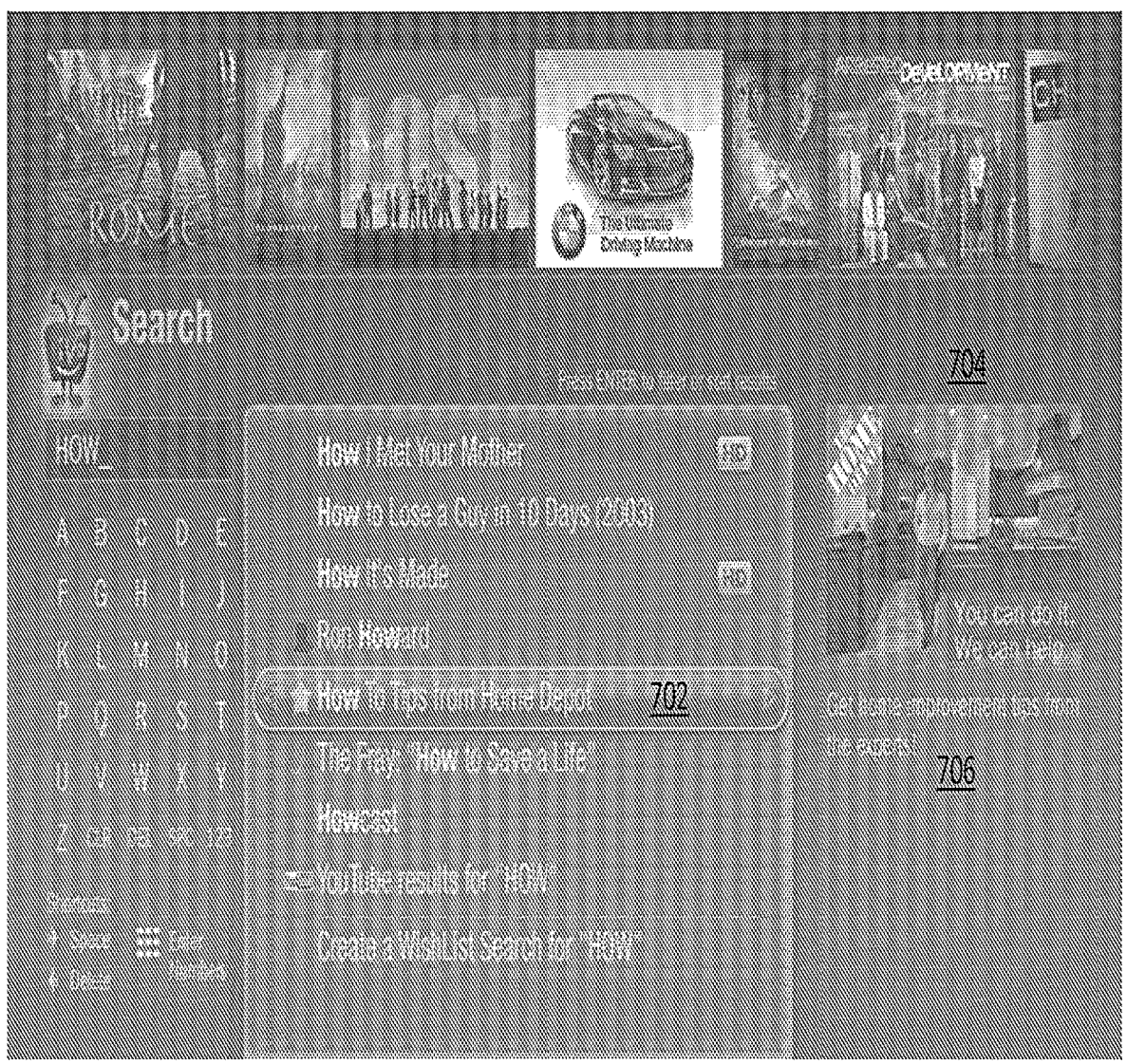
FIG. 7 illustrates an example of a DVR-presented "Search" screen upon highlighting a third party advertisement or showcase from one of the possible search results, according to an embodiment of the invention.

FIG. 7 displays an example of information shown when a third party content/advertisement, or showcase, is highlighted by the user. In this example, the user selected the third party content, "How To Tips from Home Depot" 702. To indicate that the selection is a third party content, or showcase, a graphical indicator (the star to the left of the name of the media content) may also be displayed. An image 704 provided by the third party is also shown, if available. A small text 706 may be included that describes what the content contains may be shown on the right area of the screen. In other embodiments, a small video may be shown in place of the image. In another embodiment, a graphical indicator indicates that the content is available from a variety of sources, including broadband partners or via network television. Other types of data may also be displayed, such as, but not limited to, metadata of the content including program description, duration, tags, etc. The placement and selection of which data is displayed may vary from implementation to implementation. In another embodiment, placement or selection of the data may be a defined by the user.

Figure 8:
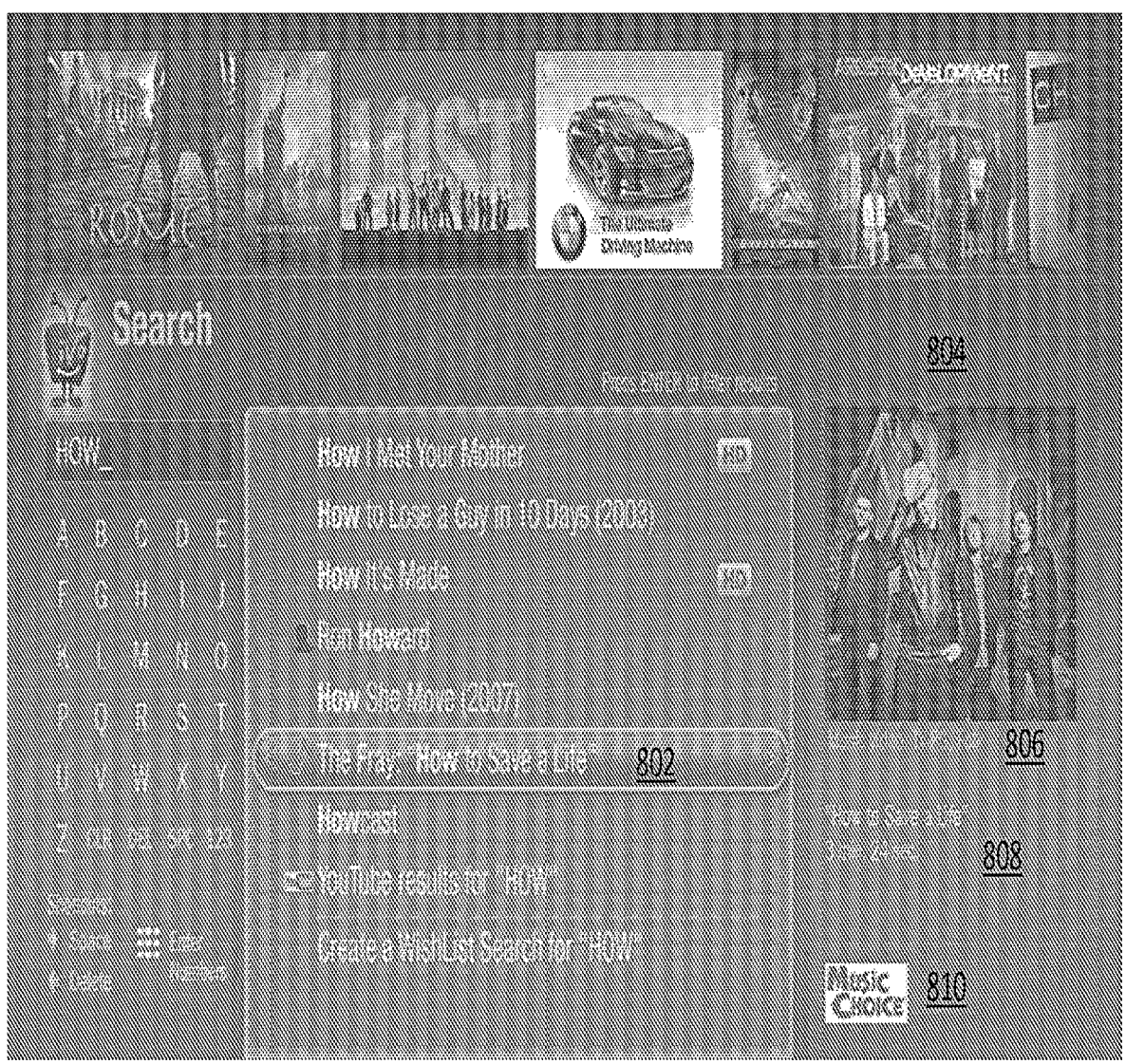
FIG. 8 illustrates an example of a DVR-presented "Search" screen upon highlighting a song from one of the possible search results, according to an embodiment of the invention.

FIG. 8 displays an example of information shown when content available for a song or music video is highlighted by the user. In this example, the user selected the content, "The Fray: 'How to Save a Life'" 802. An image 804 that displays the band is shown, if available. In another embodiment, images of the band, album, record, etc. may be shown instead or in addition to image 804. The genre of the music video (Folk) and a rating (TV-PG) 806, if available, are displayed. Text 808 may be included that describes the content available may be shown on the right area of the screen as well as the length of the content. A graphical indicator indicating that the content is a music video and the source of the content 810 may also be displayed. In an embodiment, availability may include a variety of formats including, but not limited to, watch now, record, rent, purchase, pre-order, or download for free. In another embodiment, a graphical indicator indicates that the content is available from a variety of sources, including broadband partners or via network television. Other types of data may also be displayed, such as, but not limited to, metadata of the content including description, duration, tags, etc. The placement and selection of which data is displayed may vary from implementation to implementation. In another embodiment, placement or selection of the data may be a defined by the user.

Figure 9:
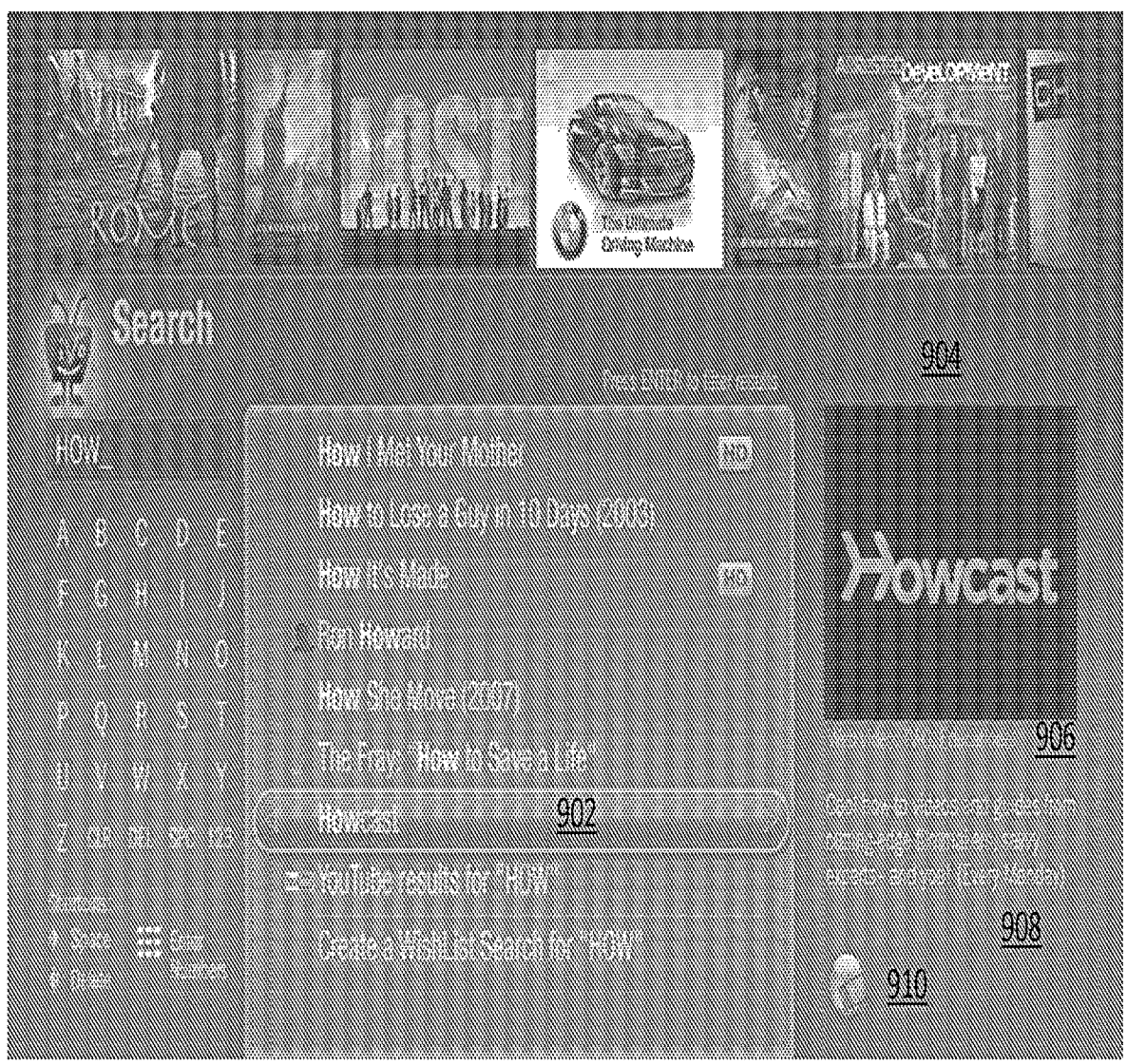
FIG. 9 illustrates an example of a DVR-presented "Search" screen upon highlighting a downloadable content from one of the possible search results, according to an embodiment of the invention.

FIG. 9 displays an example of information shown when content available from a web video provider is highlighted by the user. In this example, the user selected the content, "Howcast" 902. An image 904 related to the content is shown, if available. The genre of the web video (educational) and a rating (TV-G) 906, if available, are displayed. Text 908 may be included that describes the content available may be shown on the right area of the screen. A graphical indicator 910 indicating that the content is web video may also be displayed. In an embodiment, availability may include a variety of formats including, but not limited to, watch now, record, rent, purchase, pre-order, or download for free. In another embodiment, a graphical indicator indicates that the content is available from a variety of sources, including broadband partners. Other types of data may also be displayed, such as, but not limited to, metadata of the content including description, duration, tags, etc. The placement and selection of which data is displayed may vary from implementation to implementation. In another embodiment, placement or selection of the data may be a defined by the user.

Figure 10:
FIG. 10 illustrates an example of a DVR-presented "Search" screen upon highlighting a tag from one of the possible search results, according to an embodiment of the invention.

FIG. 10 displays an example of information shown when a tag is highlighted by the user. In this example, the user selected the tag, "HOW-TO" 1002. Next to the name of the media content may be a graphical indicator indicating that the selection is a tag. In an embodiment, the information displayed to the right is content associated with the tag. The information may be displayed in the form of images 1004 of the content that may include a movie poster or an image of a screen shot of the content. In FIG. 10, an image of the movie poster for "In Good Company" is shown as well as a critic rating of the movie 1006. The image shown may be the most viewed media content or be selected by any other criteria (most relevant, most votes, etc.). The background may contain other images media content that is associated with the tag. The background images may be rotated to the front periodically or when selected by the user. In other embodiments, a list of the media content is shown rather than images of the media content. The images of media content may also be shown in a grid so that the user may view all associated media content at once. Other types of data may also be displayed, such as, but not limited to, the count of the programs that match the tag. The placement and selection of which data is displayed may vary from implementation to implementation. In another embodiment, placement or selection of the data may be a defined by the user.

Figure 11:
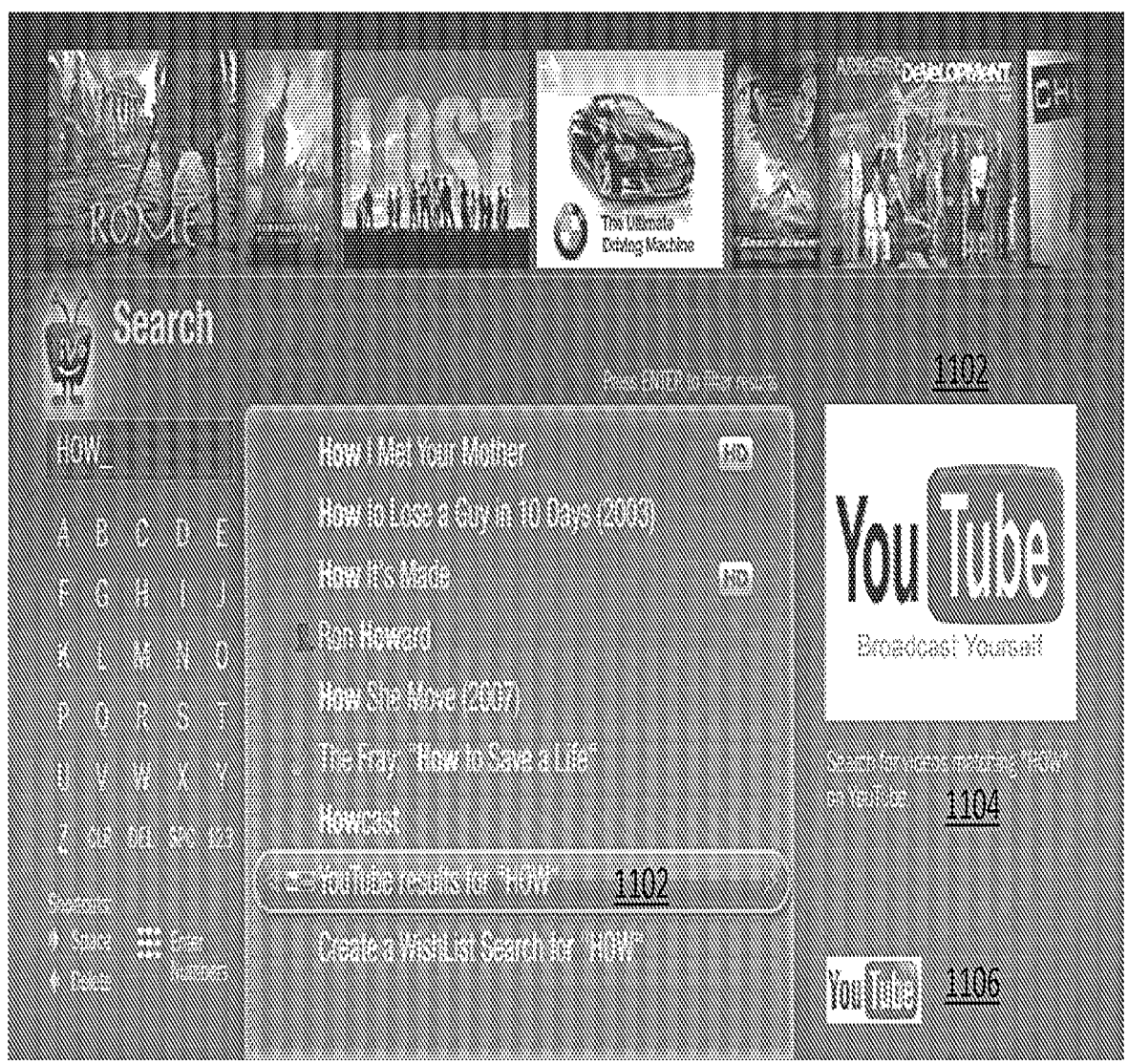
FIG. 11 illustrates an example of a DVR-presented "Search" screen upon highlighting the selection for "YouTube Results" from one of the possible search results, according to an embodiment of the invention.

FIG. 11 displays an example of information shown when the option to search YouTube 1102 is highlighted by the user. If this option is selected, then a search of the video website, YouTube, is performed that uses the search term entered by the user in the search box and the results from YouTube are shown to the user. The user may then select one of the YouTube results for download and viewing. In FIG. 11, a search in YouTube would be performed with the search term of "HOW" and a list of results based upon the search term "HOW" is returned to the user. On the right, an image 1102 indicating a YouTube search is displayed. A text description 1104 that a search is being made for videos that match "HOW" is shown. A graphical indicator 1106 may also be shown to indicate the site where the search may occur. Thus, other video sites may also be searched in addition to YouTube. The placement and selection of which data is displayed may vary from implementation to implementation. In another embodiment, placement or selection of the data may be a defined by the user.

Figure 12:
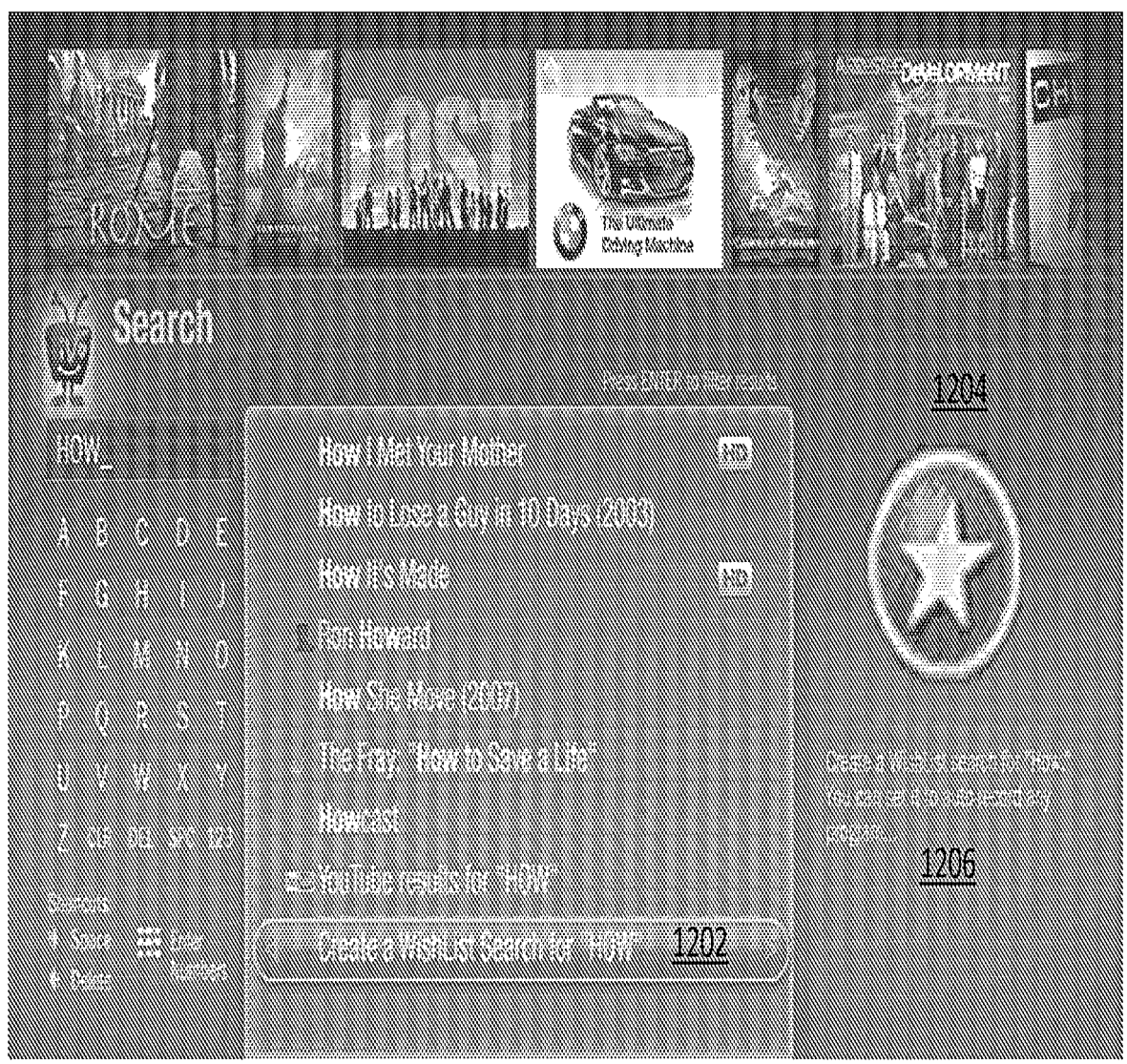
FIG. 12 illustrates an example of a DVR-presented "Search" screen upon highlighting the selection for "Wishlist" from one of the possible search results, according to an embodiment of the invention.

FIG. 12 displays an example of information shown when the Wishlist option 1202 is highlighted by the user. The Wishlist allows a user to select a particular media content, a movie, an entire series, or a particular episode of a series that is currently not available either by download or broadcast. When media content on the Wishlist becomes available in the future, the media content will be recorded or downloaded and made available to the user. The image 1204 shown on the right side of the screen is the graphic associated with initiating a Wishlist. Text 1206 may describe the action to be undertaken by selecting this particular action. In this case, a Wishlist search for "HOW" would begin. The placement and selection of which data is displayed may vary from implementation to implementation. In another embodiment, placement or selection of the data may be a defined by the user.

Figure 13:
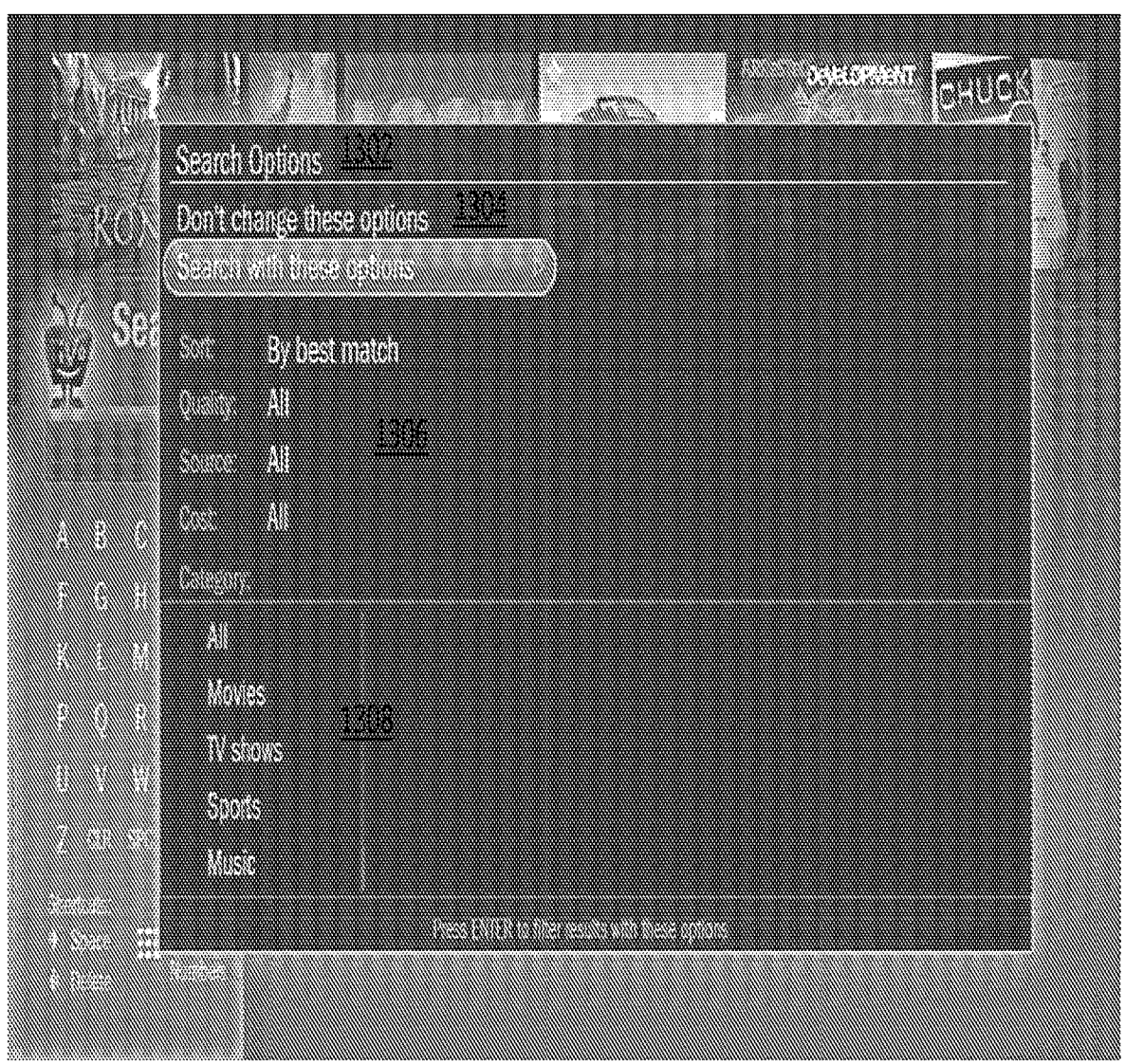
FIG. 13 illustrates an example of a DVR-presented screen that displays search options that may be updated for a search, according to an embodiment of the invention.

FIG. 13 is an example of a DVR generated screen if the user wishes to input particular search options 1302 for a search. A variety of criteria may be adjusted by the user depending on the type of search desired and to obtain the best results. For example, a user may wish to sort by various criteria such as best match, by newest matches, by length of the media content, and any of a variety of additional methods. The search results may also be filtered based upon the quality, source, and cost of the media content 1306. Search results may also be filtered based upon the category 1308 of the media content. The user may include and exclude particular media content if the media content belongs to a certain category. Any other criteria may be used to filter or sort search results and the options shown are just an illustration of possible criteria that may be used. The user, once selections are made, has the option to confirm or cancel any of the changes made 1304.

The information available to be shown once a media content is selected varies based on the type of media content. An example of the types of information shown for an episodic television series is shown in FIGS. 14-19. The categories of information that may be selected is shown on the left side of the screen as may be seen in FIG. 14. Among some of the categories are Details, Upcoming (for upcoming episodes), Episode Guide, etc. 1404. When a category is highlighted, additional information associated with the category selected is shown on the right side of the screen. At the top of the screen, the name of the media content, in this case "How I Met Your Mother" 1402 is shown along with the thumb rating (which may be from user himself) and star rating (by third party editorial content) of the series. The thumb rating based upon responses from the community of users may also be displayed in another area of the screen.

Display of Season and Episode Number

For the series "How I Met Your Mother," a user may highlight the selection for Episode Guide 1406. In an embodiment, a season number and episode number of an episodic television series is displayed. The season number and episode number may be derived from a content provider or a third party provider of electronic program guide information. The season number and episode number may be explicitly denoted in the information sent to the service provider. The season number and episode number may also be derived based upon information provided by third parties. If information from providers conflicts, then calculation of the season and episode may need to be performed manually.

The season number and the episode number allow users to perform specific actions directed to a specific season or a specific episode. For example, a user might wish to record only a specific season of a show. This might occur where a user becomes interested in a television show that is already in the third season but has not yet viewed any episodes of the show. The user might wish to begin watching the show from the beginning and so request to record or download all episodes from season one of the show. When the user is finished with all season one episodes, the user might next request all episodes from season two of the show. These actions are only available when the data for the season and episode are available for a particular series.

Figure 14:
FIG. 14 illustrates an example of a DVR-presented screen that displays information for an episodic television series based upon seasons and episodes, according to an embodiment of the invention.

An example of Season and Episode numbers is displayed in FIG. 14. The user has the option to view each of the episodes based upon the season 1408. The user may select seasons one through five. The user may also select to purchase all episodes of a particular season or select individual episodes for purchase. In FIG. 14, season 1 episode 1 is entitled "Pilot" 1410. Season 1, episode 2 is entitled "Purple Giraffe" 1412, and Season 1, episode 3 is entitled "Sweet Taste of Liberty" 1414. For further information about a particular episode, the user may select any of the episodes shown.

Other Information for an Episodic Series

Figure 15:
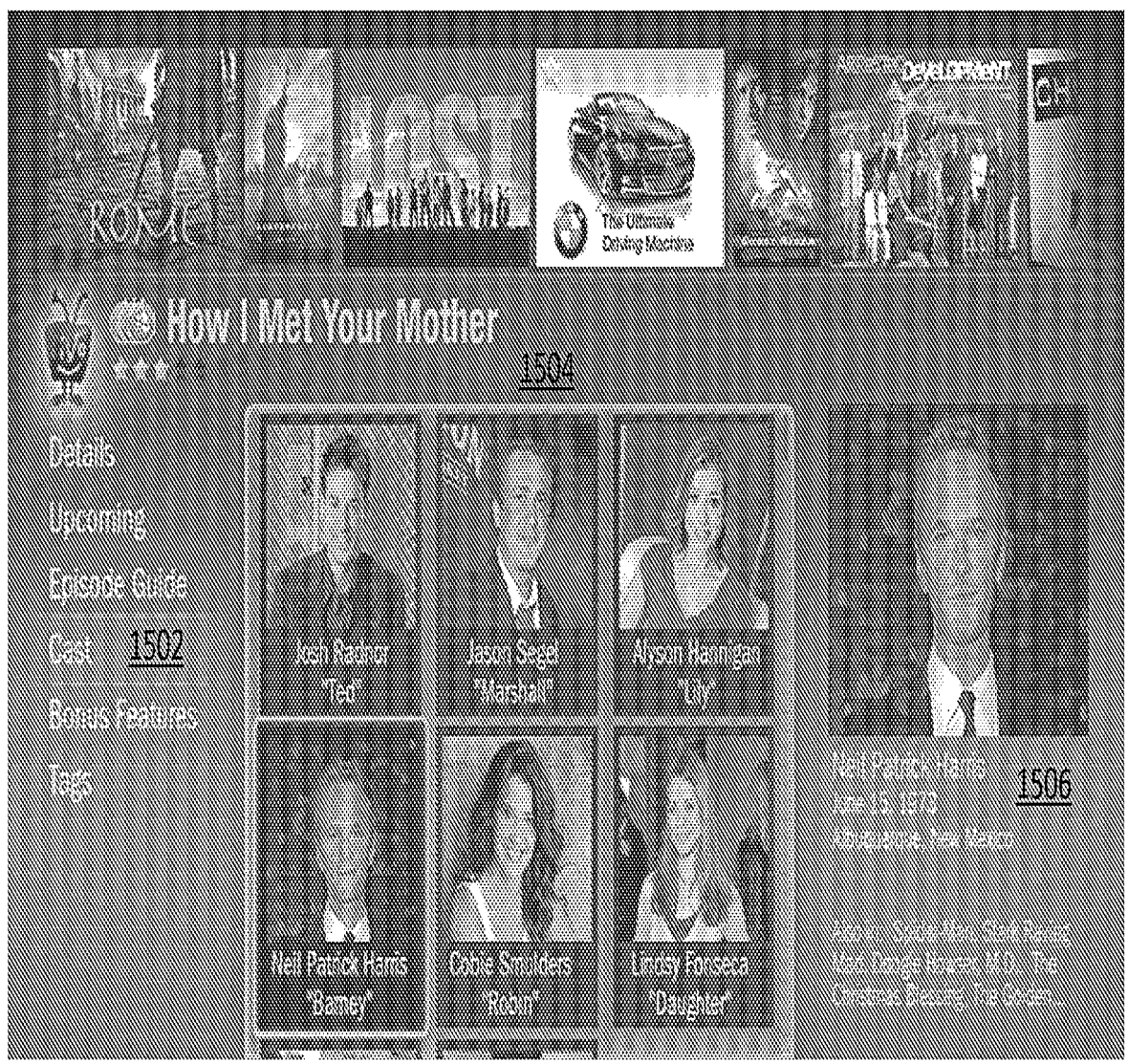
FIG. 15 illustrates an example of a DVR-presented screen that displays cast data for an episodic television series, according to an embodiment of the invention.

FIG. 15 shows a DVR-generated screen when a user has highlighted the "Cast" category 1502 for the series "How I Met Your Mother." Each of the members of the cast may have images 1504 shown with text displaying the name of the actor/actress and the name of the character in the series. When a cast member is highlighted, more detailed information is shown on the right side of the screen. For example, Neil Patrick Harris 1506 is selected to display a larger image of the actor on the right side of the screen, with more personal information displayed including birthday, home town, and media content where he had roles.

Figure 16:
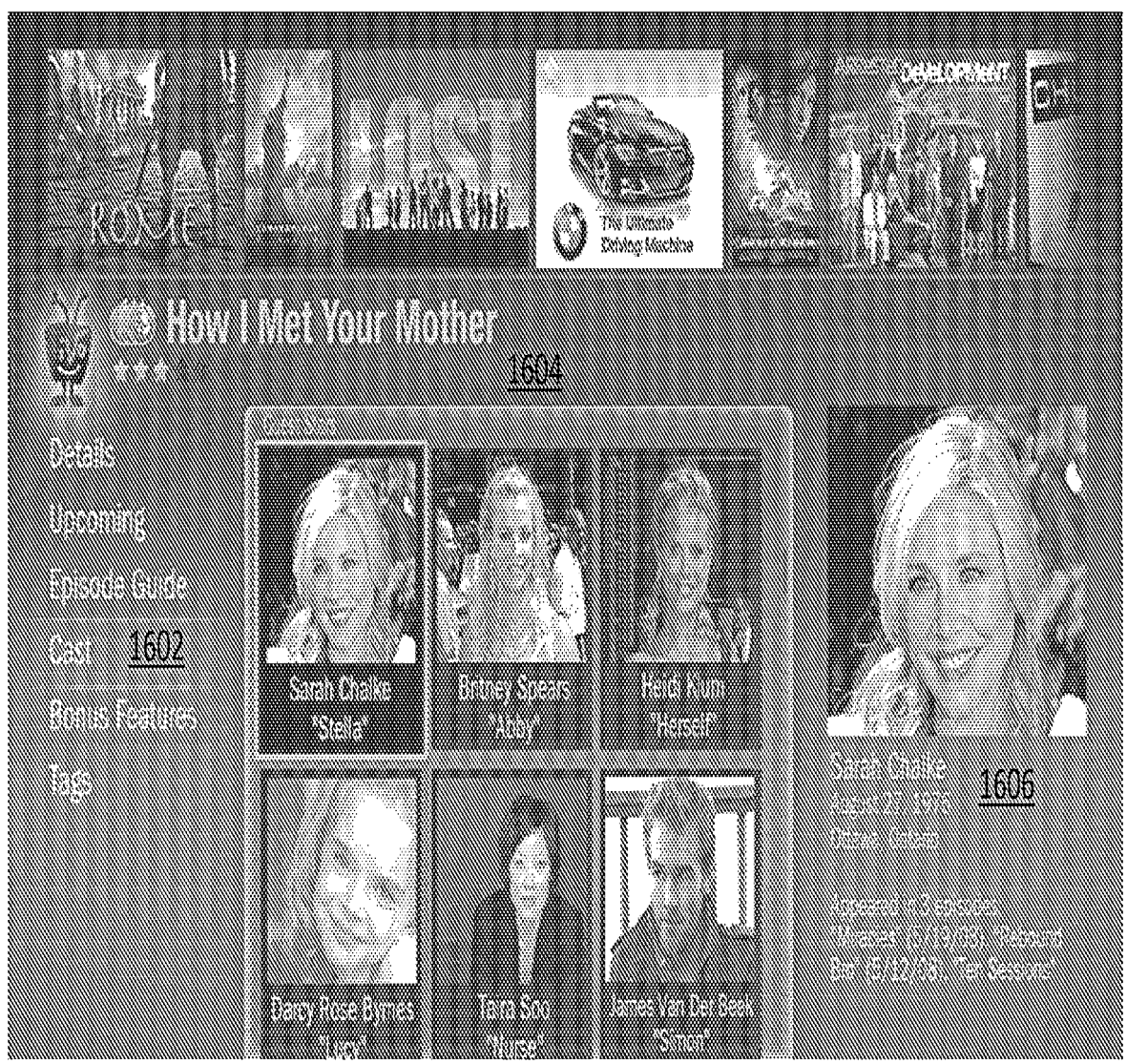
FIG. 16 illustrates an example of a DVR-presented screen that displays data of guest stars for an episodic television series, according to an embodiment of the invention.

FIG. 16 shows a DVR-generated screen when a user has highlighted the "Cast" category 1602 for the series "How I Met Your Mother." In this case, the user is still viewing the images from the cast but has scrolled down further in the screen to display guest stars. In another embodiment, the user may select to view only guest stars of the series rather than regular cast members. Each of the guest stars may have images 1604 shown with text displaying the name of the actor/actress and the name of the character in the series. When a guest star is highlighted, more detailed information is shown on the right side of the screen. For example, Sarah Chalk 1606 is selected to display a larger image of the actress on the right side of the screen, with more personal information displayed including birthday, home town, and media content where she also has had roles. The title or episode number and season number of the episode that the guest star was featured may also be displayed.

Figure 17:
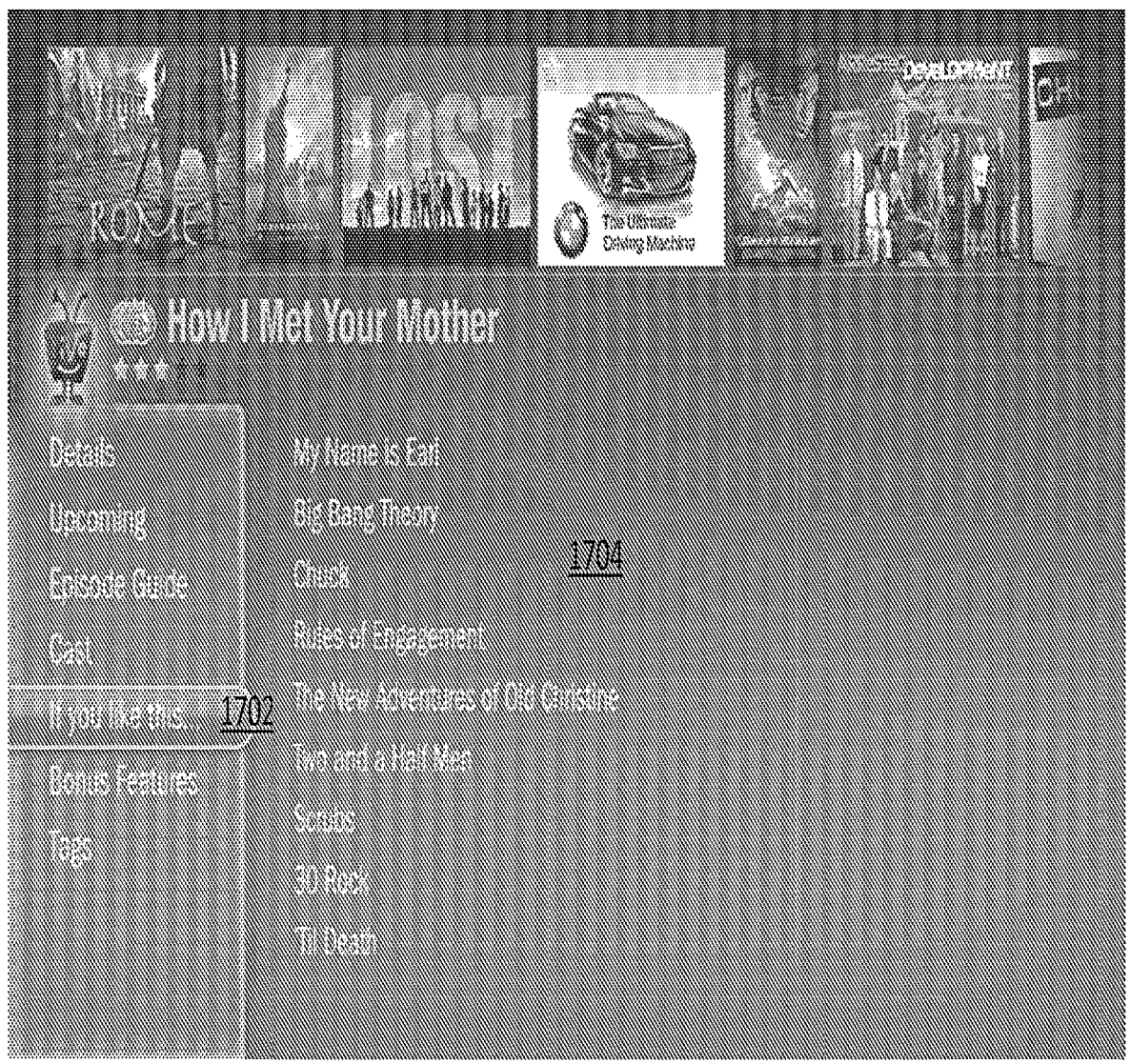
FIG. 17 illustrates an example of a DVR-presented screen that displays data of related media content for an episodic television series, according to an embodiment of the invention.

FIG. 17 displays a DVR-generated screen when a user has highlighted the "If you like this . . . " category 1702 for the series "How I Met Your Mother." Upon this selection, a number of media content 1704 is shown on in the middle of the screen. These may be other series that are related to "How I Met Your Mother", match genres, show a correlation of ratings between users, or have similar subject matter. Any other type of criteria may also be used to show a relation between media contents. From this screen, the user may select other similar series' to record or view. In another embodiment, the list of related content may be shown as a text list or as a grid with thumbnail images. The type of view may be selected by the user. In other embodiment, the type of view is controlled by the service provider and may vary from implementation to implementation.

Figure 18:
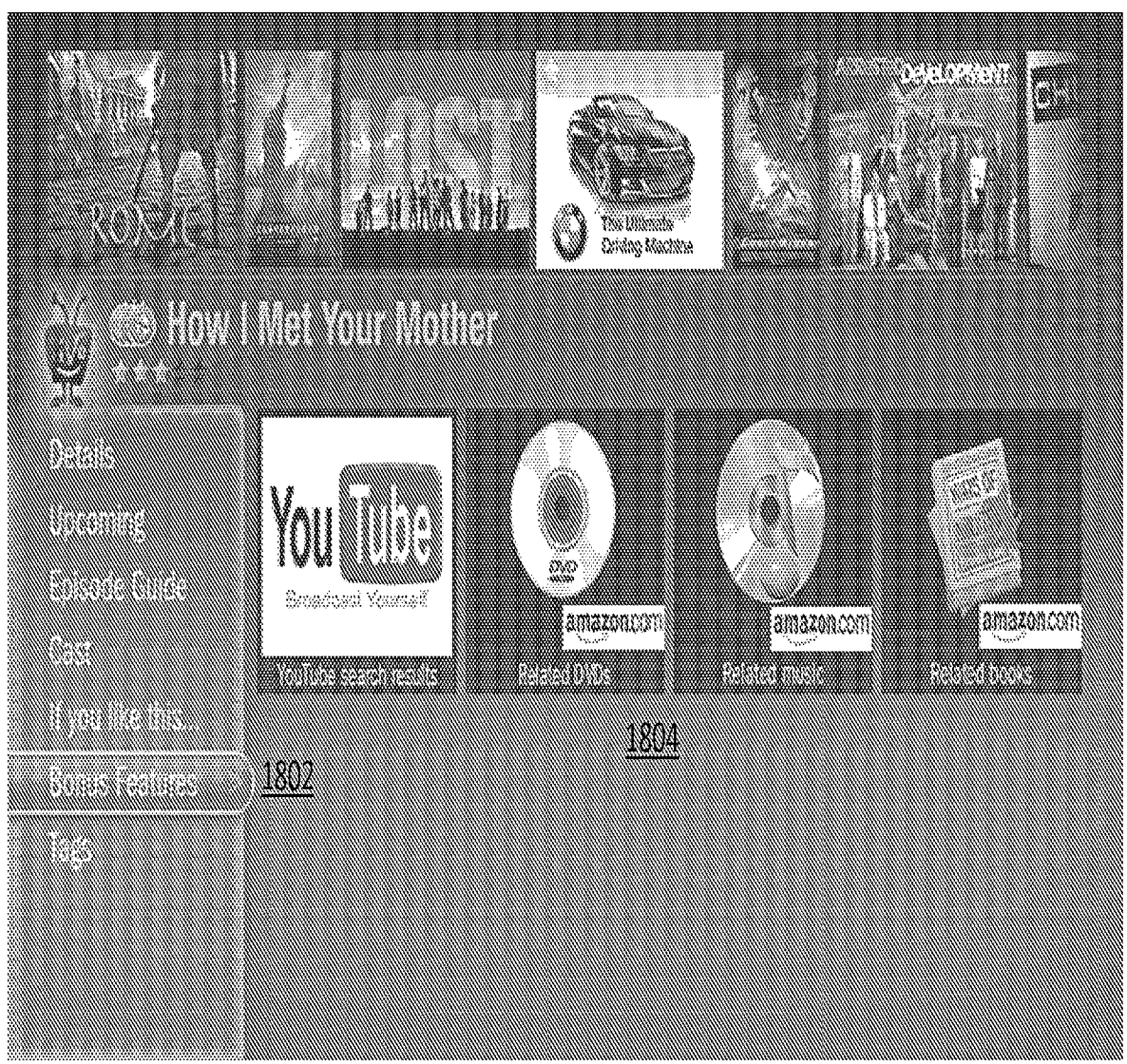
FIG. 18 illustrates an example of a DVR-presented screen that displays bonus features for an episodic television series, according to an embodiment of the invention.

FIG. 18 shows a DVR-generated screen when a user has highlighted the "Bonus Features" category 1802 for the series "How I Met Your Mother." Upon this selection, images 1804 for a number of media content are shown on the right side of the screen. These may be music that is related to the series, books, DVD's, or other downloadable material 1804. From this screen, the user may select one of the options and taken to a third-party site such as Amazon.com in order to purchase related materials. Other types of media content such as "making of" features, or news stories about the series or actors within the series may also be used to populate this menu. Bonus features may also include video clips or YouTube clips that in some way relate to the show. These may include fan-generated material or content from the content provider.

Figure 19:
FIG. 19 illustrates an example of a DVR-presented screen that displays tags for an episodic television series, according to an embodiment of the invention.

FIG. 19 shows a DVR-generated screen when a user has highlighted the "Tags" category 1902 for the series "How I Met Your Mother." Upon this selection, a list 1904 of tags is shown that is associated with the series. In this case, five different tags are associated with "How I Met Your Mother." The number next to the tag may indicate different information depending upon the implementation. The number may indicate the number of media content that is associated with that particular tag. The number may also indicate the number of users who selected the tag for the series. For example, 44 different users may have selected the tag "dating" in association with "How I Met Your Mother." Thus, the number may indicate how popular a particular tag is with the particular series.

In another embodiment, "Featured Music" is also displayed on the left hand side that includes song and music featured in the particular series. This may include the soundtrack or songs that have appeared in the series. The music may be available for download or streaming. A user may be given the option to purchase or rent the music. For example, the entire soundtrack might be offered for purchase from Amazon.com for delivery. The music might also be downloaded for future listening.

Recording Conflicts

A recording conflict occurs when a user has selected to record a larger number of media content than the DVR may be able to record at the same time. For example, the DVR may have fewer tuners than the number of media content that is scheduled to be recorded at the same time. In another example, the number of decoding units may not be enough to record the scheduled media content. In another example, disk bandwidth constraints may also restrict the number of recordings that are able to be recorded at the same time. Any type of hardware or software restriction that limits the amount of recording that may be performed at a particular time may cause a recording conflict. For example, a recording conflict may occur where a DVR has a single tuner and a user has selected to record more than one media content at the same time. Because there is only a single tuner, only one media content may be recorded at a time. A recording conflict may also occur where a DVR with two tuners has three scheduled recordings at the same time. For example a DVR may comprise two separate tuners. If a user elected to record two different shows that both broadcast on Tuesday night at 8:00 P.M., then the DVR should be able to record both shows. If the user wishes to record a third show at Tuesday night at 8:00 P.M., then a recording conflict would occur such that the user or DVR would have to select which two out of the three shows should be recorded. This conflict may occur with any number of tuners on a DVR and is not limited to the examples above. In another example, a multimedia device may only support watching pay per view. If there were only a single tuner and the user had also scheduled a recording on a different channel at the same time, a recording conflict would occur.

Recording conflicts may be due to any type of hardware or software restriction that limits the amount of recording that may be performed at a particular time and are not limited to the stated examples herein. For example, recording conflict resolution may be extended to multiple real-time events. Under this circumstance, two users in a particular household may wish to schedule their DVR to remind the two users when to watch competing sporting events live that broadcast at the same time. The DVR may have a sufficient number of tuners to record both of these sporting events, but the users have elected to watch the sporting events live. As there is only a single output of the DVR to the display device, there is a recording conflict. In another example, there may be a sufficient number of tuners available to record two television broadcasts. However, both broadcasts may be encoded at ultra high bit rates (e.g. for 3-D television). There may be only have sufficient disk/bus bandwidth to record one of the television broadcasts.

Figure 20:
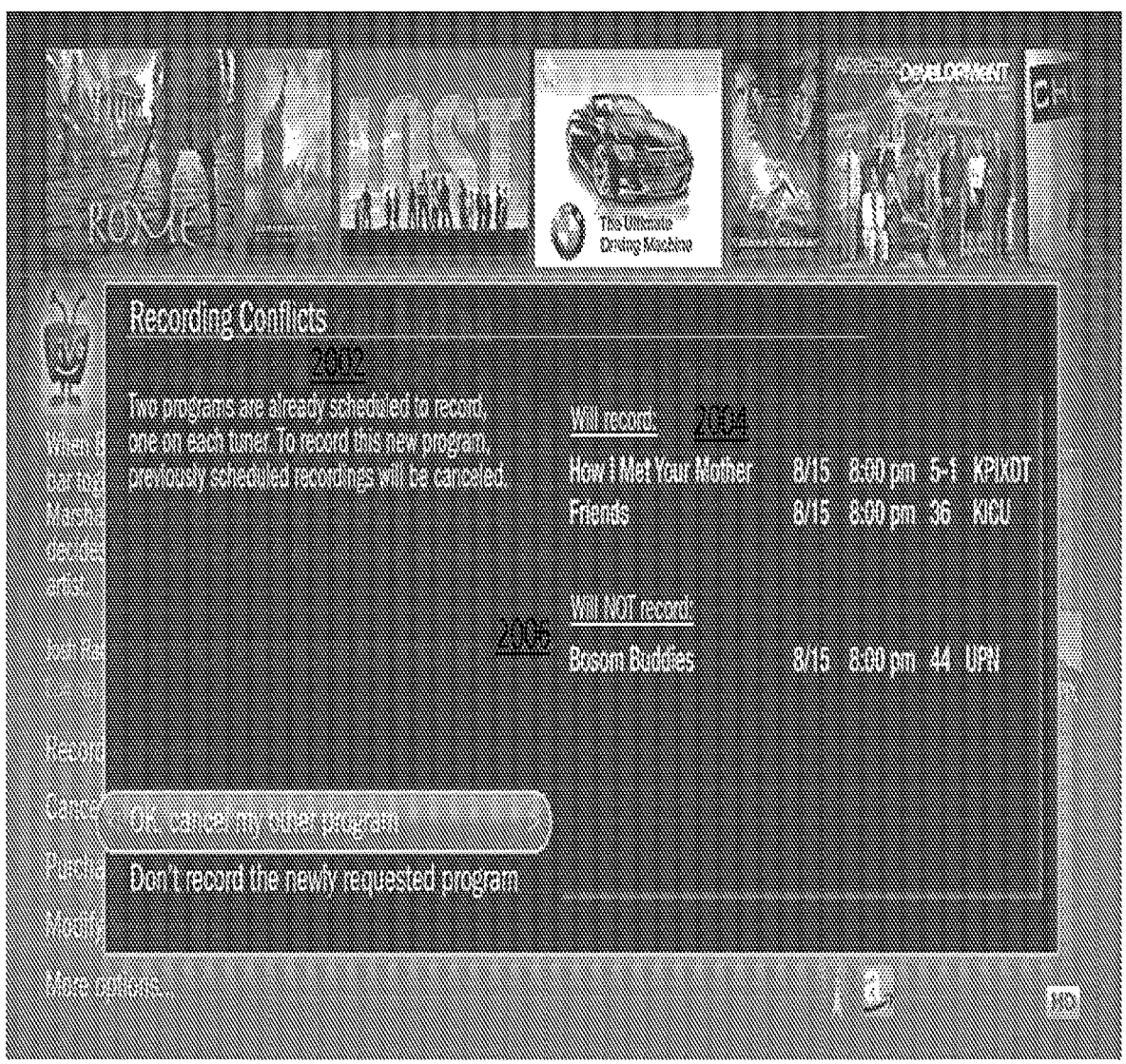
FIG. 20 illustrates an example of a DVR-presented screen that displays recording conflicts, according to an embodiment of the invention.

In an embodiment, a user may select which shows he wishes to record when there is a recording conflict at a particular time. In an embodiment, the user may be presented with a graphical user interface that allows the user to select which show or shows should be recorded by the DVR and which recordings are to be canceled. An example of a recording conflict is shown in FIG. 20 entitled "Recording Conflicts" 2002. A user has selected to record a new program, "How I Met Your Mother." Unfortunately, two shows are already scheduled to be recorded on the DVR with two tuners. The DVR displays the two shows, "How I Met Your Mother" and "Friends," that will be recorded 2004, and the other selected show, "Bosom Buddies," 2006 that will not be recorded. The user has an option to select one of the existing scheduled recordings to be canceled, or to not record the newly requested program. In an embodiment, a user may establish priorities of recording based upon the show. For example, a user might provide a high priority to the series "How I Met Your Mother" such that "How I Met Your Mother" would always be recorded in the case of a conflict. In another example, a user might provide a low priority to a series. If a conflict occurs under this circumstance, the lower priority series recording will be canceled in favor of another recording.

Figure 21:
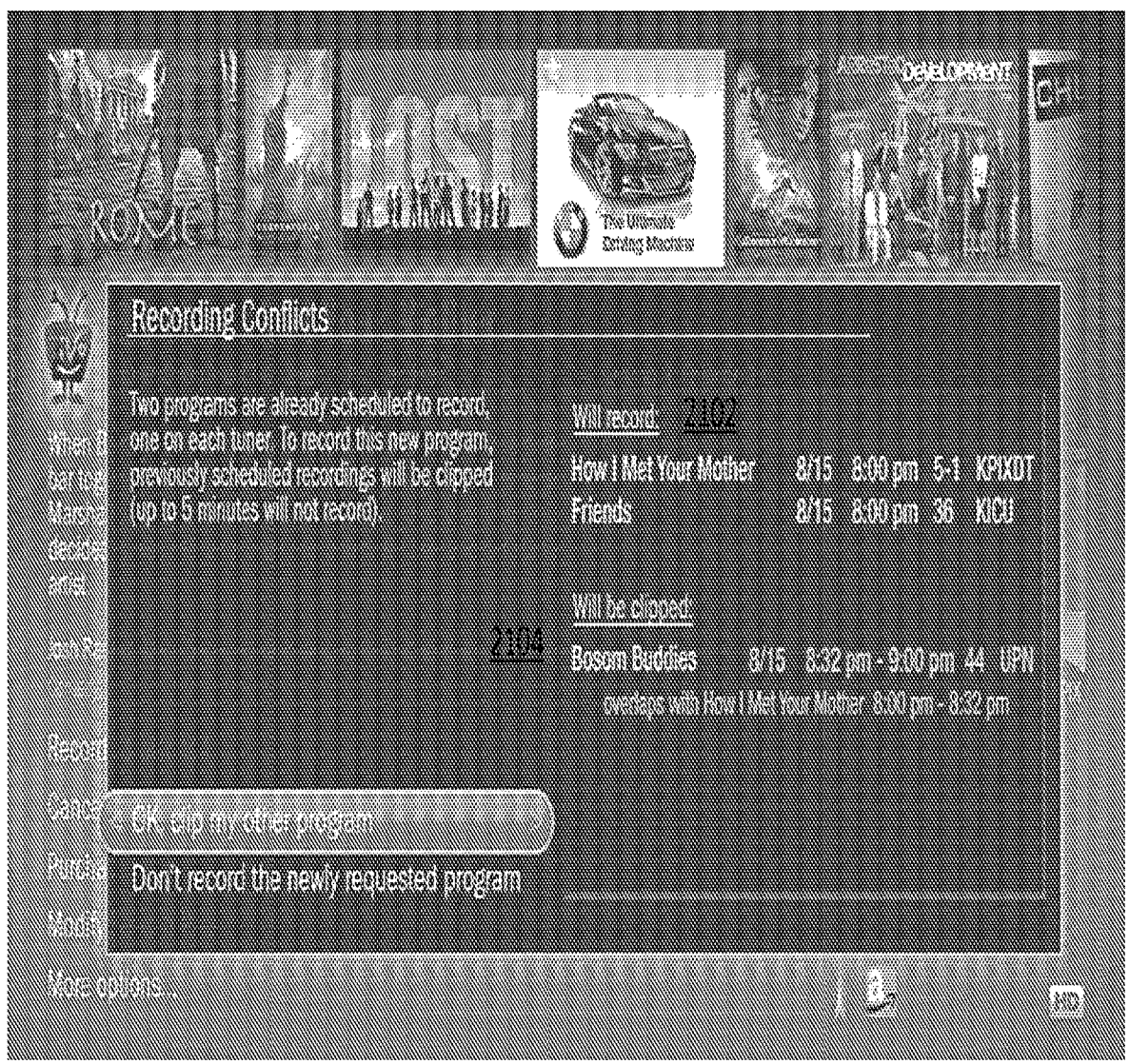
FIG. 21 illustrates an example of a DVR-presented screen that displays recording conflicts where a media content may be clipped, according to an embodiment of the invention.

Recording conflicts may last for the entire length of the media content or only a partial length. An example of where a recording conflicts for a partial length is shown in FIG. 21. In FIG. 21, the series "How I Met Your Mother" and "Friends" 2102 will be recorded. "Bosom Buddies" starts at 8:30 but "How I Met Your Mother" ends at 8:32 (assume also that another recording is also being made on the second tuner). "Bosom Buddies" 2104 only conflicts with the series "How I Met Your Mother" by 2 minutes (out of a total of 30 minutes). The user has the option of having the recording only clipped by the conflicting recording for two minutes. In an embodiment, a show may be clipped up to a total of five minutes. Thus, the episode of "Bosom Buddies" will begin recording two minutes after the start of the show (once "How I Met Your Mother" concludes).

In an embodiment, a program may be canceled for a specified amount of time and then recorded again when the conflicting recording is completed. For example, a user might wish to record a full day of Olympic coverage from 10:00 A.M. to 6:00 P.M. on a DVR with a single tuner. The user may wish to make a recording of another program from 2:00 P.M. to 2:30 P.M. on the same day. In an embodiment, the user may select the Olympic recording be stopped from 2:00 to 2:30 P.M. in favor of the other program and then resumed once again at 2:30 until the scheduled ending of 6:00 P.M. In another embodiment, when a program is clipped (the recording is stopped early in order to record another program), then the DVR does not resume recording of the program when the recording of the other program is completed.

Figure 22:
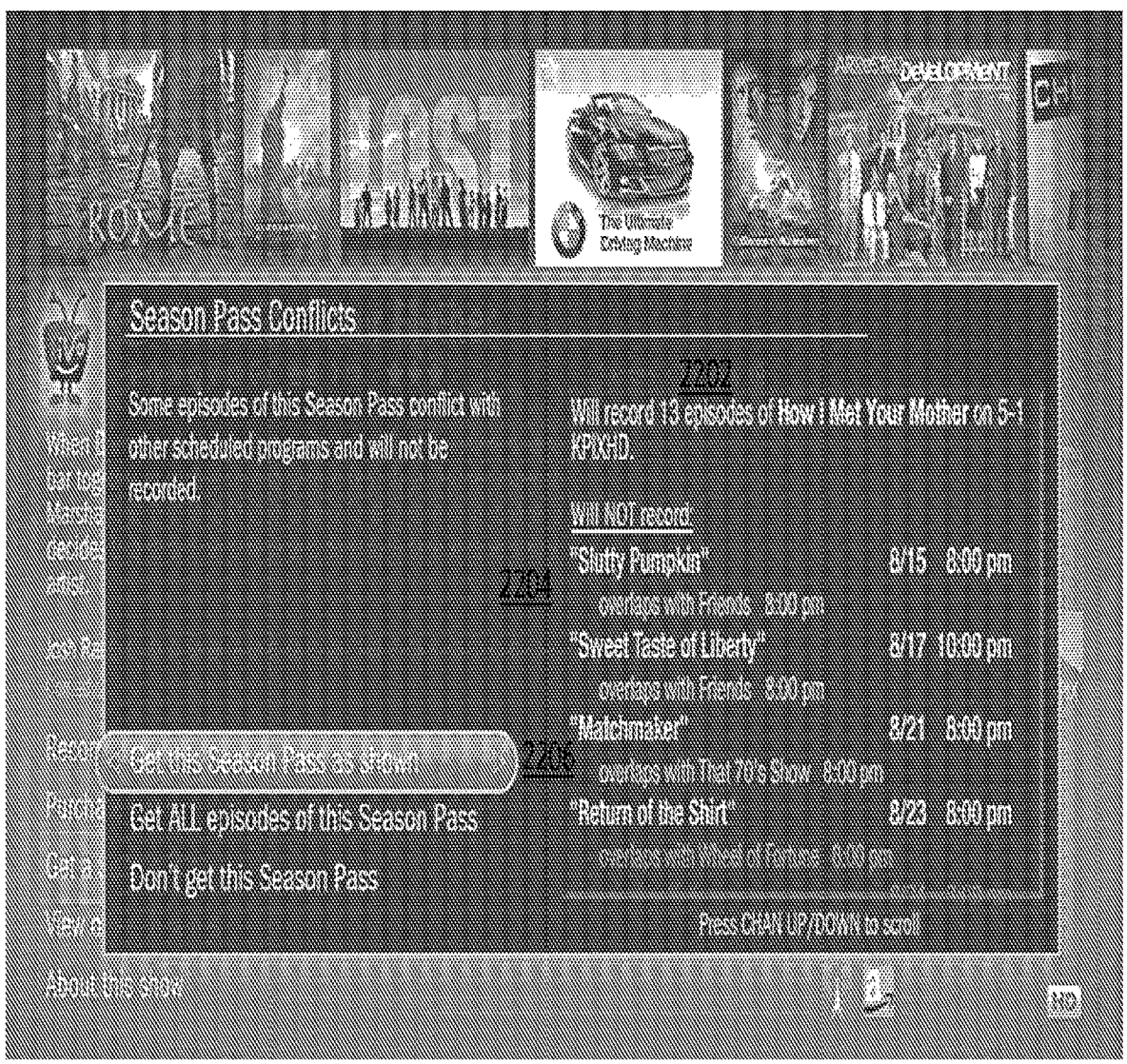
FIG. 22 illustrates an example of a DVR-presented screen that displays recording conflicts with a Season Pass, according to an embodiment of the invention.

An example of recording conflicts that may occur with a Season Pass are illustrated in FIG. 22. In FIG. 22, a user has a season pass for the series "How I Met Your Mother." The DVR is scheduled to record 13 episodes 2202 of the series. However some episodes that are scheduled to be recorded conflict with other previously scheduled recordings. For example, the episode "Slutty Pumpkin" 2204 conflicts with a previously scheduled recording for "Friends" and the episode "Matchmaker" 2206 overlaps with a previously scheduled recording for "That 70s Show." The user has an option to keep the season pass and not record all episodes of the season pass, to record all episodes with the season pass, and to cancel the season pass altogether. The user also has the option to select particular episodes that conflict and select on an episode by episode basis, the show that should be recorded.

Figure 23:
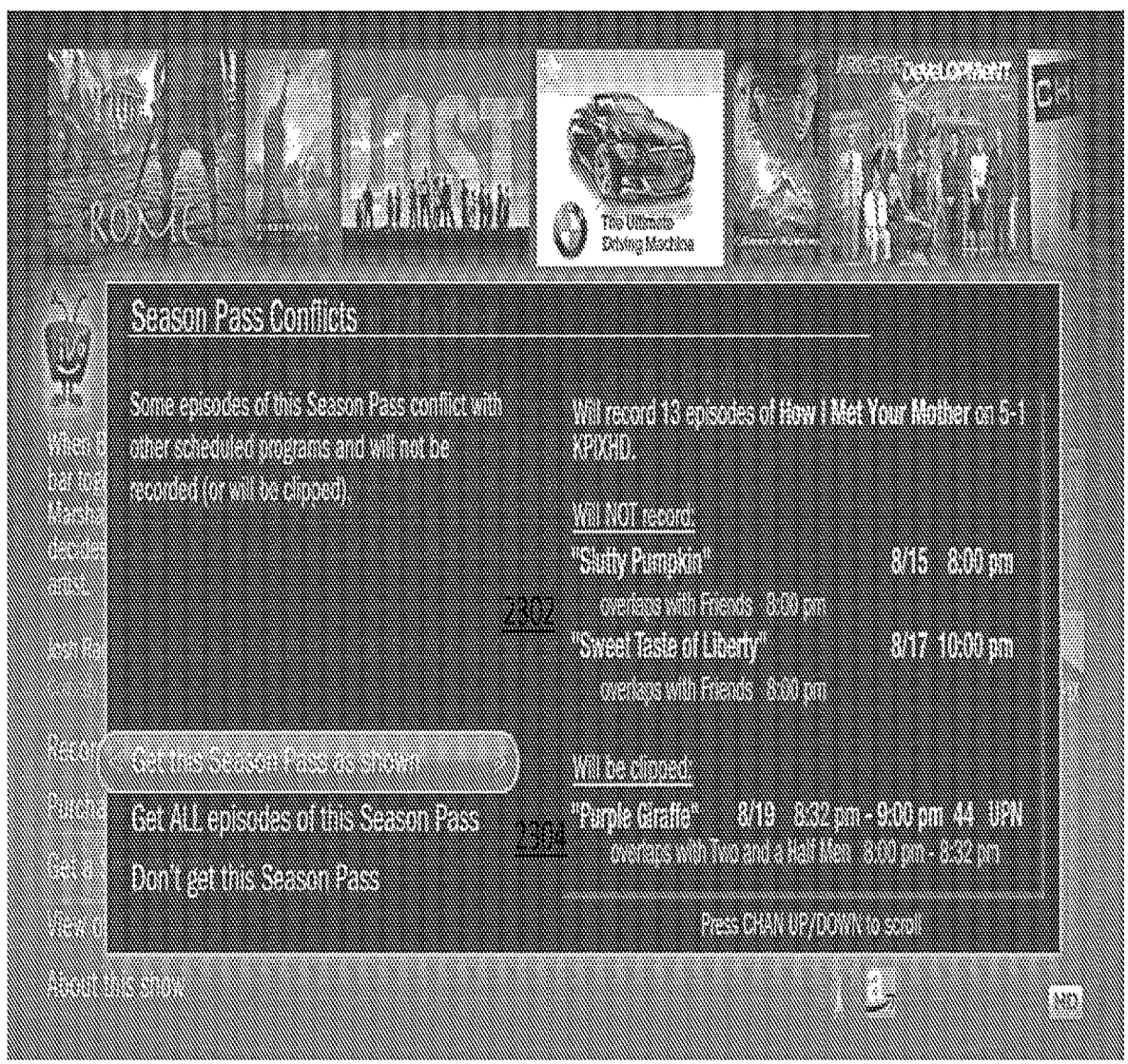
FIG. 23 illustrates an example of a DVR-presented screen that displays recording conflicts with a Season Pass where media content may be clipped, according to an embodiment of the invention.

Recording conflicts may last for the entire length of the media content or only a partial length. An example of Season Pass Conflicts where a recording conflicts for a partial length is shown in FIG. 23. Episodes where the entire episode will not be recorded, and the conflicting recording are shown in 2302. In FIG. 23, the episode "Purple Giraffe" 2304 only conflicts with the series "Two and a Half Men" by 2 minutes (out of a total of 30 minutes). The user has the option of having the recording only clipped by the conflicting recording for two minutes. Thus, the episode "Purple Giraffe" will begin recording two minutes after the start (once "Two and a Half Men" concludes). Additional conflicts unable to be shown on the display screen may also be viewed based upon command user input (i.e. Using CHAN UP/DOWN).

Figure 24A:
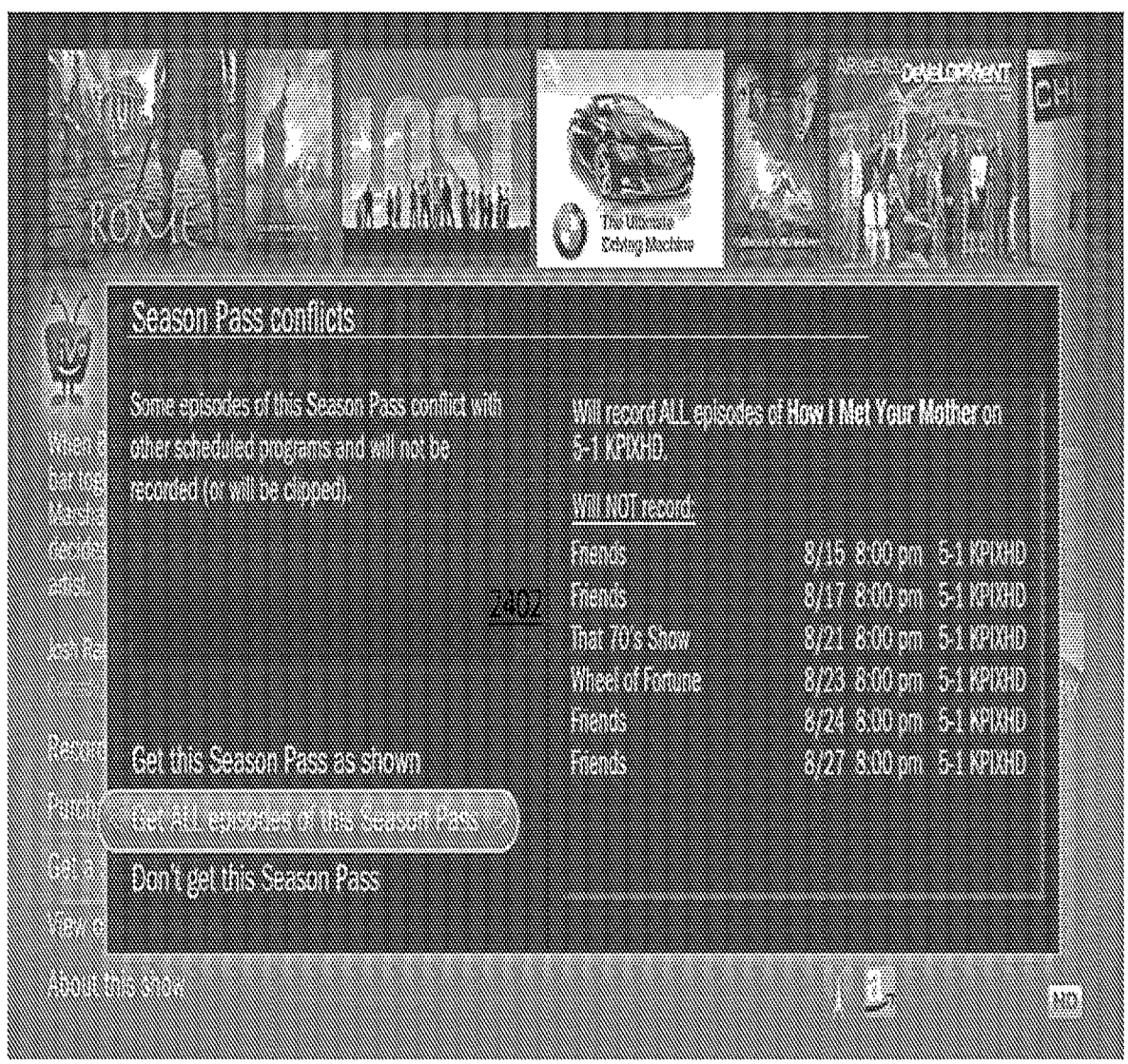
FIG. 24A illustrates an example of a DVR-presented screen that displays recording conflicts with a Season Pass where the selection to record all episodes of the Season Pass is highlighted, according to an embodiment of the invention.

FIG. 24A shows an example of a screen displayed when a user selects all episodes to be recorded in a season pass. All episodes of the series selected for the season pass are recorded and the screen displays the previously scheduled recordings 2402 that conflict and will no longer be recorded.

Figure 24B:
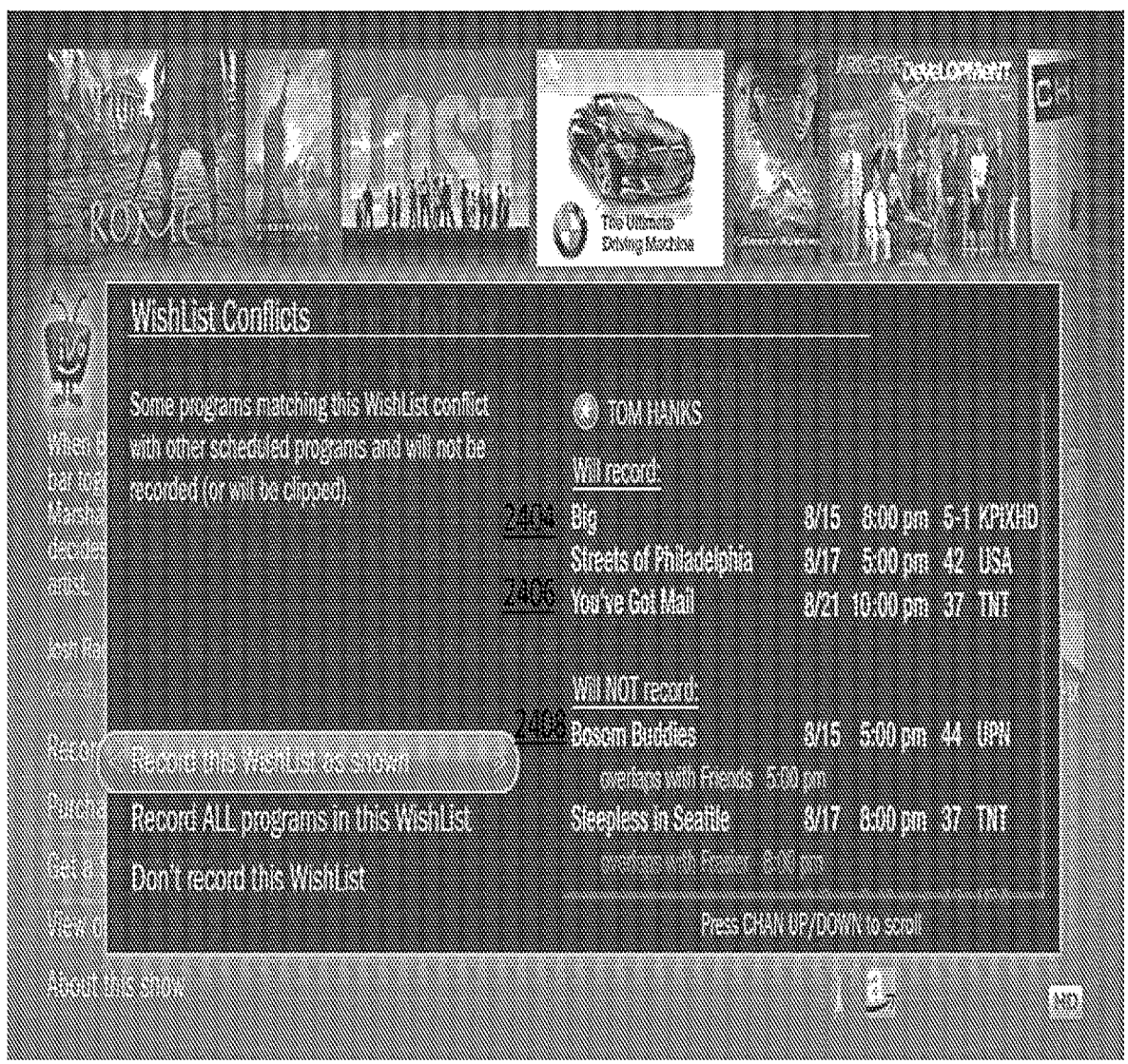
FIG. 24B illustrates an example of a DVR-presented screen that displays recording conflicts with a Wishlist, according to an embodiment of the invention.

A user may also have a Wishlist that records media content that contains a particular person. FIG. 24B shows an example of conflicts that may occur with Wishlist recordings. In FIG. 24B, the actor "Tom Hanks" is selected and all media content that contains Tom Hanks is scheduled to be recorded for the user. The DVR shows media content that will be recorded such as "Big" 2404 and "You've Got Mail" 2406. The DVR also displays media content that conflicts such as "Bosom Buddies" with "Friends" 2408 and thus will not be recorded. The user may select to record the media content as shown, to record all Wishlist recordings (over all previously scheduled recordings), or to cancel the recordings for the Wishlist.

Figure 25A:
FIG. 25A illustrates an example of a DVR-presented screen that displays recording conflicts of a single tuner DVR within a graphical interface, according to an embodiment of the invention.

In an embodiment, conflict resolution may also be performed graphically. A user may be shown graphically which scheduled recording conflicts with another scheduled recording. An example of clipping, where one show only clips the end of another show is shown in FIG. 25A. In FIG. 25A, MLB Baseball begins recording on a single tuner at 7:25.

However, also scheduled at to record from 7:00 to 7:30 is Jeopardy. A user may select to clip the last 5 minutes of Jeopardy from 7:25 to 7:30 as shown as 2502, and record as planned. A user may also select to not record the MLB recording in order to maintain recording the full episode of Jeopardy. In an embodiment, a user may also elect to clip the first 5 minutes of a recording and having a full recording of the earlier scheduled program. Under this circumstance, a user would select to record the full episode of Jeopardy and clip the first 5 minutes of MLB baseball instead.

Figure 25B:
FIGS. 25B-C illustrate an example of a DVR-presented screen that displays recording conflicts in a single time period for a DVR with two tuners within a graphical interface, according to an embodiment of the invention.

In an embodiment, conflict resolution may also be performed on two tuner DVRs. An example is shown in FIG. 25B. In this example, there are three separate programs that are scheduled to be recorded from 7:00 pm to 9:00 pm. MLB Baseball 2504, Jeopardy 2506, and Extra 2508 are all scheduled to record at the same time. Currently, MLB Baseball 2504 and Jeopardy 2506 are scheduled to record which is indicated by the graphical indicator of a check box and Extra 2508 would not be recorded indicated by the graphical indicator of an "x".

Figure 25C:

A user may then select a program to be recorded that was originally not going to be recorded. This is illustrated in FIG. 25C. In FIG. 25C, a user has selected That 70s Show 2510 to be recorded. In response, Wheel of Fortune 2512 will not be recorded. In an embodiment, the determination of what will not be recorded when a different show is selected for recording by the user in a recording conflict may be based upon similar lengths. Since Wheel of Fortune 2512 is the same length as That 70s Show 2510, Wheel of Fortune 2512 will no longer record. In another embodiment, the lowest rated show by the user will no longer be recorded. The ratings are based upon thumbs given by the user. A show with 3 thumbs will be kept over a show with 2 thumbs and so on, regardless of length. A user may also indicate that particular shows will always record. A graphical indicator (here, a "+"), may also indicate that a show will be shown once or more times in a different time period. In this example, That 70s Show 2511 will be shown 3 different times at various times. The user may take this information into account when selecting which show to record and which show does not get recorded.

Figure 25D:
FIGS. 25D-F illustrate an example of a DVR-presented screen that displays recording conflicts in multiple time periods for a DVR with two tuners within a graphical interface, according to an embodiment of the invention.
Figure 25E:
Figure 25F:
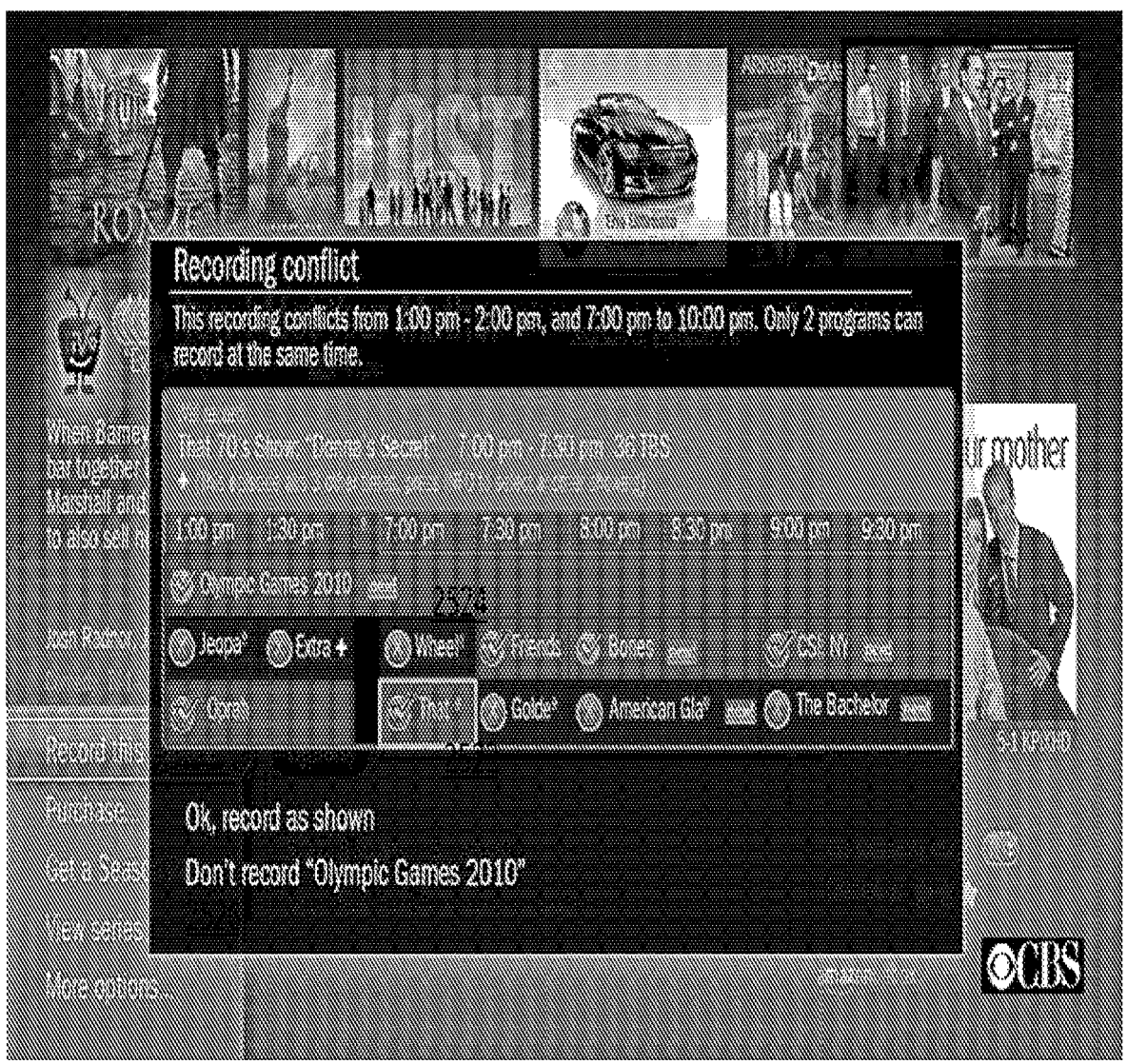

Recording conflicts may also be shown for more than one non-consecutive time period. As shown in FIG. 25D, conflicts occurred at 1:00 pm to 2:00 pm and then again from 7:00 pm to 10:00 pm. The Olympic Games 2514, Jeopardy 2516, and Oprah 2518 are all scheduled from 1:00 pm to 2:00 pm. The Olympic Games 2514 and Jeopardy 2516 are scheduled to record, and Oprah 2518 is scheduled to not record. In FIG. 25E, the user has selected Oprah 2518 to record and Jeopardy 2516 and Extra 2520 will no longer record. In FIG. 25F, the user has selected That 70s Show 2522 to record and so Wheel of Fortune 2524 will no longer record. The user also has the option to select the Olympic Games to not record 2526, which would also remove all of the recording conflicts at these time periods.

In an embodiment, a user may also clip an extra long program and continue to record the long program when the conflicting recording is completed. For example, with the example of the Olympic Games, a user may wish to record Wheel of Fortune 2524 and That 70s show between 7:00 and 7:30 and not record the Olympic Games 2514. Under this circumstance, the Olympic Games would be broken into two recordings. A first recording from 1:00 to 7:00 before being preempted by Wheel of Fortune and That 70s Show, and a second recording from 7:30 to 10:00 pm after the preemption.

3.3 Discovery Bar of Multimedia Content

In an embodiment, a "discovery bar" of multimedia content displays multimedia content on all user interface screens allows a user the ability to conveniently select additional or new media content to view. The customer may navigate into the bar and scroll through the content selections presented. An "item", as used herein, is the individual content of the discovery bar. The individual content may be sent from a server to a client for display to a user. For display of the discovery bar, a connection from the server to the client is made. A user may scroll to the edge of the visible bar and display additional content recommendations. In addition to content recommendations, the bar may present advertising, and other content types. Other multimedia content types include, but is not limited to, a display of new features, advertisements, providers (a shortcut to a provider such as Amazon.com), collection (shortcut to a particular collection) channels (a shortcut to a broadcast channel on live television), person (shortcut to an actor, director, etc.), category (shortcut to a category), video content, or a content feed from any content provider (e.g., web video, stream, broadcast, Netflix New Releases, CNN top news, CNBC financial news). In an embodiment, the content may include such items as, but not limited to: the most popular Season Pass shows, only HD quality content, news, weather, Entertainment Weekly picks, Daily Tribune picks, suggestions based on collaborative filtering, recently recorded content that has not been broadcast for some time, new shows that are premiering, new feature announcements, tips and tricks for the DVR, advertising, new movie/content releases from partners, new photo albums from friends, YouTube content recommended by friends, television shows recommended by friends, "Collections" (i.e. Oscar winners, Johnny Depp, Netflix suggestions), editorial recommendations, popular searches, weather/news widgets, currently recorded shows, Season Passes that have not been broadcast for some time, but are broadcasting soon, My WishList searches, just recorded content, programs on right now, and Bookmarks. In an embodiment, the bar of multimedia content appears on top of all user interface screens.

In an embodiment, the user may select to disable the discovery bar of multimedia content if he or she so desires. The user may also indicate which categories of content to be shown on the bar. For example, the user might request that more of the most popular Season Pass shows be displayed and less Daily Tribune picks. In an embodiment, the user may indicate entire categories to not be displayed in the bar. For example, all new photo albums from friends are prohibited from being shown. The service provider may also not allow all categories, such as advertisements, to be disabled by the user.

In an embodiment, the discovery bar comprises a collection of recommended content that are organized into a set of items. A set of items in a discovery bar may have a minimum number of items and a maximum number of items. The minimum and maximum number of items may vary from implementation to implementation. As an example, a set of items may have a minimum of 15 items and a maximum of 25 items. Items are displayed as a view of visible items. In an embodiment, each view is four to ten items that are visible to the user at any given time. Though the number of items viewed at any one time may vary depending upon the width of each item and the available space on the screen. Each item is within a "slot" of the discovery bar. Slots are numbered starting at 1 and continue to how many slots are available in the set. As used herein, a first "view" is the initial set of bar content viewable by the user for a particular screen. A view comprises a subset of the items in the set of items that is displayed at a single point in time to the user. The second view and the third view are additional sets of viewable bar content for a particular screen. The second view and the third view may be viewed by waiting for the bar to perform an auto scroll. An auto scroll may occur because a specified amount of remote control inactivity time elapses before the bar content scrolls to reveal a new set, or view, of content. The specified amount of remote control inactivity time may vary based upon the implementation and may also be specified. In another embodiment, the contents of the bar may be changed due to shaking of a remote control that is able to detect a shaking motion. In another embodiment, the contents of the set of items may be changed due to shaking of a remote control that is able to detect a shaking motion. An example of such a remote control is further described in U.S. patent application Ser. No. 12/631,740, filed Dec. 4, 2009, and is incorporated by reference herein.

Figure 26:
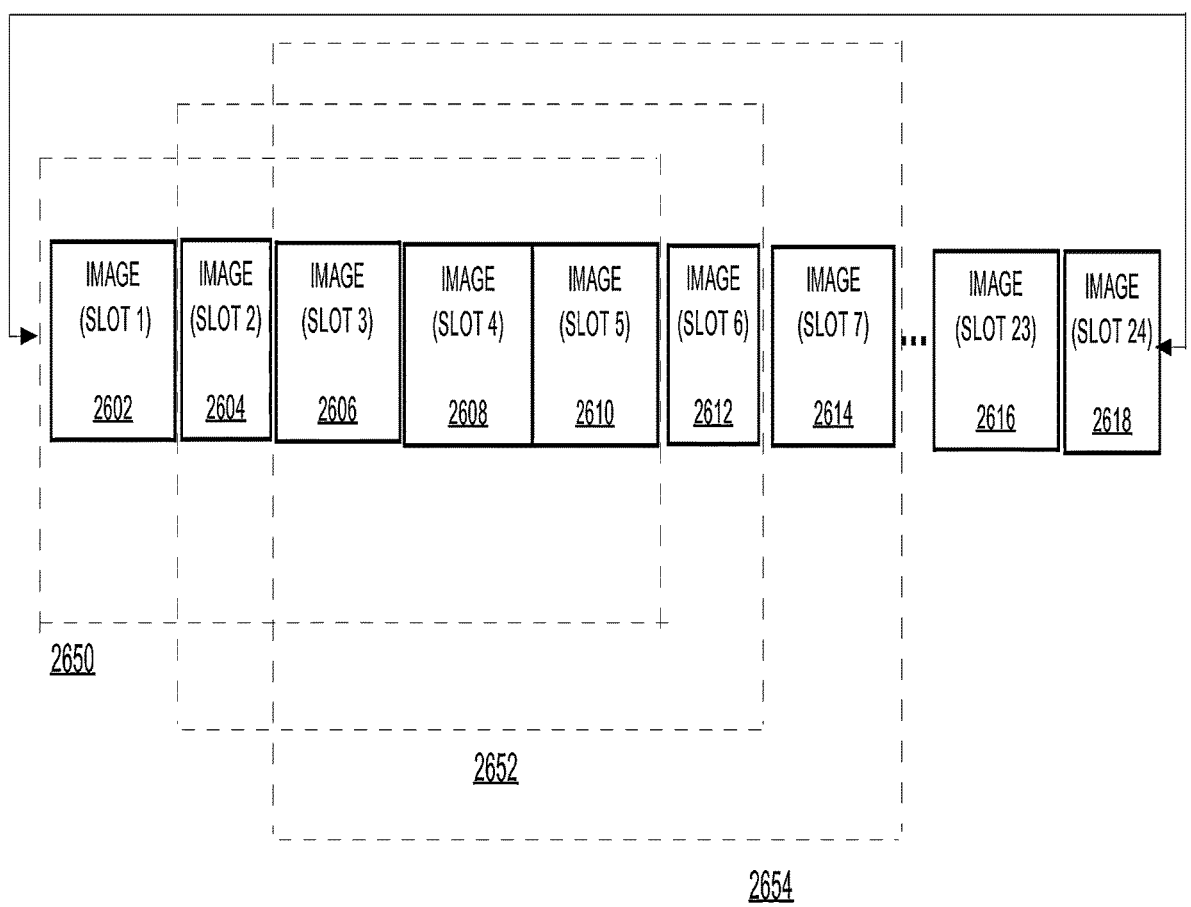
FIG. 26 illustrates an example of a DVR-presented screen that displays recording conflicts with a Wishlist where media content may be clipped, according to an embodiment of the invention.

Examples of views of a discovery bar are shown in FIG. 26. In FIG. 26, each image is an image of media content that may be presented to a user. The images form a long carousel or a continuous loop (denoted by the line and arrows) where, after image 2618, image 2602 is next in the set of images. The images form a continuous loop in this fashion with the last image followed by the first image when traversing the loop. A set of images are shown in views which are grouped by the dotted lines. The first view 2650, displays images 2602, 2604, 2606, 2608, and 2610. The second view 2652 displays images 2604, 2606, 2608, 2610, and 2612. The third view 2654 displays images 2606, 2608, 2610, 2612, and 2614. Thus, the first view 2650 may be displayed until an auto-scroll occurs. Each image in the view may also be the slot of the item. These are indicated as image 2602 is labeled Slot 1, image 2604 as Slot 2, and so forth. Furthermore, more than three views may occur for a carousel or continuous loop of images. In an embodiment, when a user highlights a specified position in the content bar, the highlighter remains fixed and the contents of the bar begin to scroll one by one underneath the highlight. The specified position might be, for example, the $2^{nd}$ or $3^{rd}$ to last item in the bar. In this way, if a user is initiating the scrolling, a long list or carousel of images appears to the user.

In an embodiment, a specific order of content types may be followed in order to populate the discovery bar set. For example, business required items (ads, editorial, etc.) might be considered first. Next, the most relevant items to the current context are determined. Then, items are considered that are relevant in a $2^{nd}$ degree (collections, categories, people, etc.). If still more items are needed, or there is no context available, then items are populated that might be relevant to the user or the community. A client will make a request to populate the discovery bar from the server. In an embodiment, the request may include an exclusion list in order to not populate the bar with items that have appeared in a previous determined number of views.

In an embodiment, population of the bar may be based upon bins and individual item frequency. As used herein, a bin is a group of content sources that, as a whole, a user may control how often the entire group is eligible for the set of items. A bucket is a content source within a bin. A user may control the weight of the bucket and this affects how often an item from that source is placed within a bin. For example, content sources might include: advertising, service provider editorial, content provider editorial, partner recommendations, and tips and tricks. Each bin contains one or more content sources and may be contextual or non-contextual. For example, one bin may be for contextual advertising and another bin for non-contextual advertising. Each bin has a related individual item frequency that reflects the frequency an item may be part of a set. For example, advertising is in each set, and has a frequency of 1/1. Distributor contextual might have a frequency of 1/5, and partner recommendations non-contextual might have an item frequency of 1/10. These item frequencies may vary from implementation to implementation. A user may then offer preferences to change the recommendations within the discovery bar. For example, a user may specify "more", "standard", or "less" tips and tricks. This would lower the frequency of the tips and tricks bin. A user may also specify "more", "standard", or "less" people, that would affect the bucket "related to a person" within each respective bin. There may also be balancing of items. For example, a user may affect how many items in a set are available to rent or buy or the ratio of TV, movies, sports, or web video within a set. In an embodiment, individual item checks may also be performed. For example, if a screen has a context of a children's show, then anything tagged mature or any content not within a kid's rating should be shown. In another example, content that is not currently available, or content that is already scheduled to record may also be discarded from being shown.

In an embodiment, various policies may be used to direct how the content bar is populated with content. In other embodiments, policies may not be employed in any manner. In yet other embodiments, policies may be optional and not be required. Policies may also be given specified weightings such that policies with a greater weighting are given more priority over policies that have a lower weighting.

Policies may vary and may include, but are not limited to the following: Placement of most content types within a view of the bar is random. Advertisements may always appear in a fixed position or distributed randomly within a view. The same piece of content should not appear on two subsequent views of the bar. This includes rotation within the bar (a first view to a second view of the same bar on a screen), but does not include screen transitions (bar on a first screen to bar on a second screen). Advertisements may be limited to one per view, and only to every other view of the bar within a screen. Advertisements may not be placed in the scroll positions within the bar (the faded edge items which indicate scrolling is possible) and should always appear as 'fully displayed' items. After a determination is made of where an advertisement appears within a bar view, the rest of the bar is populated with a random assortment of the remaining content types for that screen.

Other policies may be that programs in progress (e.g. the Emmy's are on right now) may be displayed. Content that may be downloaded may also be included in the discovery bar. In cases where the device is an IPTV compatible device or the device obtains content exclusively from a network, then the content may be considered available and may be selected for the discovery bar. Policies may exist that only cover downloadable content. For example, content available may only comprise programs that may be downloaded within a certain time period (the content is dependent upon both the speed of the broadband and the size of the content file). Content that has already broadcasted should not be shown (e.g. if the Emmy's have just ended, do not show the Emmy's in the bar). Also, content that the customer already has scheduled to record may be implemented in a weighted manner. Items that are similar to the current program but have already been scheduled may be given a lower weighting (or be called tier 2). These items with a lower weighting would only be displayed if there is not enough other (or tier 1) content to fill the bar. Items presented should be available in the user's area on channels received. In general, preference is given to display content that is available within the next seven days. An item should not be displayed twice within a carousel.

In an embodiment, the heights of items are bounded but the widths of items may vary. The number of items within a view may vary because the widths of the items vary. Each screen contains a set of items that is able to change after a period of time. The period of changes may vary. For example, a period of time might be 24 hours. In an embodiment, the set of items is logically divided into views. A view, as used herein, is any group of four to six items that may be automatically presented to the user within a set. In an embodiment, each set of items contains a minimum of two views and up to a maximum of five views. The actual number of views may vary from implementation to implementation.

The image varies depending upon the content type that is shown on the bar of multimedia content. The types of content that may appear on the discovery bar include, but is not limited to, a television series, episode preview, movie or non-episodic program, person (actor, writer, or director, musician, etc), showcase promotions that may be advertisements by third parties, electronic program guide advertisements, broadband only preview, music video, music album, various applications that may be run on the DVR, content providers, and collections of recommended content. In an embodiment, if the item presented is currently being shown, a graphical indication that the content is shown live is superimposed on the image. The selection of the media content displayed in the discovery bar may be based on related content (contextual selections) or display the most popular media content (non-contextual selections). Contextual selections may arise when there is context available based upon interest from the user. For example, the user may have selected a particular media content. Less direct methods may also be used to derive context. The user may have selected a person, a tag, or group of content. The path that the user has followed may even be used to derive context. The very beginning of a task (i.e. Search, Browse menu, etc.) may have little to no context, but further down the path (regardless of whether a particular piece of content is chosen) context may be determined. For example, if the user navigates to the Browse menu and then proceeds to browse comedy movies, then context may be derived for the user.

A user may select an item by selecting an item when the highlight bar is over the preferred item. A user may navigate to items in the discovery bar by moving the highlight bar to the item of interest. If the discovery bar is located at the top of the screen, the user may navigate to the discovery bar by moving the highlight bar to the discovery bar from the menu items in the lower area of the screen. When an item is selected, an area of the display, or rollout area, shows data specific to the type of the content is shown to the user. For example, a user might select an item that is an episode of a television series. Under this circumstance, options specific to an episode of an episodic television series is displayed in the rollout area. In another example, a user might select an item that is content for an advertisement for a third party. Under this circumstance, the user is navigated to the destination defined by the promotion upon selection of the item. In the rollout area, both text and image data may be displayed, or a video may begin playing upon user input. User commands may change the video to display full screen (as opposed to just in the rollout area).

In an embodiment, the discovery bar is populated based upon particular rules that may vary from implementation to implementation. The following are rules that may be used and each of the rules may be combined with other rules in order to determine placement of content in the discovery bar. The order may be determined by ordering the broadcast based upon availability. For example, content available within the next seven days might appear prior to content that will be available only after seven days.

Other criteria may also be used to decide which content to display on the bar. Demographic and geographic data might be taken into account. For example, content for sporting events might emphasize hockey in the far north and football in the south. In addition, the time of day or day in the week may also be taken into account. For example, movies might be more likely to appear on weekend evenings and soap operas might appear more often on weekday afternoons.

In an embodiment, contextual screens display different content than non-contextual screens. For example, a user might enter command input to navigate to the main menu of the DVR. As no content is yet selected by the user within the DVR menus and the user is at the main menu, non-contextual screens for the discovery bar are shown to the user. Contextual screens are shown once context may be derived based upon the user's actions. This may be based upon a search performed by the user or simply the path that a user is following in order to find movies that are historical dramas. The discovery bar may display content that is related to the derived context. In another embodiment, contextual screens may appear if a user is already viewing a particular media content and then enters command input to view a DVR-generated menu. The media content being viewed would be considered as the context for the discovery bar.

Related programs for contextual selections might be determined based upon aggregating data from many different users, through an editorial service that originates from a service provider, or based upon any criteria that may be used to determine related programming. Non-contextual selections may be limited to the most scheduled media content for the upcoming week.

In an embodiment, content displayed on the bar may also be affected by the time of year, time of day, or day of the week. For example, on a Friday evening, it might be more likely that a user will watch a movie, and thus more movies may be displayed on the bar. In another embodiment, a user may become accustomed to viewing content that has recently been recorded. For example, a user might view the television show "Gossip Girl" as soon as the show is recorded. Based upon this action, the bar may be populated with the latest recording of "Gossip Girl" if the show has not yet been viewed so that the user may select the content easily.

In an embodiment, the discovery bar only displays a specified number of advertisements, or third-party content, per view. For example, the specified number might be one. Rules may be implemented to display advertising in the discovery bar. The same promotion may not appear in adjoining views within a screen set. For views, advertising content should appear in full. Thus, if the system rotated through the views without user interaction, no advertisement would be cut off. Advertisements from third party advertisers are inserted into every other view and promotions from the electronic programming guide are also inserted into every other view.

In an embodiment, the discovery bar may be displayed when the client is disconnected from a central server. Under this circumstance, the client may have cached content that allows the client to display the bar to the user in a disconnected state. In another embodiment, the discovery bar is not shown anytime the client is disconnected from the central server. Under this circumstance, the bar may be replaced with a large icon and message stating that the network connection is unavailable and should be fixed in order for the discovery bar to once again display.

Figure 27:
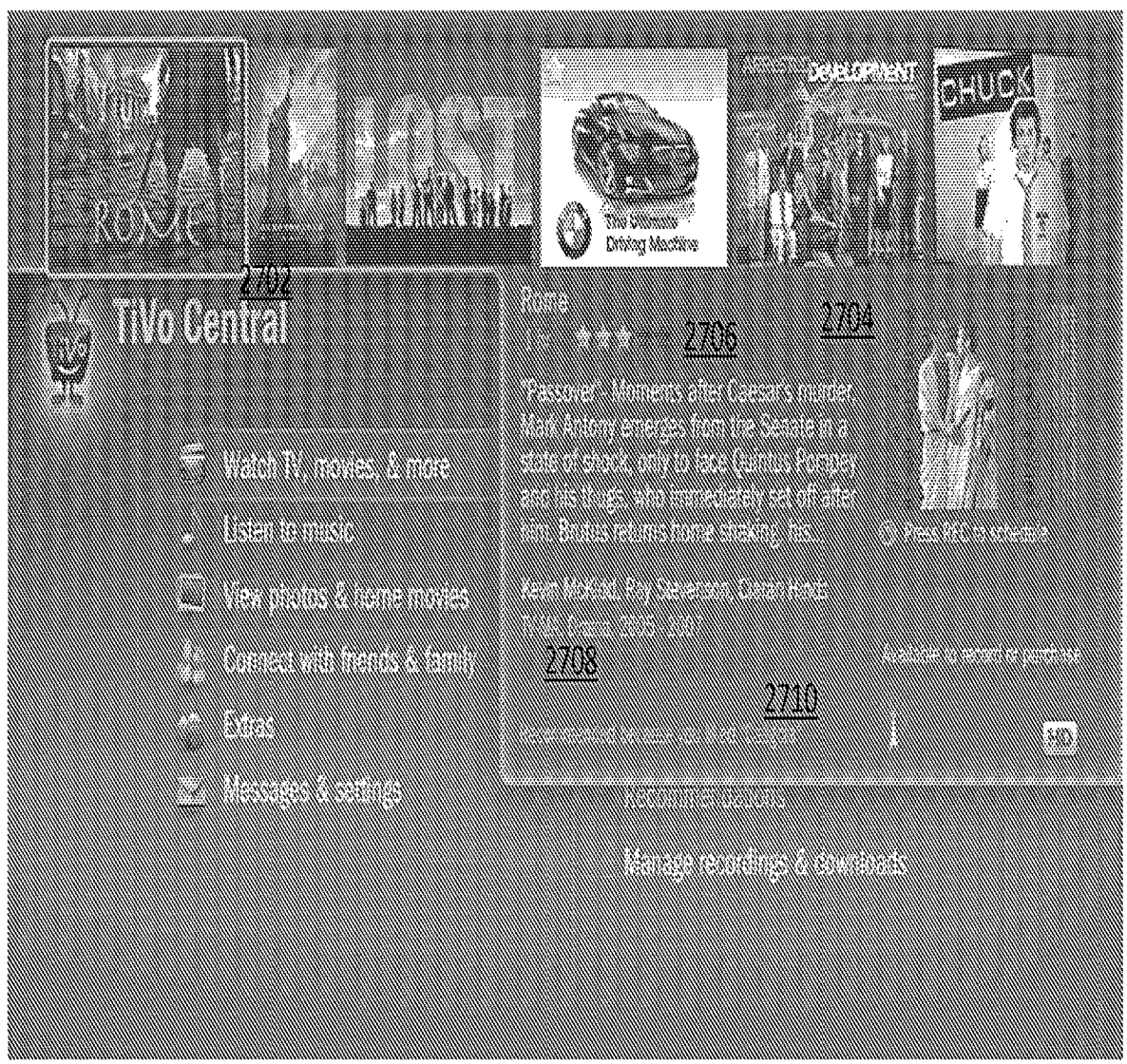
FIG. 27 illustrates an example of a DVR-presented menu screen that includes the bar of multimedia content where an episodic television show from the bar is highlighted, according to an embodiment of the invention.

An example of a drop down screen for an episodic series is shown as FIG. 27. A user may select a series 2702 from the discovery bar. As may be seen, an image 2704 is shown of the series "Rome" once the selection is highlighted. The image may be stored on a database and updated to reflect a current episode. If an image for the series is not available, related images may also be shown such as a cast ensemble image. In FIG. 27, actions may be taken with relation to the series. For example, the user might wish to record or download all or only particular episodes of the series. Information is shown specific to the series. The rating 2706 is for the entire series (not a single episode) and the text will describe the premise for the series. In addition, rating, genre, and dates of broadcast 2708 may be displayed. Graphical indicators for high definition, whether the media content is available as a download or is currently broadcast, may also be shown. In an embodiment, availability may include a variety of formats including, but not limited to, watch now, record, rent, purchase, pre-order, or download for free. In another embodiment, a graphical indicator indicates that the content is available from a variety of sources, including broadband partners or via network television. Other types of data may also be displayed, such as, but not limited to, metadata of the content including description, duration, tags, etc. The placement and selection of which data is displayed may vary from implementation to implementation. In another embodiment, placement or selection of the data may be a defined by the user. In addition, a reason why the series is selected 2710 is displayed.

Figure 28:
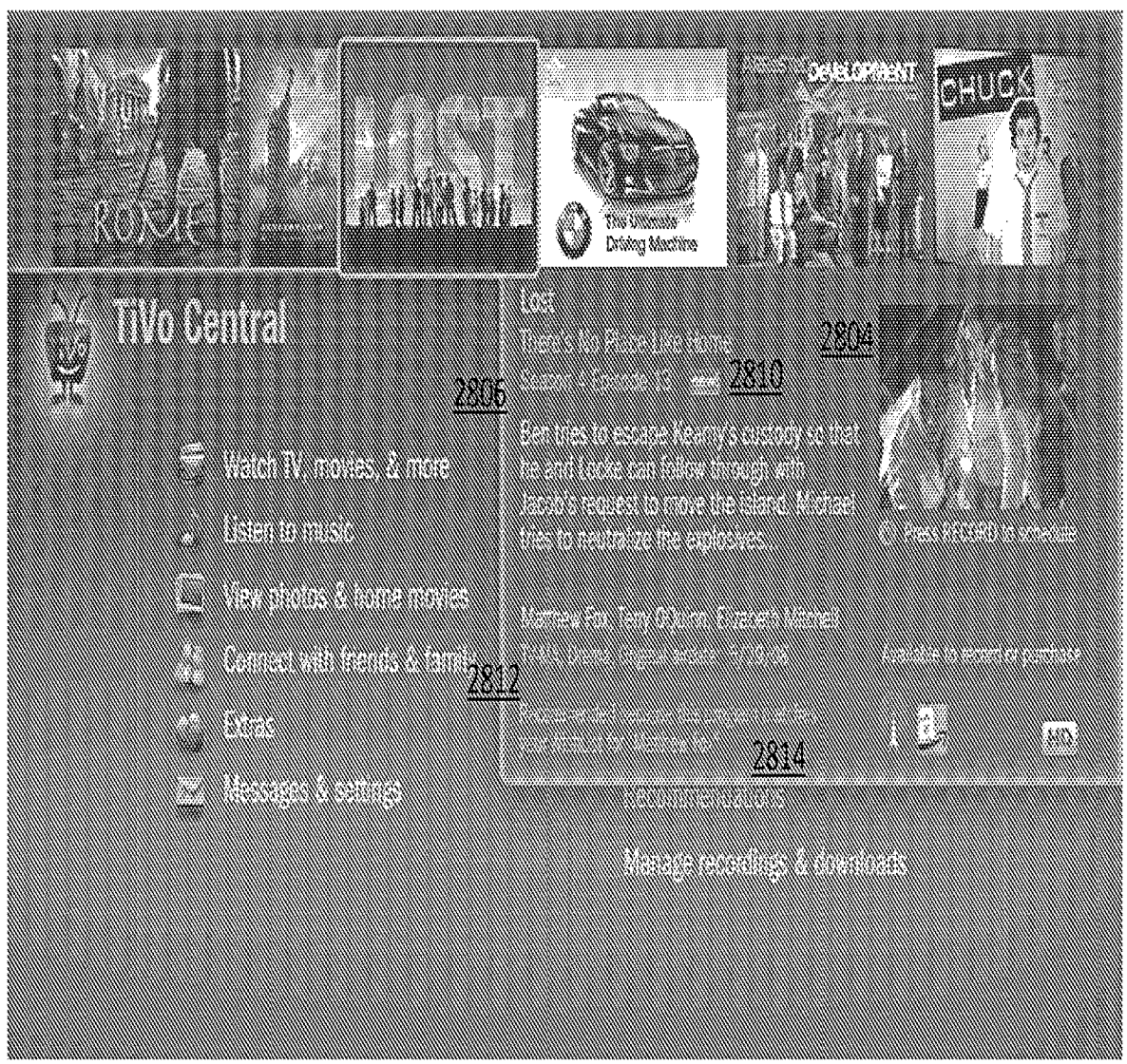
FIG. 28 illustrates an example of a DVR-presented menu screen that includes the bar of multimedia content where an episodic television show from the bar is highlighted, according to an embodiment of the invention.

An example of a drop down screen for an episodic series is shown as FIG. 28. In contrast to FIG. 27, the drop down for "Lost" is for a specific episode. As may be seen in the figure, an image 2804 is shown for the episode (a still picture from the episode). The image may be stored on a database and updated to reflect a current episode. If an image for the series is not available, related images may also be shown such as a cast ensemble image. The user may wish to record or download the particular episode. Information is shown specific to the episode in the series. The title, episode title, and season number and episode number 2806 are shown if the information is available. The season number indicates the season of the series. The episode number indicates the number of the episode within a particular season. Thus, the 25th total episode of the series Lost might be the first episode of the second season. In the present case, the episode "There's No Place Like Home" is the 13th episode of the season 4.

The episode may also display a graphical indication that the episode has not been broadcast previously. An example might be the graphic "new" 2810 in FIG. 28. An episode description, the rating of the episode (e.g. TV-MA, TV-14, etc.) 2812, a thumb rating (one thumb up, two thumbs up, one thumb down, etc.), and the original airdate of the episode, may also be shown, if available. In an embodiment, the availability may be shown that include a variety of formats including, but not limited to, watch now, record, rent, purchase, pre-order, or download for free. In another embodiment, a graphical indicator indicates that the content is available from a variety of sources, including broadband partners or via network television. Other types of data may also be displayed, such as, but not limited to, metadata of the content including description, duration, tags, etc. The placement and selection of which data is displayed may vary from implementation to implementation. In another embodiment, placement or selection of the data may be a defined by the user. In addition, a reason why the episode is selected 2814 is displayed.

Figure 29:
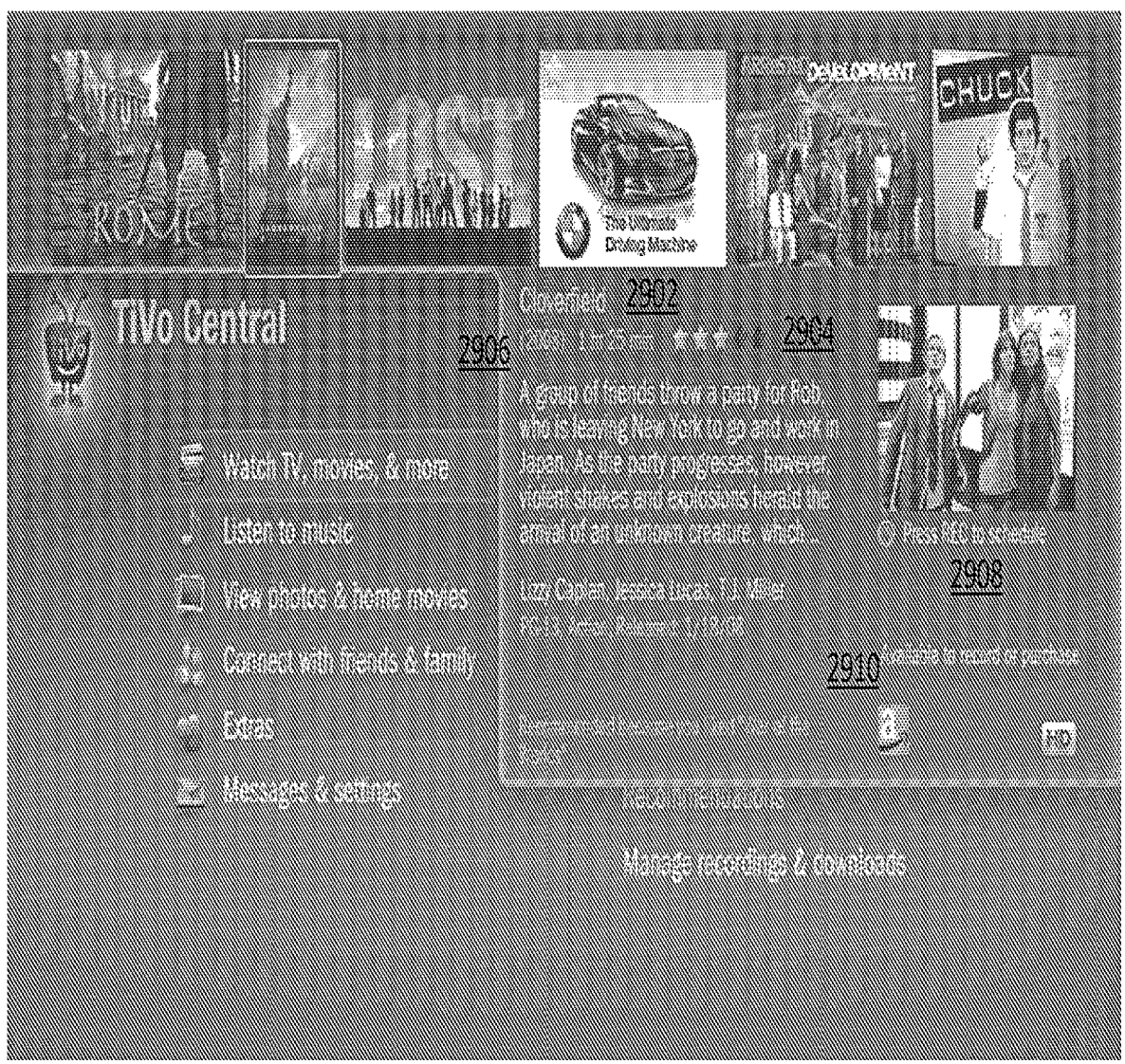
FIG. 29 illustrates an example of a DVR-presented menu screen that includes the bar of multimedia content where a movie/non-episodic television program from the bar is highlighted, according to an embodiment of the invention.

An example of a screen shown for a movie or non-episodic show is shown in FIG. 29. The information shown may be specific to only movies or non-episodic shows. The information shown may include, but is not limited to, the program name, the year of release, the duration of the program (shown in either both hour and minutes or only minutes) 2902, the rating of the program (which may comprise a star rating system of one to four stars) 2904, the MPAA rating, and the release date 2906. An image 2908 may be shown such as the movie poster of a movie, or a production image. A description 2910 of how the content is available (purchase or download) is also displayed. A graphical indicator indicating that the media content is available in high definition may also be shown. In an embodiment, availability may include a variety of formats including, but not limited to, watch now, record, rent, purchase, pre-order, or download for free. In another embodiment, a graphical indicator indicates that the content is available from a variety of sources, including broadband partners or via network television. Other types of data may also be displayed, such as, but not limited to, metadata of the content including description, duration, tags, etc. The placement and selection of which data is displayed may vary from implementation to implementation. In another embodiment, placement or selection of the data may be a defined by the user.

Figure 30:
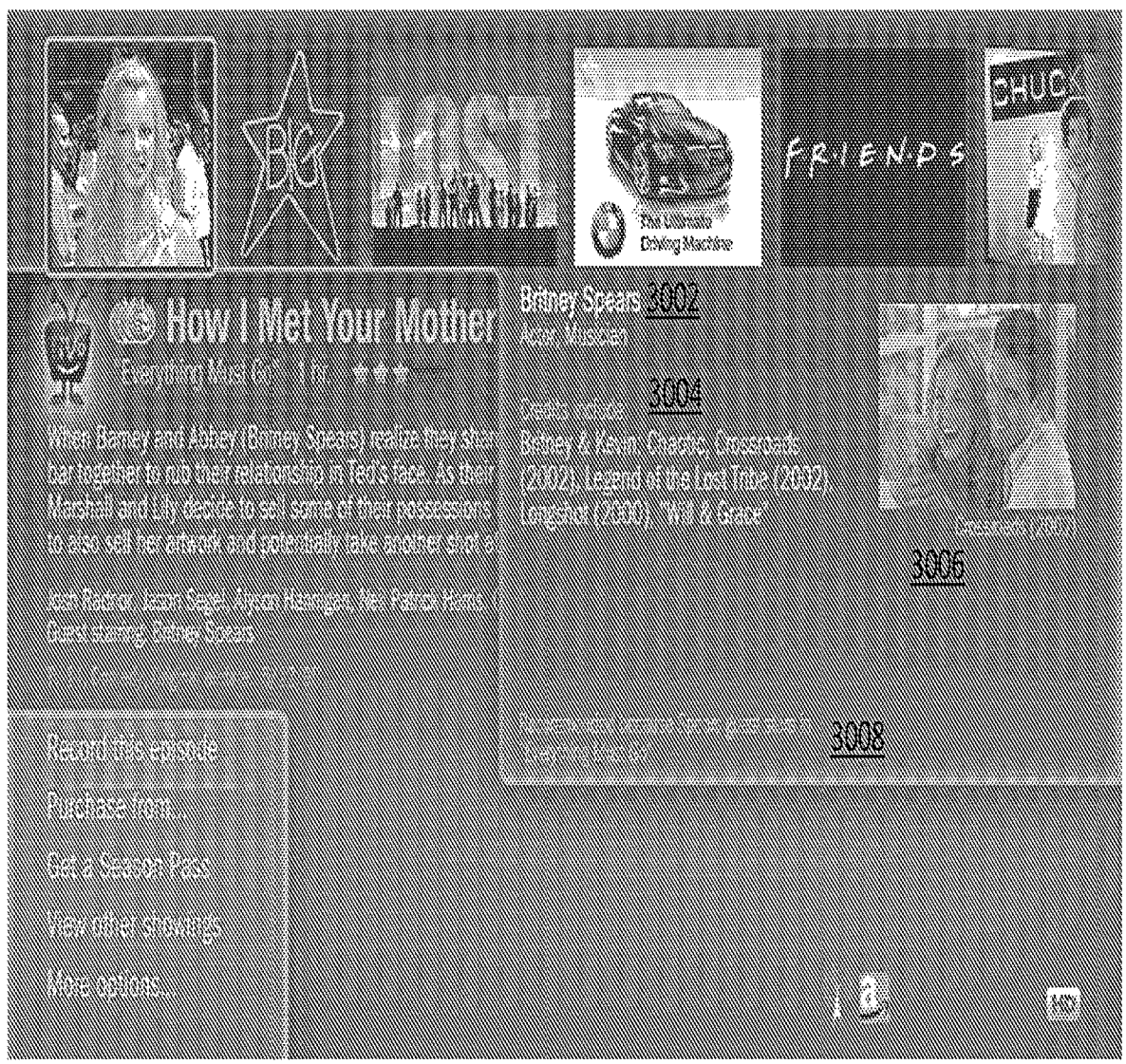
FIG. 30 illustrates an example of a DVR-presented menu screen that includes the bar of multimedia content where a person from the bar is highlighted, according to an embodiment of the invention.

An example of a screen shown for a person is shown in FIG. 30. The information shown may be specific to only persons. The information shown may include, but is not limited to, the name of the person 3002, the role of the person (actor, musician, writer, etc.), credits 3004, and lists of titles of programs the is credited. An image of the person 3006 may also be shown that either shows an image of the person or an image of a character that the person plays. The reason of why the person is recommended 3008 is also displayed. Other types of data may also be displayed, such as, but not limited to, date and location of birth, biographical stories, astrological sign, links to fan clubs, etc. The placement and selection of which data is displayed may vary from implementation to implementation. In another embodiment, placement or selection of the data may be a defined by the user.

Figure 31:
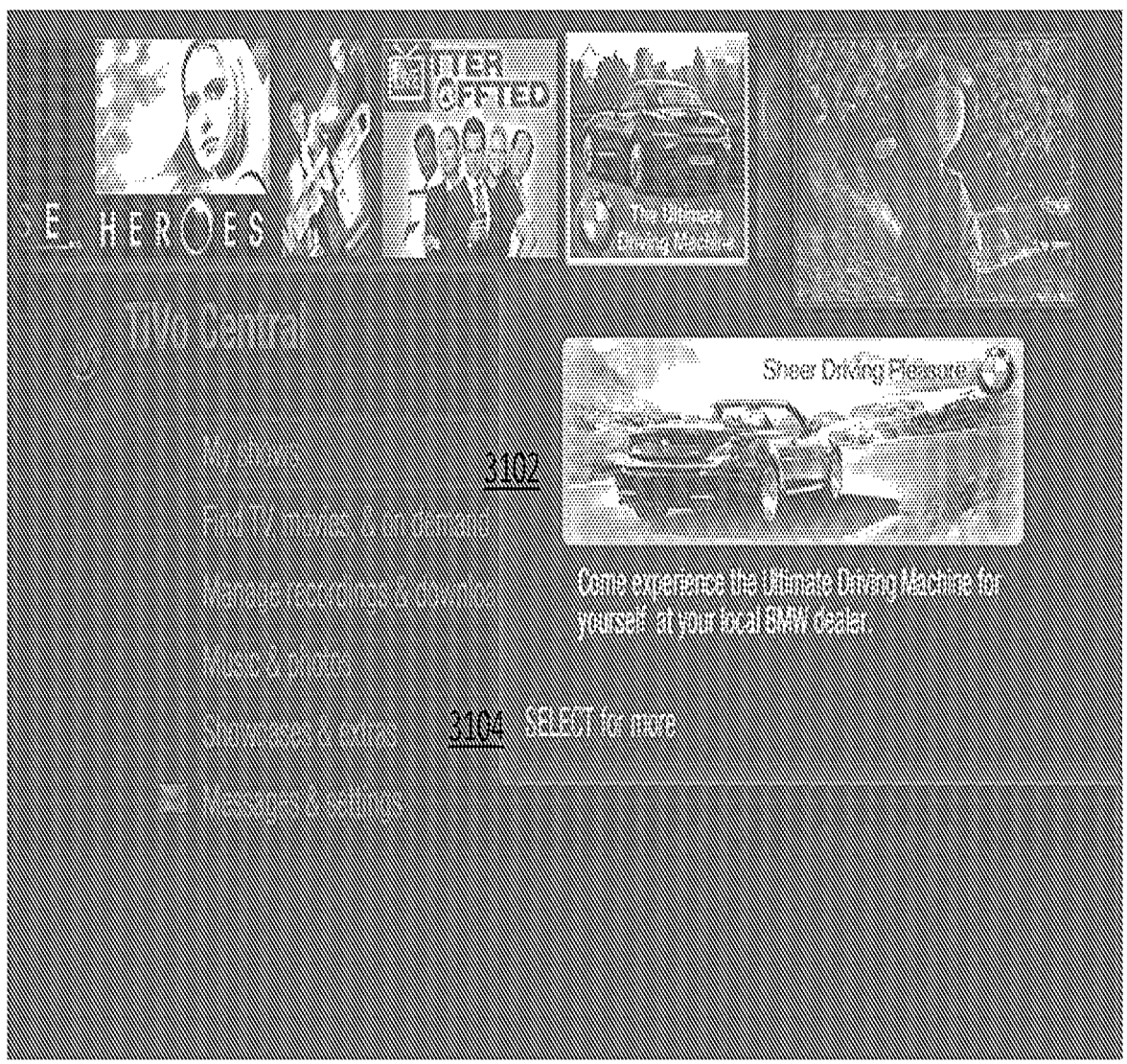
FIG. 31 illustrates an example of a DVR-presented menu screen that includes the bar of multimedia content where a third-party advertisement/showcase from the bar is highlighted, according to an embodiment of the invention.

An example of a promotions preview is shown in FIG. 31. Among the information that may be shown includes, but is not limited to, a grid banner 3102, a description that may be included with the banner, and any actions that the user may perform in relation to the screen 3104. Among possible actions is navigating to a destination that is designated by the advertisement. In other embodiments, a small video may be shown in place of the banner. In another embodiment, a graphical indicator indicates that the content is available from a variety of sources, including broadband partners or via network television. Other types of data may also be displayed, such as, but not limited to, metadata of the content including program description, duration, tags, etc. The placement and selection of which data is displayed may vary from implementation to implementation. In another embodiment, placement or selection of the data may be a defined by the user.

Figure 32:
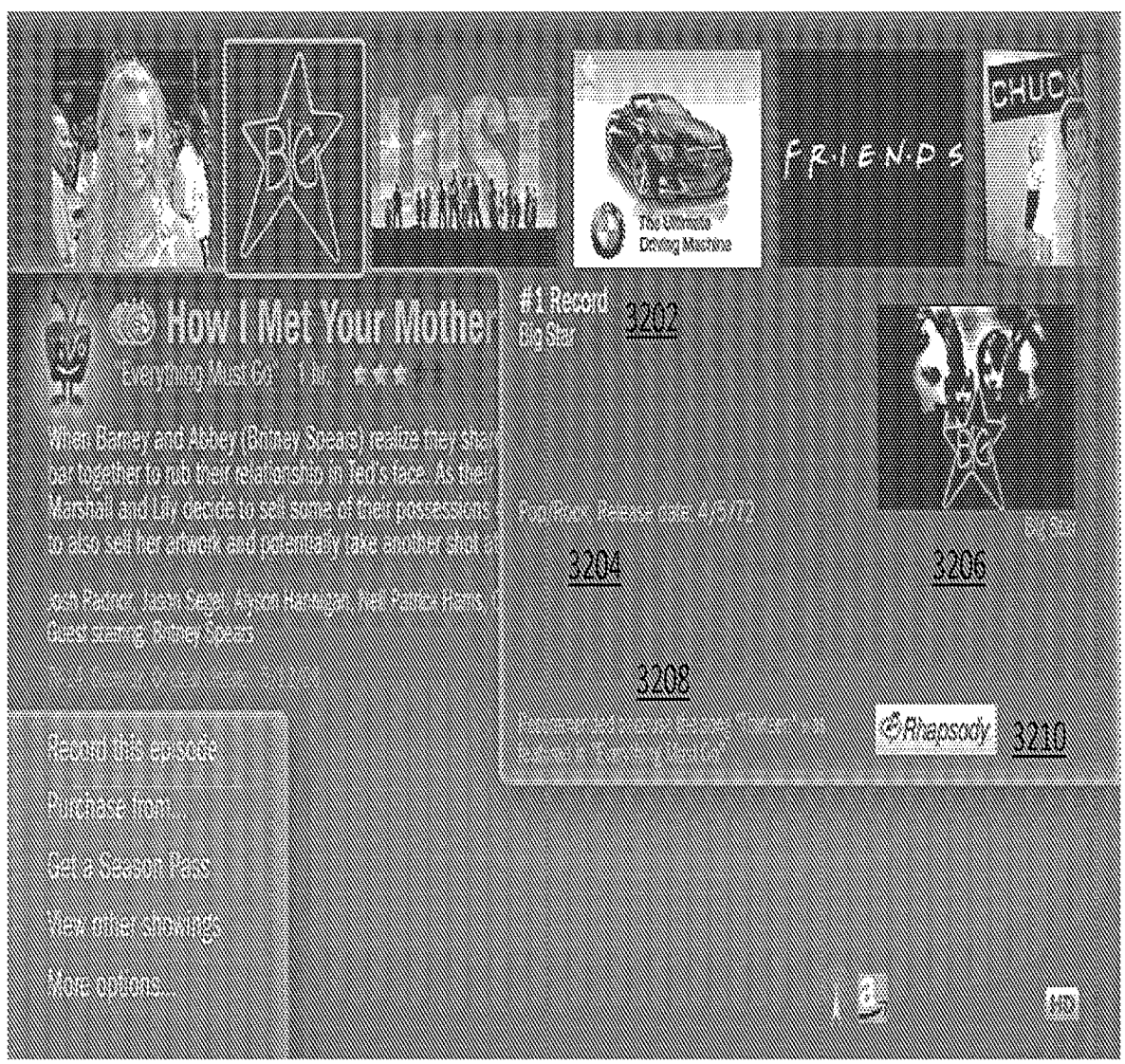
FIG. 32 illustrates an example of a DVR-presented menu screen that includes the bar of multimedia content where a music song from the bar is highlighted, according to an embodiment of the invention.

An example of information displayed upon highlighting a song is shown in FIG. 32. The information shown may include, but is not limited to, the name of the song 3202 and the band, the genre of the song, and the release date 3204. An image of the song 3206 may also be shown that either shows an image of the band or an image of from a single or album cover. The reason of why the song is recommended 3208 is also displayed. A graphical indicator 3210 may also display a source for the song or the publisher. In another embodiment, images of the band, album, record, etc. may be shown instead or in addition to image 3210. In an embodiment, availability may include a variety of formats including, but not limited to, watch now, record, rent, purchase, pre-order, or download for free. In another embodiment, a graphical indicator indicates that the content is available from a variety of sources, including broadband partners. Other types of data may also be displayed, such as, but not limited to, metadata of the song including description, duration, tags, etc. The placement and selection of which data is displayed may vary from implementation to implementation. In another embodiment, placement or selection of the data may be a defined by the user.

Browsing

Figure 33:
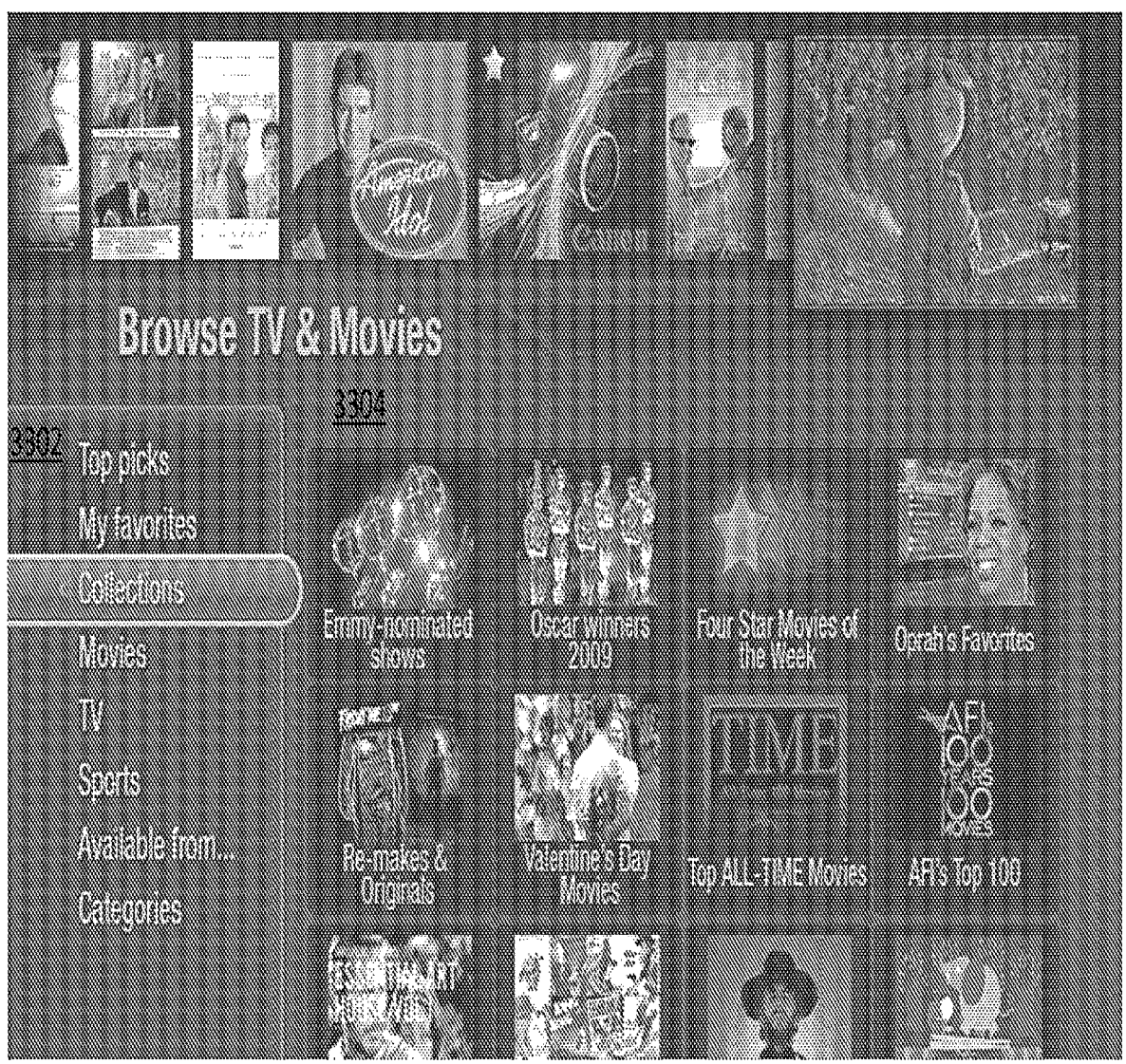
FIG. 33 illustrates how the bar of multimedia content is a carousel of different images and separated into viewable groups, according to an embodiment of the invention.

A user may also elect to browse based upon a number of categories including, but not limited to: top picks, favorites, collections, movies, television, sports, content available form a particular provider, and categories (genres). This is also a graphical interface with multiple boxes. An example is shown as FIG. 33. In FIG. 33, the user may select among the categories 3302 shown on the left to display in a grid 3304 shown on the right side of the screen. The number of items in the grid may vary based upon the size of each box in the grid and the screen size used. In an embodiment, the items shown on the grid may also be changed due to shaking of a remote control that is able to detect a shaking motion.

The items in the browsing menus may be sorted or grouped in a variety of ways. In one embodiment, items listed are media content that is freely available via download or streaming or will be shown shortly. Thus, items are shown with respect to a sense of immediacy and availability. In another grouping, the media content presented may be shown sometime in the next day or is available for purchase.

3.4 Additional Features

Data Quality of Service

In an embodiment, the data sent and received by the DVR to a central server is based upon priority. As the amount of data transmitted between a DVR and a central server increases dramatically, the performance of the DVR may be affected because data may not be received or transmitted quickly enough. Thus, data that is associated with currently performed actions (searches) may be given a higher priority than other data that is less time sensitive (daily guide updates). In this way, higher priority data will be transmitted and received over lower priority data. This ensures that data that affects user experience is more likely to reach the DVR in sufficient time.

Caching Data in the DVR

As more data is required in order to support a more robust user interface, to improve the user experience, more data relating to various features may be cached by the DVR. This negates the need for the DVR to request data each time a screen changes, or to display the discovery bar. In an embodiment, a DVR may cache the predicted data that a user would view. Thus, data for the discovery bar which displays on each screen is cached by the DVR. The DVR no longer needs to transfer as large amount of data and the user experience is improved.

Privacy in Search

In an embodiment, privacy is maintained for the user by letting the user select whether information that he or she enters is saved and recorded by the service provider. If a user elects to have all information recorded by the service provider, then all functionality of the search is available to the user. If a user selects to not opt-in (keep user data private and not shared), then the user may continue to use search but not all functionality may be available. For example, particular information might be needed to be saved in order to provide a search feature. Under this circumstance, the search feature that needs saved data would not be available to the user who does not opt-in. A user may elect to opt-in to certain information that allows access to some features of search but not allow access to other features of search.

Remote Application Access to the DVR

In an embodiment, the service provider is able to access the DVR in order to determine the state of the DVR in order to improve the search and user interface. For example, the discovery bar contains content to be displayed to the user but should not contain content that is already scheduled to record. The only way to determine that information is to access the DVR to get a list of scheduled recordings.

Previously, the service provider was unable to have access and thus all search results and the user interface was unable to incorporate individual DVR status data into the search or user interface application. In an embodiment, the service provider is running the application process remotely on a server and makes remote calls to the DVR in order to determine any necessary status information. In another example, recording conflicts were unable to be determined by the service provider. By obtaining status information from the DVR, recording conflicts may be presented to the user instantly.

Available Content Over Recorded Video

In an embodiment, a user may be presented with available content choices when the user is viewing a recorded media content. The available content may be derived from the content that is displayed in the content bar or may be independently derived based upon a variety of factors. For example, available content might be related to the media content that the user is watching or might be determined based upon previous actions by the user. Determination of available content may be based upon the policies and criteria that were earlier described with respect to the content bar. In an embodiment, the user is presented the available content as a bar over the video at the conclusion of the recording or when the user has paused the recording. By displaying related available content when the user is watching, it may be more likely that the user will watch or become interested in the available content.

Applications

A DVR also has the ability to allow users to play games or run applications that make use of a high speed internet connection. In an embodiment, applications that are available through a high speed internet connection are displayed in a menu screen, whether or not the high speed internet connection is available. This allows the user to view what applications would be available if a high speed internet connection were available. To show that the applications are not active, the application name in the screen may be a different color such as grey. In another embodiment, only applications that are active are shown in the menu screen.

In an embodiment, an application may also be associated with a tag. The tag allows the application to appear within another menu that has content that may be used with the application. For example, a photo application may have a tag that associates the application with any photo content. Under this circumstance, a user may store photos under a particular menu in the DVR. The tag would associate the photo application with the photo content and a shortcut to the photo application will appear in the menu with the photos. This tag may be associated with any third party applications and thus any third party photo applications may also appear in this menu.

Specifying Source

Figure 34:
FIG. 34 illustrates an example of a DVR-presented menu screen that shows how video providers may be selected in searching, according to an embodiment of the invention.

In an embodiment, a user may specify from which sources search results may originate. For example, a user might have a dislike of content from Amazon.com for some reason. A user may restrict which sources that results may be shown. In an embodiment, a user may perform this by affirmatively identifying which websites or sources are preferable and only content from those sources are then shown as search results. An example is shown in FIG. 34. In FIG. 34, a list of different video providers 3404 are shown. A user may select the checkboxes 3402 next to each of the video providers to have content from those video providers shown in the search results. In another embodiment, a user may identify specific sources from which he does not wish to receive results and so the search result set would exclude all content from the particular specified source.

Figure 35:
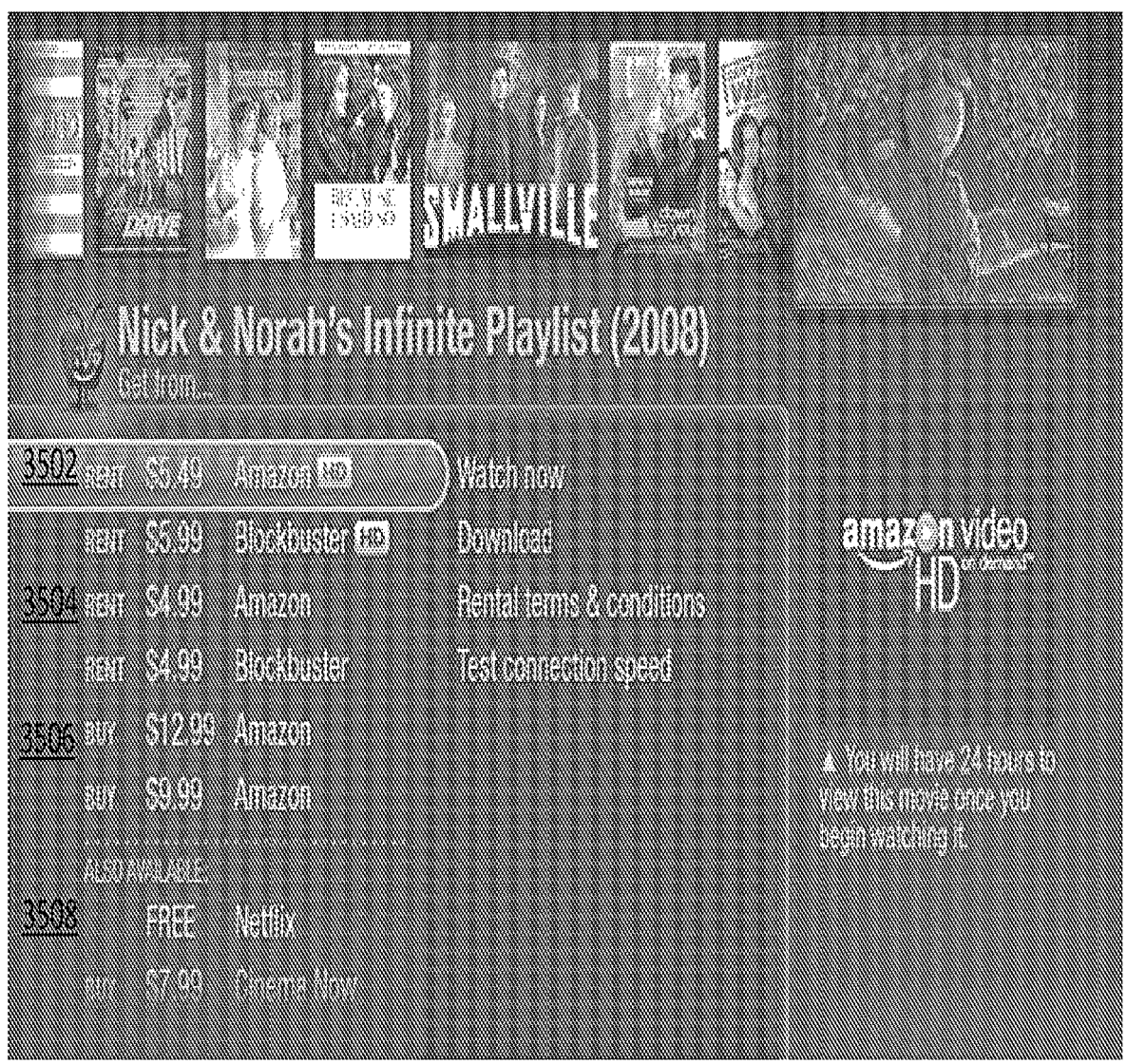
FIG. 35 illustrates an example of a DVR-presented menu screen that illustrates multiple providers available to obtain a particular media program, according to an embodiment of the invention.

In an embodiment, a user may be offered a list of content providers from which to obtain a particular media content. For example, a recently released movie might be available for download from multiple providers such as Amazon.com, Netflix, and Blockbuster. These providers may vary in the amount charged for the particular movie and also in presentation (e.g., available in high definition or standard definition). Thus, the user has a choice from whom to obtain the recently released movie and also whether the movie is high-definition or not. An example is shown in FIG. 35. In FIG. 35, choices are shown for the movie Nick and Norah's Infinite Playlist. The movie is available from different providers (Amazon, Blockbuster, Netflix, Cinema Now). The user has many choices including renting the movie from Amazon in high definition format 3502, renting the movie from Amazon in standard definition format 3504, and buying the movie from Amazon 3506. Below the dashed line a couple of other choices are available 3508. The delineation may be to indicate that the movie is also available with other providers, but the user is not currently a subscriber or does not have access to that service provider.

Picture in Graphics

When viewing a particular menu (or graphic), the current television program or recording being watched may be displayed in a video scaled window (or picture in graphic "PIG"). The PIG may be displayed in any part of the screen, based upon the implementation. A user may wish to remove the viewing of the PIG in order to not miss any of the show being watched. For example, a viewer may see a spoiler such as a touchdown in a football game on the small scaled video and would much rather only watch the football game in full screen. The user has the option to turn off the PIG with a single command from the remote control. A user can subsequently turn on the PIG when he wishes.

In an embodiment, display of the PIG may also be based upon user activity with the remote control. For example, if a user returns to menus from live television when remote activity has been detected within a specified time frame, then the PIG is displayed with the menu. In another example, if a user returns to menus from live television where no remote activity has been detected in a specified time frame (except the remote activity to return to the menu), then the PIG will not be displayed.

4.0 Implementation Mechanisms

Figure 36:
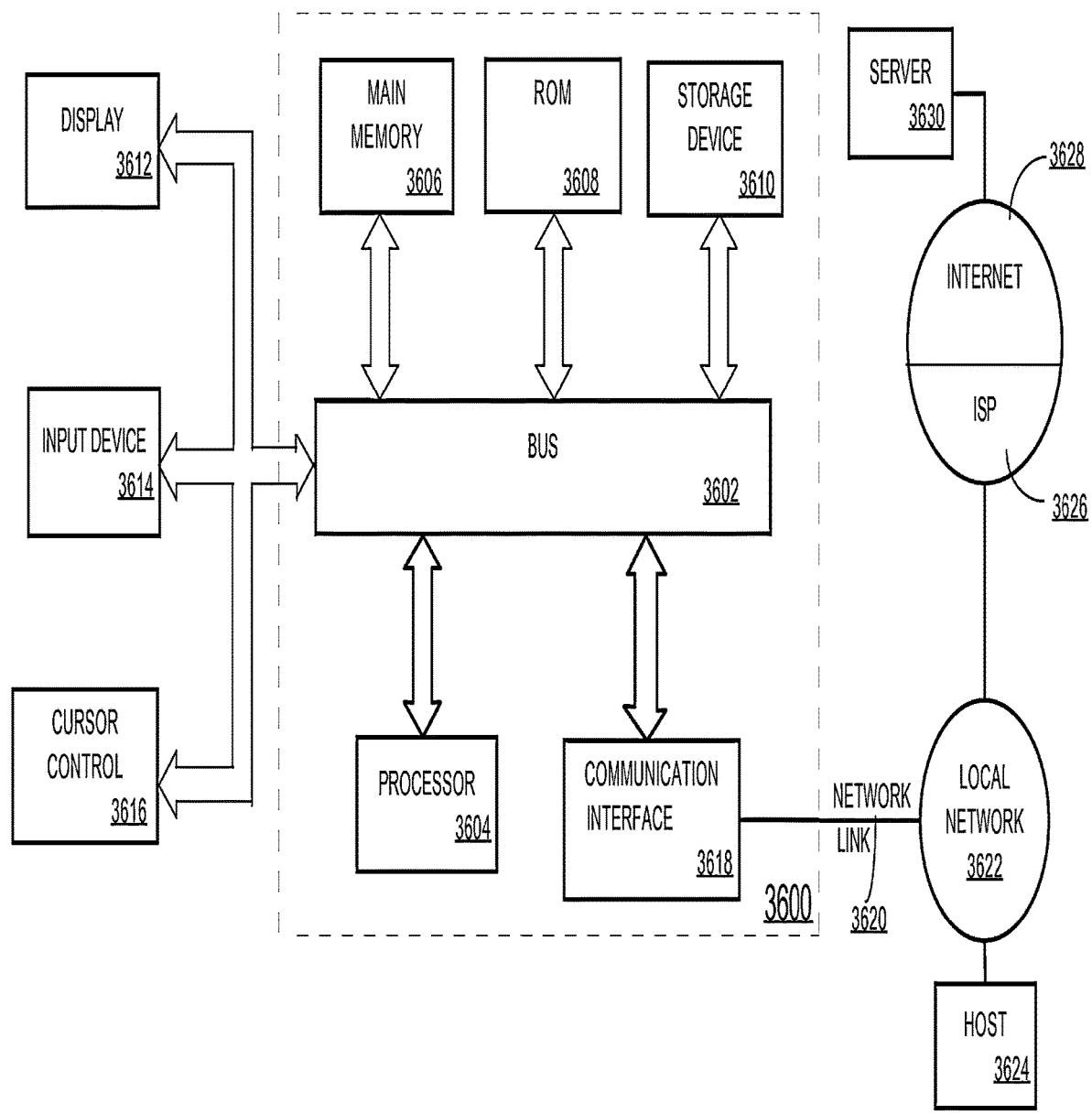
FIG. 36 is a block diagram of a system on which embodiments of the invention may be implemented.

FIG. 36 is a block diagram that illustrates a computer system 3600 upon which an embodiment of the invention may be implemented. Computer system 3600 includes a bus 3602 or other communication mechanism for communicating information, and a processor 3604 coupled with bus 3602 for processing information. Computer system 3600 also includes a main memory 3606, such as a random access memory (RAM) or other dynamic storage device, coupled to bus 3602 for storing information and instructions to be executed by processor 3604. Main memory 3606 also may be used for storing temporary variables or other intermediate information during execution of instructions to be executed by processor 3604. Computer system 3600 further includes a read only memory (ROM) 3608 or other static storage device coupled to bus 3602 for storing static information and instructions for processor 3604. A storage device 3610, such as a magnetic disk or optical disk, is provided and coupled to bus 3602 for storing information and instructions.

Computer system 3600 may be coupled via bus 3602 to a display 3612, such as a cathode ray tube (CRT), for displaying information to a computer user. An input device 3614, including alphanumeric and other keys, is coupled to bus 3602 for communicating information and command selections to processor 3604. Another type of user input device is cursor control 3616, such as a mouse, a trackball, or cursor direction keys for communicating direction information and command selections to processor 3604 and for controlling cursor movement on display 3612. This input device typically has two degrees of freedom in two axes, a first axis (e.g., x) and a second axis (e.g., y), that allows the device to specify positions in a plane.

The invention is related to the use of computer system 3600 for implementing the techniques described herein. According to one embodiment of the invention, those techniques are performed by computer system 3600 in response to processor 3604 executing one or more sequences of one or more instructions contained in main memory 3606. Such instructions may be read into main memory 3606 from another machine-readable medium, such as storage device 3610. Execution of the sequences of instructions contained in main memory 3606 causes processor 3604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 3600, various machine-readable media are involved, for example, in providing instructions to processor 3604 for execution. Such a medium may take many forms, including but not limited to storage media and transmission media. Storage media includes both non-volatile media and volatile media. Non-volatile media includes, for example, optical or magnetic disks, such as storage device 3610. Volatile media includes dynamic memory, such as main memory 3606. Transmission media includes coaxial cables, copper wire and fiber optics, including the wires that comprise bus 3602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 3604 for execution. For example, the instructions may initially be carried on a magnetic disk of a remote computer. The remote computer can load the instructions into its dynamic memory and send the instructions over a telephone line using a modem. A modem local to computer system 3600 can receive the data on the telephone line and use an infra-red transmitter to convert the data to an infra-red signal. An infra-red detector can receive the data carried in the infra-red signal and appropriate circuitry can place the data on bus 3602. Bus 3602 carries the data to main memory 3606, from which processor 3604 retrieves and executes the instructions. The instructions received by main memory 3606 may optionally be stored on storage device 3610 either before or after execution by processor 3604.

Computer system 3600 also includes a communication interface 3618 coupled to bus 3602. Communication interface 3618 provides a two-way data communication coupling to a network link 3620 that is connected to a local network 3622. For example, communication interface 3618 may be an integrated services digital network (ISDN) card or a modem to provide a data communication connection to a corresponding type of telephone line. As another example, communication interface 3618 may be a local area network (LAN) card to provide a data communication connection to a compatible LAN. Wireless links may also be implemented. In any such implementation, communication interface 3618 sends and receives electrical, electromagnetic or optical signals that carry digital data streams representing various types of information.

Network link 3620 typically provides data communication through one or more networks to other data devices. For example, network link 3620 may provide a connection through local network 3622 to a host computer 3624 or to data equipment operated by an Internet Service Provider (ISP) 3626. ISP 3626 in turn provides data communication services through the world wide packet data communication network now commonly referred to as the "Internet" 3628. Local network 3622 and Internet 3628 both use electrical, electromagnetic or optical signals that carry digital data streams. The signals through the various networks and the signals on network link 3620 and through communication interface 3618, which carry the digital data to and from computer system 3600, are exemplary forms of carrier waves transporting the information.

Computer system 3600 can send messages and receive data, including program code, through the network(s), network link 3620 and communication interface 3618. In the Internet example, a server 3630 might transmit a requested code for an application program through Internet 3628, ISP 3626, local network 3622 and communication interface 3618.

The received code may be executed by processor 3604 as it is received, and/or stored in storage device 3610, or other non-volatile storage for later execution. In this manner, computer system 3600 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

5.0 Examples

In an embodiment, a method comprises or one or more storage media storing instructions which, when executed by one or more computing devices, cause performance of the steps: receiving, at a multimedia device, a query from a user comprising one or more alphanumeric characters; as each alphanumeric character is received: generating a plurality of search results that correspond to the one or more alphanumeric characters received; displaying the plurality of search results that are sorted based at least in part upon a relevance ranking associated with the alphanumeric characters received and a particular search result of the plurality of search results; and receiving a selection from the user of a particular search result from the plurality of search results; storing a correlation between the alphanumeric characters received and the search result selected; aggregating the correlation with a plurality of other correlations in a correlation matrix; and updating a relevancy ranking of the search result selected and the alphanumeric characters entered based upon the correlations in the correlation matrix.

In an embodiment, a method or one or more storage media storing instructions wherein the selection from the user comprises receiving command input at a DVR that indicates a particular level of interest by the user.

In an embodiment, a method or one or more storage media storing instructions wherein the correlations are removed from the correlation matrix when the correlations reach a threshold age.

In an embodiment, a method or one or more storage media storing instructions wherein a rate of change of a frequency of a particular correlation in the correlation matrix is measured and the rate of change is a criterion used to update the relevancy ranking of the particular correlation.

In an embodiment, a method or one or more storage media storing instructions wherein search results displayed are grouped based upon a common trait.

In an embodiment, a method or one or more storage media storing instructions wherein each search result within a group is given a same relevancy ranking.

In an embodiment, a method or one or more storage media storing instructions wherein common traits comprise one of: a same title, a common actor, a common director, a common writer, a common creator, a common genre, or a common tag.

In an embodiment, a method or one or more storage media storing instructions wherein search results are limited to media content that is available to a user.

In an embodiment, a method or one or more storage media storing instructions wherein relevance rankings are artificially increased for a debut of newly available content.

In an embodiment, a method or one or more storage media storing instructions wherein a selection by the user of broadband video content associated with broadcast content increases the relevancy ranking of the associated broadcast content.

In an embodiment, a method or one or more storage media storing instructions wherein search results are displayed only from content providers that are selected by the user.

In an embodiment, a method or one or more storage media storing instructions further comprises upon selection of the particular search result, displaying a plurality of content providers upon which the search result is available.

In an embodiment, a method or one or more storage media storing instructions wherein search results include media content that is available from a content source that the user does not have access or is not authorized.

In an embodiment, a method or one or more storage media storing instructions wherein upon selection of media content that are available from a content source that the user does not have access or is not authorized, displaying instructions on how the content source may be accessed or authorized.

In an embodiment, an apparatus, comprising: a query receiving subsystem that receives, at a multimedia device, a query from a user comprising one or more alphanumeric characters; as each alphanumeric character is received: a generating subsystem that generates a plurality of search results that correspond to the one or more alphanumeric characters received; a display subsystem that displays the plurality of search results that are sorted based at least in part upon a relevance ranking associated with the alphanumeric characters received and a particular search result of the plurality of search results; and a selection receiving subsystem that receives a selection from the user of a particular search result from the plurality of search results; a storing subsystem that stores a correlation between the alphanumeric characters received and the search result selected; an aggregation subsystem that aggregates the correlation with a plurality of other correlations in a correlation matrix; and a ranking updating subsystem that updates a relevancy ranking of the search result selected and the alphanumeric characters entered based upon the correlations in the correlation matrix.

In an embodiment, an apparatus wherein the selection from the user comprises receiving command input at a DVR that indicates a particular level of interest by the user.

In an embodiment, an apparatus wherein the correlations are removed from the correlation matrix when the correlations reach a threshold age.

In an embodiment, an apparatus wherein a rate of change of a frequency of a particular correlation in the correlation matrix is measured and the rate of change is a criterion used to update the relevancy ranking of the particular correlation.

In an embodiment, an apparatus wherein search results displayed are grouped based upon a common trait.

In an embodiment, an apparatus wherein each search result within a group is given a same relevancy ranking.

In an embodiment, an apparatus wherein common traits comprise one of: a same title, a common actor, a common director, a common writer, a common creator, a common genre, or a common tag.

In an embodiment, an apparatus wherein search results are limited to media content that is available to a user.

In an embodiment, an apparatus wherein relevance rankings are artificially increased for a debut of newly available content.

In an embodiment, an apparatus wherein a selection by the user of broadband video content associated with broadcast content increases the relevancy ranking of the associated broadcast content.

In an embodiment, an apparatus wherein search results are displayed only from content providers that are selected by the user.

In an embodiment, an apparatus further comprising upon selection of the particular search result, the display subsystem displaying a plurality of content providers upon which the search result is available.

In an embodiment, an apparatus wherein search results include media content that are available from a content source that the user does not have access or is not authorized.

In an embodiment, an apparatus wherein upon selection of media content that is available from a content source that the user does not have access or is not authorized, the display subsystem displaying instructions on how the content source may be accessed or authorized.

What is claimed is:

1. A method comprising:

storing a first data structure for a first prefix, wherein the first data structure comprises data indicative of which media content item was selected via at least one user interface of at least one device of a plurality of devices from a first list of media content item identifiers generated for display in response to the first prefix being entered;

wherein the first prefix comprises a sequence of characters;

storing a second data structure for a second prefix, wherein the second data structure comprises data indicative of which media content item was selected via at least one user interface of at least one device of the plurality of devices from a second list of media content item identifiers generated for display in response to the second prefix being entered;

wherein the second prefix is a truncation of the first prefix that consists of one or more initial characters of the sequence of characters;

receiving, from at least one device of the plurality of devices, a first search request consisting of the first prefix;

identifying a first selected media content item identifier that was selected from a third list of media content item identifiers generated for display in response to the first prefix being entered;

modifying the first data structure for the first prefix to correlate the first prefix with the first selected media content item identifier;

modifying the second data structure for the second prefix to correlate the second prefix with the first selected media content item identifier;

receiving, from at least one device of the plurality of devices, a second search request consisting of the second prefix;

generating a list comprising one or more media content item identifiers that is sorted based on correlations of the second prefix with each media content item of the one or more media content item identifiers indicated by the modified second data structure, wherein the generating the list further comprises determining, for each of the one or more media content item identifiers, a respective content type;

causing display of the sorted list of media content item identifiers as a search result for the second search request; and generating for display, for each of the one or more media content item identifiers, a respective graphical indicator corresponding to the respective content type of the one or more media content item identifiers.

2. A method comprising:

storing a first data structure for a first prefix, wherein the first data structure comprises data indicative of which media content item was selected via at least one user interface of at least one device of a plurality of devices from a first list of media content item identifiers generated for display in response to the first prefix being entered;

wherein the first prefix comprises a sequence of characters;

storing a second data structure for a second prefix, wherein the second data structure comprises data indicative of which media content item was selected via at least one user interface of at least one device of the plurality of devices from a second list of media content item identifiers generated for display in response to the second prefix being entered;

wherein the second prefix is a truncation of the first prefix that consists of one or more initial characters of the sequence of characters;

receiving, from at least one device of the plurality of devices, a first search request consisting of the first prefix;

identifying a first selected media content item identifier that was selected from a third list of media content item identifiers generated for display in response to the first prefix being entered;

modifying the first data structure for the first prefix to correlate the first prefix with the first selected media content item identifier;

modifying the second data structure for the second prefix to correlate the second prefix with the first selected media content item identifier;

identifying a second selected media content item identifier that was selected from the third list of media content item identifiers generated for display in response to the first prefix being entered;

modifying the first data structure for the first prefix to correlate the first prefix with the second selected media content item identifier;

modifying the second data structure for the second prefix to correlate the second prefix with the second selected media content item identifier;

receiving, from at least one device of the plurality of devices, a second search request consisting of the second prefix;

generating a list comprising one or more media content item identifiers that is sorted based on correlations of the second prefix with each media content item of the one or more media content item identifiers indicated by the modified second data structure; and causing display of the sorted list of media content item identifiers as a search result for the second search request.

3. The method of claim 1, wherein generating the list further comprises:

generating for display, for each media content identifier of the one or more media content item identifiers, at least one indicator corresponding to at least one content provider that has the media content represented by the media content identifier available for access.

4. The method of claim 3, wherein generating, for each of the one or more media content item identifiers, the at least one indicator corresponding to the at least one content provider further comprises:

determining whether each of the at least one content provider corresponds to a user preference; and in response to the determination that a respective content provider of the at least one content provider corresponds to the user preference, generating for display a respective indicator corresponding to the respective content provider with the corresponding media content item identifier.

5. A method comprising:

storing a first data structure for a first prefix, wherein the first data structure comprises data indicative of which media content item was selected via at least one user interface of at least one device of a plurality of devices from a first list of media content item identifiers generated for display in response to the first prefix being entered;
  wherein the first prefix comprises a sequence of characters;
storing a second data structure for a second prefix, wherein the second data structure comprises data indicative of which media content item was selected via at least one user interface of at least one device of the plurality of devices from a second list of media content item identifiers generated for display in response to the second prefix being entered;
  wherein the second prefix is a truncation of the first prefix that consists of one or more initial characters of the sequence of characters;
receiving, from at least one device of the plurality of devices, a first search request consisting of the first prefix;
identifying a first selected media content item identifier that was selected from a third list of media content item identifiers generated for display in response to the first prefix being entered;
modifying the first data structure for the first prefix to correlate the first prefix with the first selected media content item identifier;
modifying the second data structure for the second prefix to correlate the second prefix with the first selected media content item identifier;
receiving, from at least one device of the plurality of devices, a second search request consisting of the second prefix;
generating a list comprising one or more media content item identifiers that is sorted based on correlations of the second prefix with each media content item of the one or more media content item identifiers indicated by the modified second data structure;
causing display of the sorted list of media content item identifiers as a search result for the second search request;
storing a third data structure for a third prefix, wherein the third data structure comprises data indicative of which media content item was selected via at least one user interface of at least one device of the plurality of devices from a fourth list of media content item identifiers generated for display in response to the third prefix being entered;
  wherein the third prefix is a truncation of the second prefix that consists of one or more initial characters of the sequence of characters; and
modifying the third data structure for the third prefix to correlate the third prefix with the first selected media content item identifier.

6. The method of claim 5, wherein each of the first data structure, the second data structure, and the third data structure comprise a correlation matrix for storing mappings of each selected media content item identifier to a previously entered prefix.

7. The method of claim 6, wherein the correlation matrix stores a relevancy ranking for each mapping of each media content identifier, and wherein modifying the first data structure for the first prefix to correlate the first prefix with the first selected media content item identifier, further comprises:
  increasing the relevancy ranking of the mapping between the first prefix and the first selected media content item identifier based on receiving a selection of the first media content identifier from the third list of media content item identifiers generated for display in response to the first prefix being selected via at least one user interface of at least one device of the plurality of devices.

8. The method of claim 7, wherein generating the list comprising the one or more media content item identifiers further comprises:
  sorting media content identifiers higher on the list if they correspond to newly available content, wherein media content identifiers corresponding to the newly available content are stored in the correlation matrix with a neutral relevancy ranking.

9. A method comprising:
storing a first data structure for a first prefix, wherein the first data structure comprises data indicative of which media content item was selected via a user interface of a user device from a first list of media content item identifiers generated for display in response to the first prefix being entered;
  wherein the first prefix comprises a sequence of characters;
storing a second data structure for a second prefix, wherein the second data structure comprises data indicative of which media content item was selected via the user interface of the user device from a second list of media content item identifiers generated for display in response to the second prefix being entered;
  wherein the second prefix is a truncation of the first prefix that consists of one or more initial characters of the sequence of characters;
receiving, from the user device, a first search request consisting of the first prefix;
identifying a first selected media content item identifier that was selected via the user interface of the user device from a third list of media content item identifiers generated for display in response to the first prefix being entered via the user interface of the user device;
modifying the first data structure for the first prefix to correlate the first prefix with the first selected media content item identifier;
modifying the second data structure for the second prefix to correlate the second prefix with the first selected media content item identifier;
identifying a second selected media content item identifier that was selected via the user interface of the user device from the third list of media content item identifiers generated for display in response to the first prefix being entered via the user interface of the user device;
modifying the first data structure for the first prefix to correlate the first prefix with the second selected media content item identifier;
modifying the second data structure for the second prefix to correlate the second prefix with the second selected media content item identifier
receiving, from the user device, a second search request consisting of the second prefix;
generating a list comprising one or more media content item identifiers that is sorted based on correlations of the second prefix with each media content item of the one or more media content item identifiers indicated by the modified second data structure; and
causing display of the sorted list of media content item identifiers on the user device as a search result for the second search request.

10. A system comprising:
control circuitry configured to:
  store a first data structure for a first prefix, wherein the first data structure comprises data indicative of which media content item was selected via at least one user interface of at least one device of a plurality of devices from a first list of media content item identifiers generated for display in response to the first prefix being entered;
    wherein the first prefix comprises a sequence of characters;
  store a second data structure for a second prefix, wherein the second data structure comprises data indicative of which media content item was selected via at least one user interface of at least one device of the plurality of devices from a second list of media content item identifiers generated for display in response to the second prefix being entered;
  wherein the second prefix is a truncation of the first prefix that consists of one or more initial characters of the sequence of characters; and
input/output circuitry configured to:
  receive, from at least one device of the plurality of devices, a first search request consisting of the first prefix; and
wherein the control circuitry is further configured to:
  identify a first selected media content item identifier that was selected from a third list of media content item identifiers generated for display in response to the first prefix being entered;
  modify the first data structure for the first prefix to correlate the first prefix with the first selected media content item identifier;
  modify the second data structure for the second prefix to correlate the second prefix with the first selected media content item identifier; and
wherein the input/output circuitry is further configured to:
  receive, from at least one device of the plurality of devices, a second search request consisting of the second prefix; and
wherein the control circuitry is further configured to:
  generate a list comprising one or more media content item identifiers that is sorted based on correlations of the second prefix with each media content item of the one or more media content item identifiers indicated by the modified second data structure, wherein the generating the list further comprises determining, for each of the one or more media content item identifiers, a respective content type;
  cause display of the sorted list of media content item identifiers as a search result for the second search request; and
  generate for display, for each of the one or more media content item identifiers, a respective graphical indicator corresponding to the respective content type of the one or more media content item identifiers.

11. The system of claim 10, wherein the control circuitry is further configured to:
  identify a second selected media content item identifier that was selected via at least one user interface of at least one device of the plurality of devices from the list comprising the one or more media content item identifiers;
  modify the first data structure for the first prefix to correlate the first prefix with the second selected media content item identifier; and
  modify the second data structure for the second prefix to correlate the second prefix with the second selected media content item identifier.

12. The system of claim 10, wherein the control circuitry configured to generate the list is further configured to:
  generate for display, for each media content identifier of the one or more media content item identifiers, at least one indicator corresponding to at least one content provider that has the media content represented by the media content identifier available for access.

13. The system of claim 12, wherein the control circuitry configured to generate, for each of the one or more media content item identifiers, the at least one indicator corresponding to the at least one content provider is further configured to:
  determine whether each of the at least one content provider corresponds to a user preference; and
  in response to the determination that a respective content provider of the at least one content provider corresponds to the user preference, generate for display a respective indicator corresponding to the respective content provider with the corresponding media content item identifier.

14. The system of claim 10, wherein the control circuitry is further configured to:
  store a third data structure for a third prefix, wherein the third data structure comprises data indicative of which media content item was selected via at least one user interface of at least one device of the plurality of devices from a fourth list of media content item identifiers generated for display in response to the third prefix being entered;
    wherein the third prefix is a truncation of the second prefix that consists of one or more initial characters of the sequence of characters; and
  modify the third data structure for the third prefix to correlate the third prefix with the first selected media content item identifier.

15. The system of claim 14, wherein each of the first data structure, the second data structure, and the third data structure comprise a correlation matrix for storing mappings of each selected media content item identifier to a previously entered prefix.

16. The system of claim 15, wherein the correlation matrix stores a relevancy ranking for each mapping of each media content identifier, and wherein the control circuitry configured to modify the first data structure for the first prefix to correlate the first prefix with the first selected media content item identifier is further configured to:
  increase the relevancy ranking of the mapping between the first prefix and the first selected media content item identifier based on receiving a selection of the first media content identifier from the third list of media content item identifiers generated for display in response to the first prefix being selected via at least one user interface of at least one device of the plurality of devices.

17. The system of claim 16, wherein the control circuitry configured to generate the list comprising the one or more media content item identifiers is further configured to:
  sort media content identifiers higher on the list if they correspond to newly available content, wherein media content identifiers corresponding to the newly available content are stored in the correlation matrix with a neutral relevancy ranking.

* * * * *